US008922351B2

(12) United States Patent
Motoyama et al.

(10) Patent No.: US 8,922,351 B2
(45) Date of Patent: Dec. 30, 2014

(54) DISPLAY APPARATUS, INFORMATION PROCESSING SYSTEM, RECORDING MEDIUM AND TELEVISION RECEIVER

(75) Inventors: Tadashi Motoyama, Osaka (JP); Akihiro Kumata, Osaka (JP); Takatoshi Oishi, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 0 days.

(21) Appl. No.: 14/009,707
(22) PCT Filed: Apr. 2, 2012
(86) PCT No.: PCT/JP2012/058813
§ 371 (c)(1),
(2), (4) Date: Oct. 3, 2013
(87) PCT Pub. No.: WO2012/137697
PCT Pub. Date: Oct. 11, 2012

(65) Prior Publication Data
US 2014/0016040 A1    Jan. 16, 2014

(30) Foreign Application Priority Data
Apr. 4, 2011   (JP) .................................. 2011-083146
Mar. 21, 2012  (JP) .................................. 2012-064331

(51) Int. Cl.
H04N 5/44     (2011.01)
G08C 17/00    (2006.01)
G06F 3/0488   (2013.01)
G08C 17/02    (2006.01)
G08C 23/04    (2006.01)
G06F 3/0481   (2013.01)
G06F 3/0354   (2013.01)

(52) U.S. Cl.
CPC .............. *H04N 5/4403* (2013.01); *G08C 17/00* (2013.01); *G06F 3/0488* (2013.01); *G08C 17/02* (2013.01); *G08C 23/04* (2013.01); *G06F 3/0481* (2013.01); *G06F 3/03547* (2013.01)

USPC ........ 340/12.22; 348/734; 345/156; 345/157; 345/160; 340/4.12

(58) Field of Classification Search
USPC ........ 340/12.22, 12.23, 12.54, 4.12; 348/734; 345/156, 157, 160, 162, 163, 169, 173
See application file for complete search history.

(56) References Cited

U.S. PATENT DOCUMENTS

| 2011/0011925 A1* | 1/2011 | Yoshida ........................ 235/375 |
| 2011/0279397 A1 | 11/2011 | Rimon et al. |
| 2013/0011065 A1* | 1/2013 | Yoshida ........................ 382/187 |

FOREIGN PATENT DOCUMENTS

| CN | 101854496 A | 10/2010 |
| JP | 8-251442 A | 9/1996 |

(Continued)

OTHER PUBLICATIONS

Nikkei Trendy Net, "Jissen Technic/Windows XP Saidaika Shita IE Window kara Tool Bar o Kesu", Retrieval date Jun. 19, 2012, Internet <URL:http://trendy.nikkeibp.co.jp/article/tec/winxp/20051121/114365/>, Nov. 28, 2005, pp. 1-6.

(Continued)

*Primary Examiner* — Nabil Syed
(74) *Attorney, Agent, or Firm* — Birch, Stewart, Kolasch & Birch, LLP

(57) ABSTRACT

A wireless output unit of a remote controller 2 having a touch pad 23 or a touch panel wirelessly outputs a coordinate value associated with a continuous contact input for the touch pad 23 to a television 1. A reception unit of the television 1 wirelessly receives the coordinate value associated with the continuous contact input output from the wireless output unit. A display processing unit displays on a display unit 14 a pointer 3 moving on the basis of the coordinate value received by the reception unit. An output unit outputs, when the continuous contact input is finished, acceptance information indicating that an input for an object T displayed on the display unit 14 is accepted at a final coordinate value for the pointer 3 displayed on the display unit 14.

22 Claims, 62 Drawing Sheets

(56) References Cited

FOREIGN PATENT DOCUMENTS

| | | |
|---|---|---|
| JP | 9-62446 A | 3/1997 |
| JP | 10-187322 A | 7/1998 |
| JP | 2001-117713 A | 4/2001 |
| JP | 2002-82766 A | 3/2002 |
| JP | 2008-192012 A | 8/2008 |
| JP | 2010-503125 A | 1/2010 |
| WO | WO 2008/030880 A1 | 3/2008 |

OTHER PUBLICATIONS

Okano et al., "3-Dimensional Touch Panel System which can detect the proximity and contact of the finger", Informational Technology R& D Center, Mitsubishi Electric Corp., pp. 9-14.

Japanese Office Action issued in Japanese Patent Application No. 2012-064331 on Jun. 26, 2012.

* cited by examiner

F I G. 2
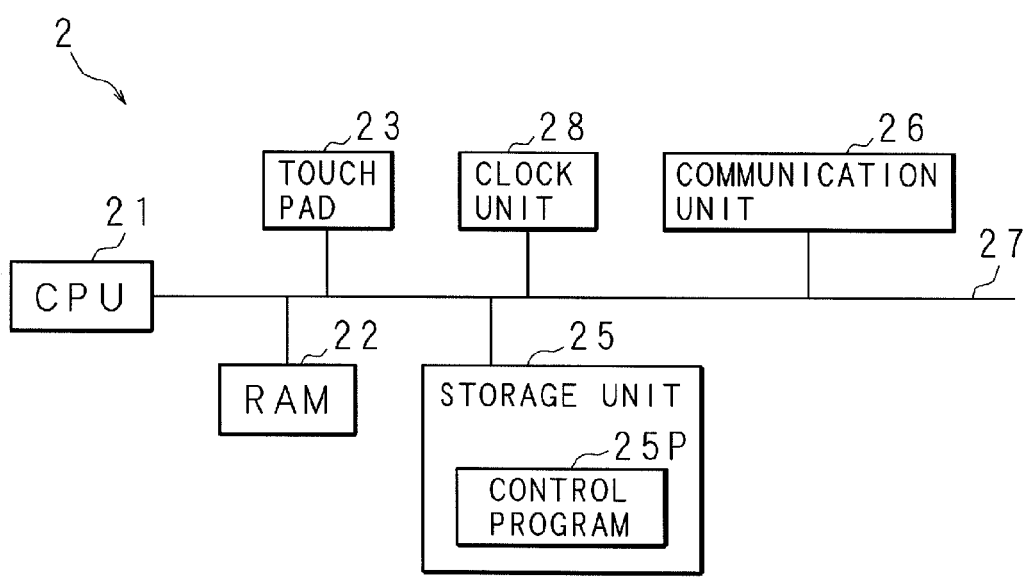

FIG. 4

```
COORDINATE
VALUES (X, Y)
  100, 120
  100, 121
  100, 121
  112, 118
     ⋮
     ⋮
  156, 86
  156, 85
  156, 84
```

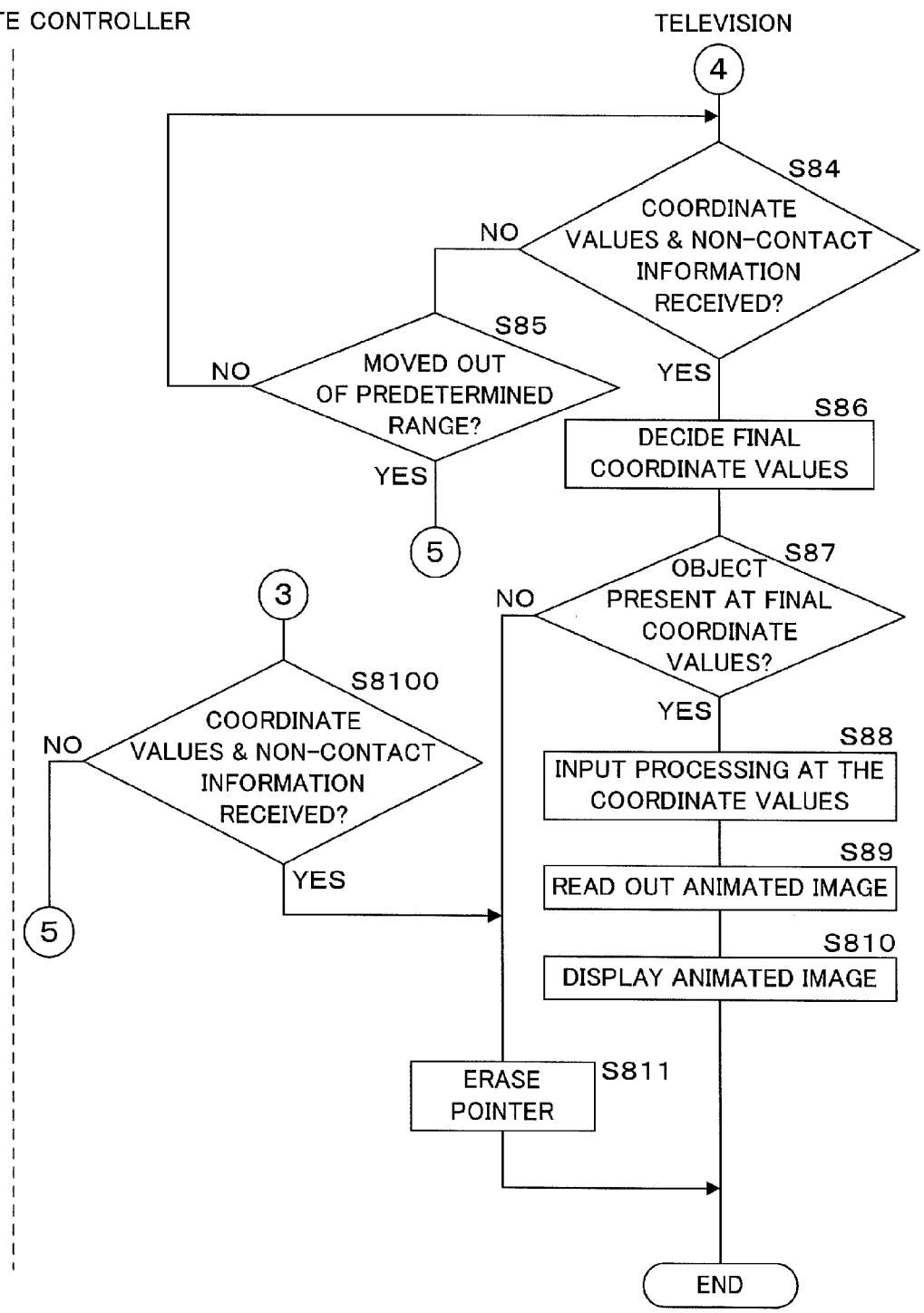

F I G. 9A
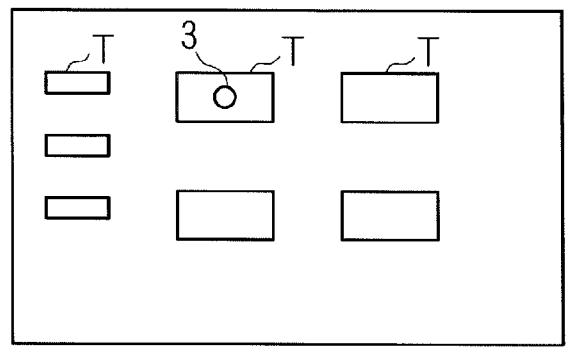
F I G. 9B
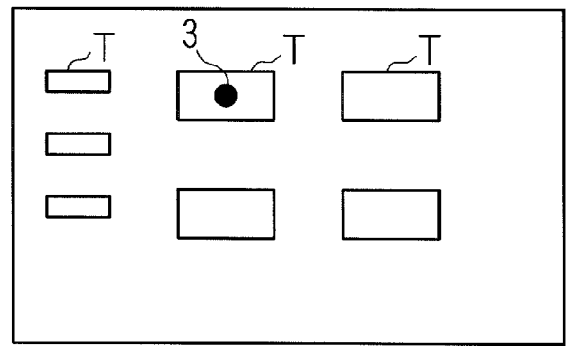
F I G. 9C
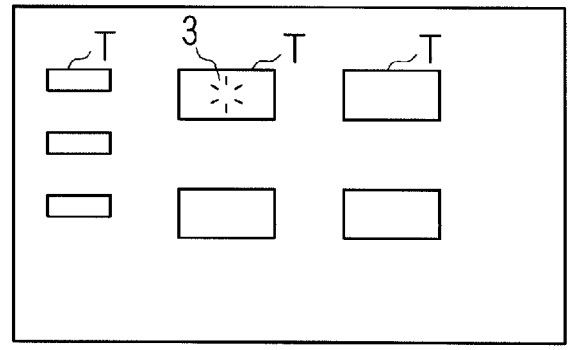

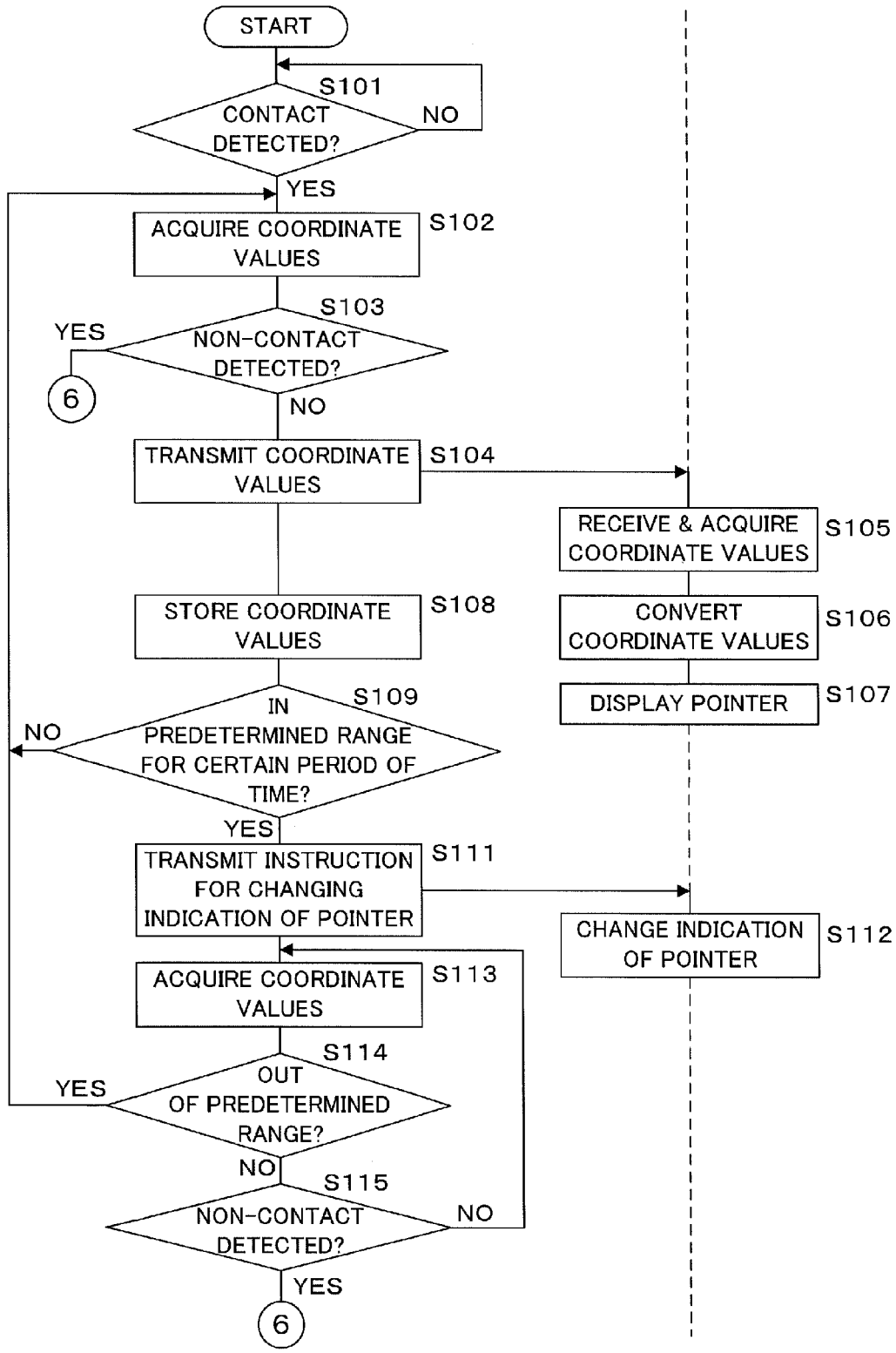

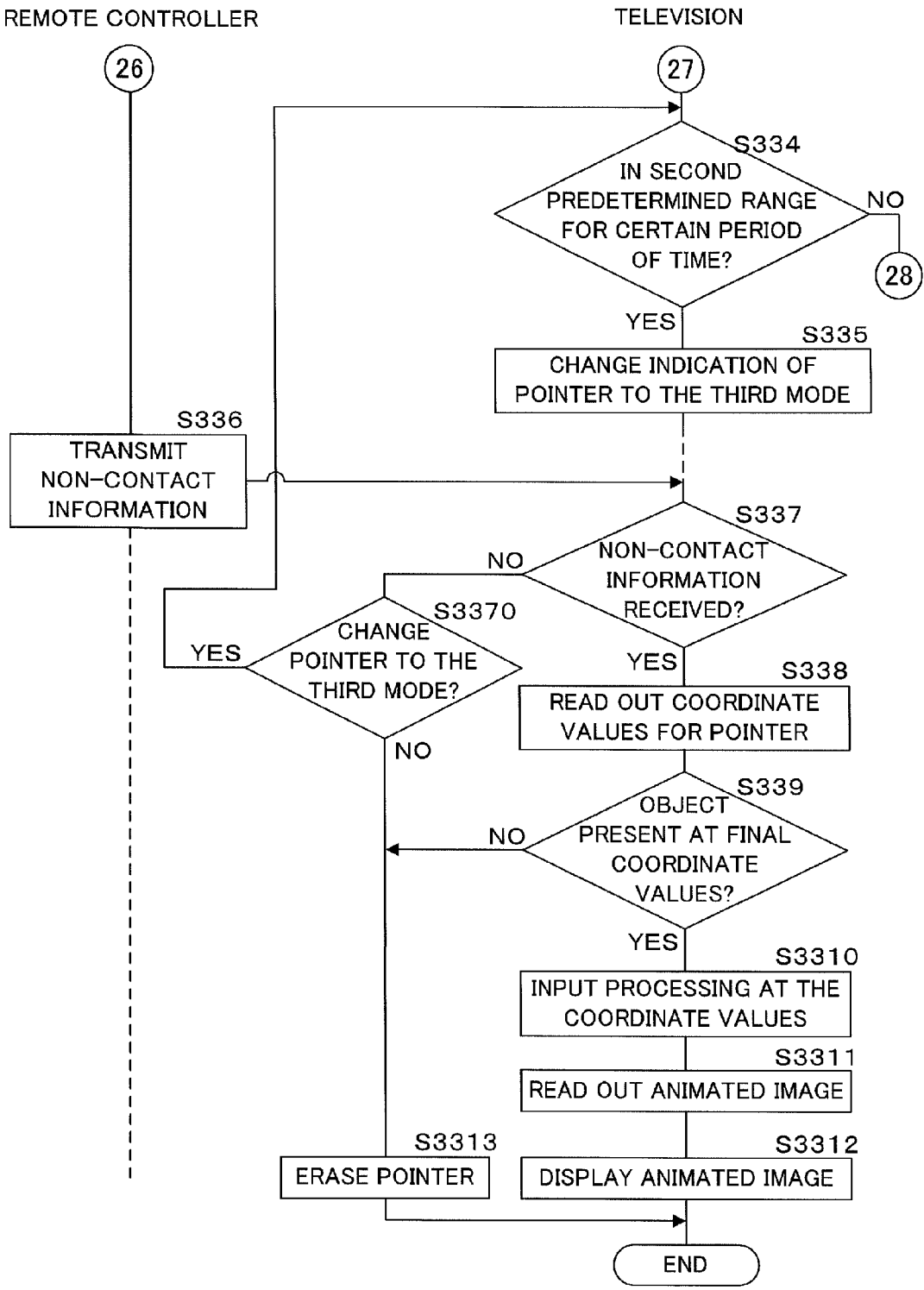

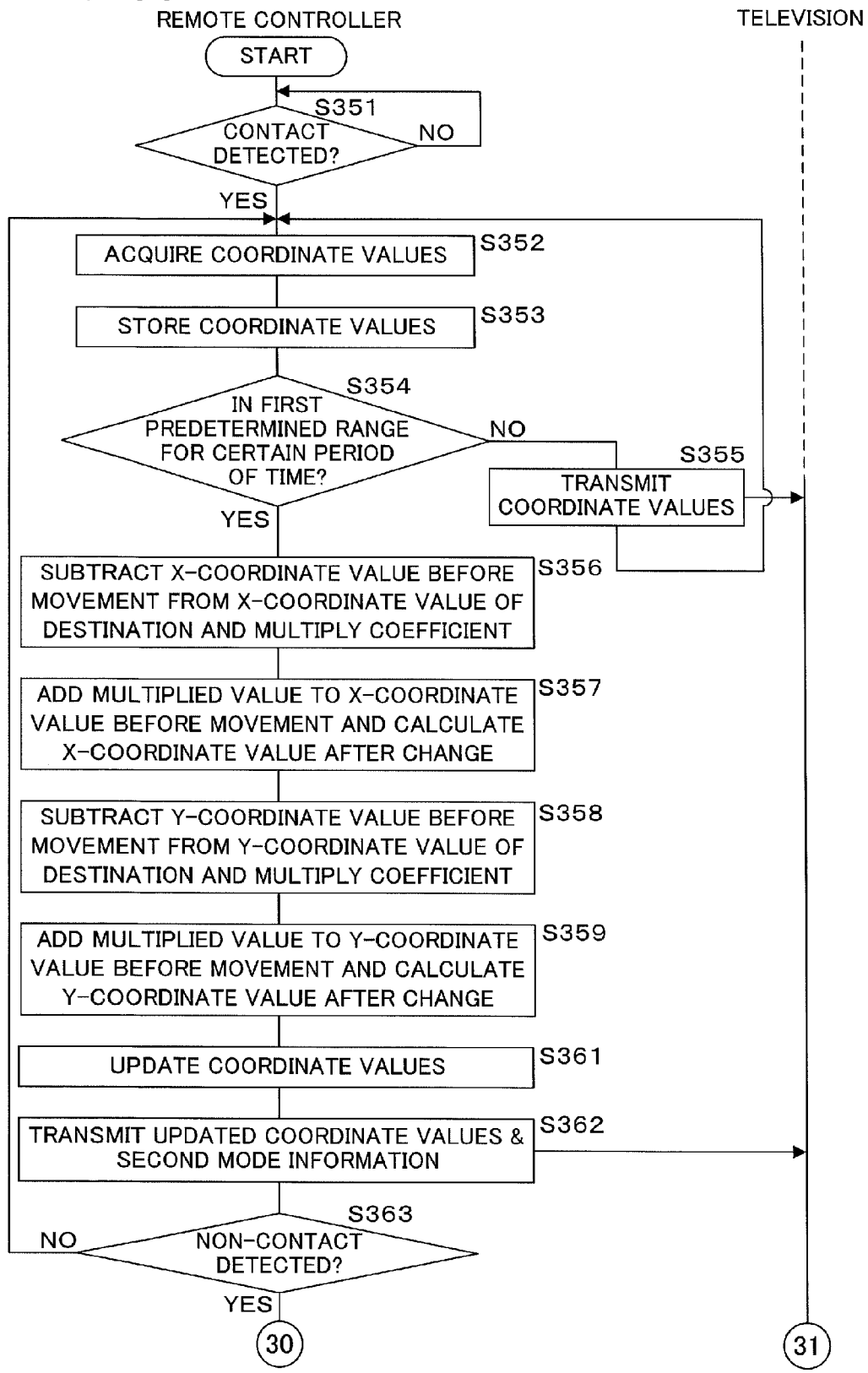

FIG. 36

REMOTE CONTROLLER (30)

TELEVISION (31)

- RECEIVE COORDINATE VALUES — S364
- ACQUIRE COORDINATE VALUES — S365
- CONVERT COORDINATE VALUES — S366
- STORE COORDINATE VALUES — S367
- S368 SECOND MODE INFORMATION RECEIVED?
  - NO → S371 DISPLAY POINTER IN FIRST MODE
  - YES → S372 DISPLAY POINTER IN SECOND MODE
- S373 IN SECOND PREDETERMINED RANGE FOR CERTAIN PERIOD OF TIME?
  - NO →
  - YES → S374 CHANGE INDICATION OF POINTER TO THIRD MODE

S375 TRANSMIT NON-CONTACT INFORMATION →

S376 NON-CONTACT INFORMATION RECEIVED?
- NO →
- YES → (32)

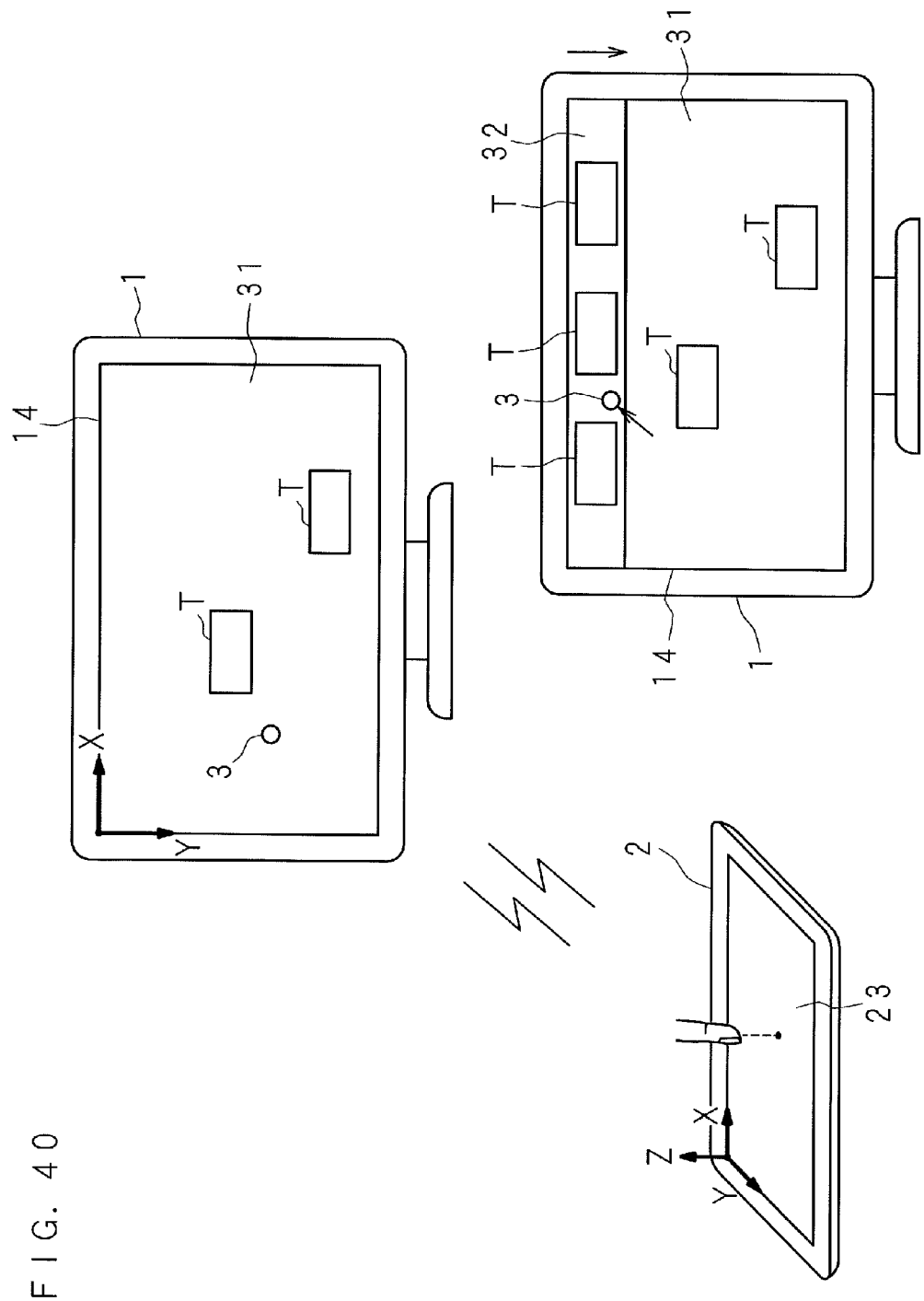
F I G. 4 0

FIG. 43

```
COORDINATE
VALUES (X, Y, Z)
 100, 120, 5
 100, 121, 4.5
 100, 121, 4
 112, 118, 4
     ⋮
 156, 86, 1
 156, 85, 1
 156, 84, 0
```

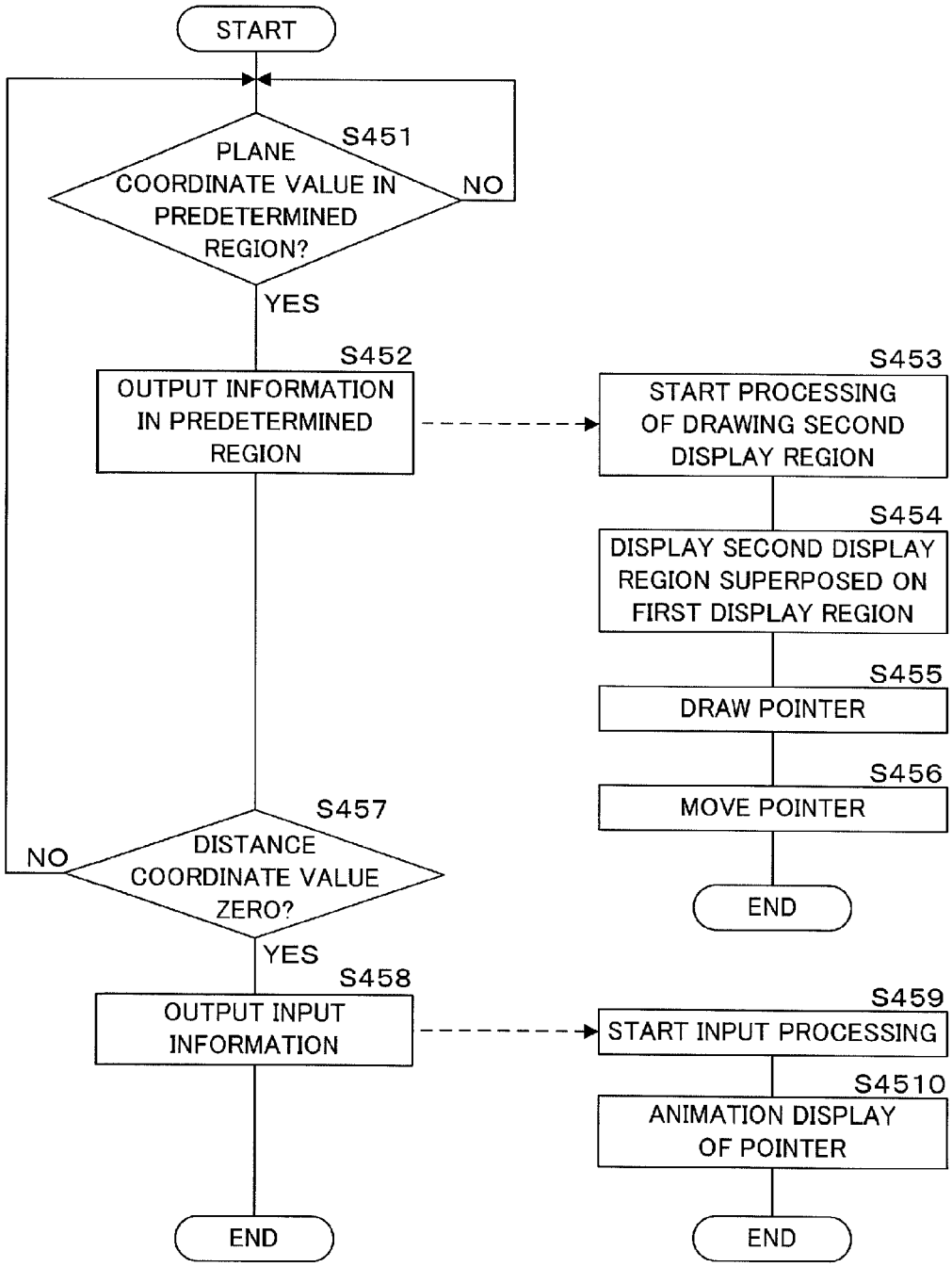

FIG. 48

| OBJECT ID | DISPLAY REGION |
|---|---|
| T1 | ... |
| T2 | ... |
| T3 | ... |

REGION FILE 151

F I G. 5 7

| IMAGE FILE | ~152 |
|---|---|
| DISTANCE COORDINATE VALUE | IMAGE |
| 2~4 | ... |
| 1~2 | ... |
| 0~1 | ... |

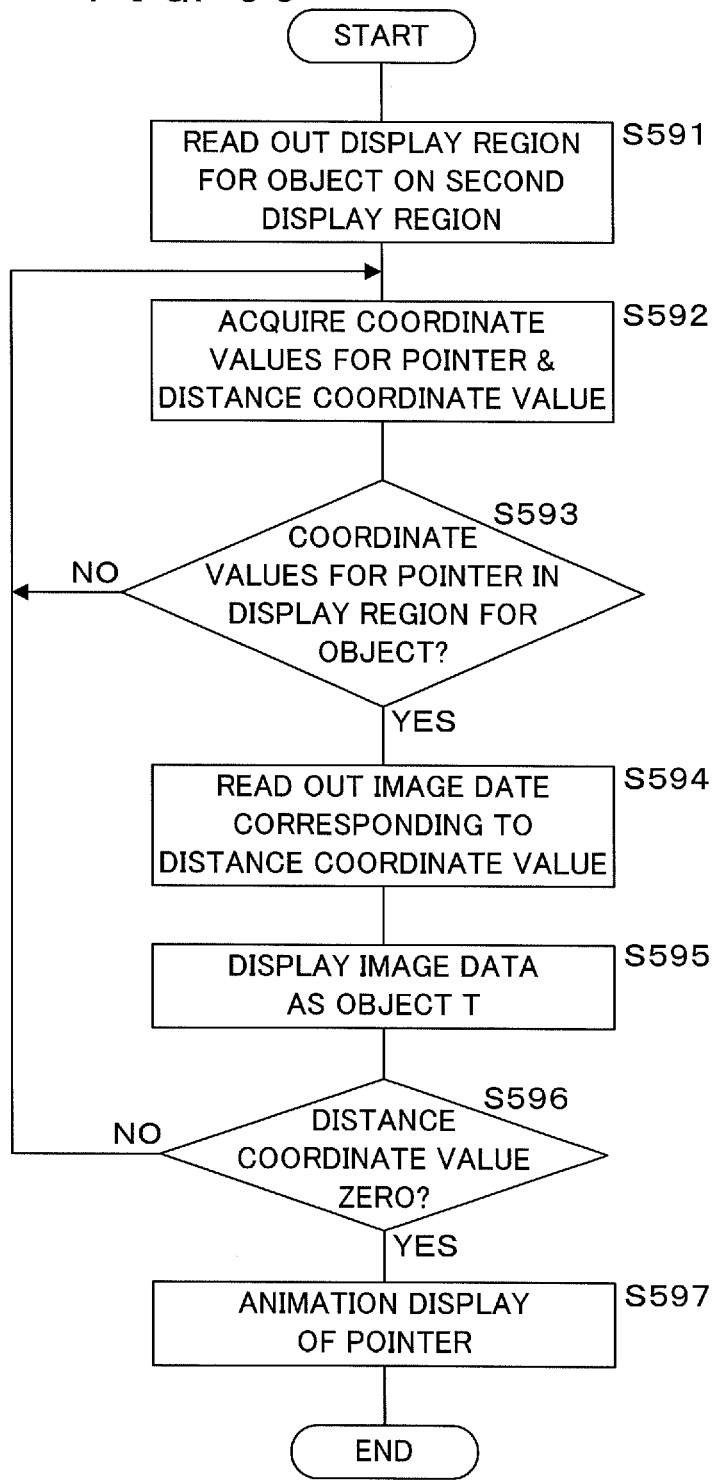

F I G. 6 0
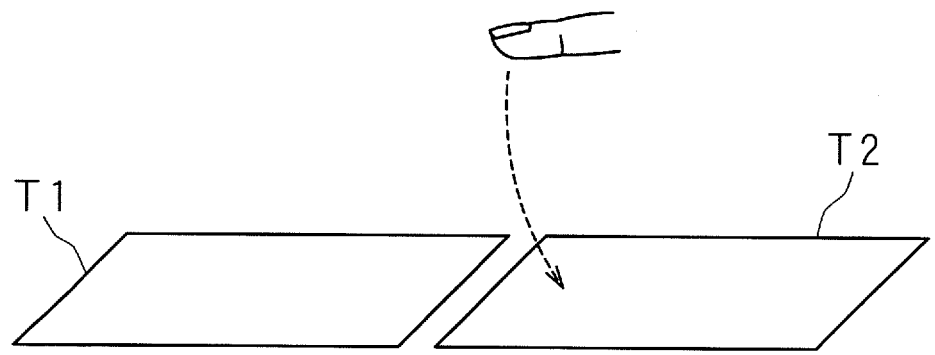

DISPLAY APPARATUS, INFORMATION PROCESSING SYSTEM, RECORDING MEDIUM AND TELEVISION RECEIVER

CROSS-REFERENCE TO RELATED APPLICATIONS

This application is the national phase under 35 U.S.C. §371 of PCT International Application No. PCT/JP2012/058813 which has an International filing date of Apr. 2, 2012 and designated the United States of America.

FIELD

The present invention relates to a display apparatus that displays information, an information processing system, a recording medium and a television receiver.

BACKGROUND AND SUMMARY

A display apparatus for a television, a personal computer or the like is operated with a remote controller. For example, a coordinate input apparatus described in Japanese Patent Application Laid-Open No. 2008-192012 discloses a technique for adjusting coordinates at the center of a contact region of a touch pad. In addition, a technique related to control processing for a touch pad and a touch panel is known (see Japanese Patent Application Laid-Open No. 2008-192012, Japanese Patent Application Laid-Open No. 2002-82766, Japanese Patent Application Laid-Open No. 2001-117713, Japanese Patent Application Laid-Open No. 1110-187322, Japanese Unexamined Patent Application Publication No. 2010-503125, Publication of United States Patent Application No. 2011/0279397, and Yuichi Okano and two others, "Three-Dimensional Touch Panel Capable of Detection by Proximity/Contact of Finger," Information Processing Society of Japan Technical Report, Jan. 26, 2009, p 9-p 14, for example).

The input technique disclosed in the conventional technology, however, has such a problem in that a user may not be provided with an operation environment in accordance with diversifying display apparatuses.

The present invention is made in view of the above circumstances. An object of the invention is to provide a display apparatus and the like capable of intuitively performing input processing for the display apparatus.

A display apparatus disclosed in the present invention displaying information includes: a reception unit wirelessly receiving a coordinate value associated with continuous contact input in an input apparatus having a touch pad or a touch panel; a display processing unit displaying on a display unit a pointer moving on a basis of the coordinate value received by the reception unit; and an output unit outputting, when the continuous contact input is finished, acceptance information indicating that an input for an object displayed on the display unit is accepted at a final coordinate value for the pointer displayed on the display unit.

In the display apparatus disclosed in the present invention, the output unit outputs acceptance information at the final coordinate value for the pointer displayed on the display unit, when finish information indicating that the continuous contact input is finished is received from the input apparatus.

In the display apparatus disclosed in the present invention, the output unit outputs acceptance information at the final coordinate value for the pointer displayed on the display unit, when a coordinate value associated with the continuous contact input is no longer received by the reception unit.

The display apparatus disclosed in the present invention further includes a change unit changing an indication of the pointer displayed on the display unit when the pointer is present in a predetermined range for a certain period of time.

In the display apparatus disclosed in the present invention, the output unit outputs acceptance information at the final coordinate value for the pointer displayed on the display unit, when the indication of the pointer is changed by the change unit and the continuous contact input is finished after the change.

The display apparatus disclosed in the present invention further includes a re-output unit outputting acceptance information again at the final coordinate value, when tap operation is accepted through the input apparatus within a predetermined period of time after the output unit outputs the acceptance information.

In the display apparatus disclosed in the present invention, the output unit outputs acceptance information at the final coordinate value when the continuous contact input is finished after the indication of the pointer is changed by the change unit and tap operation is accepted through the input apparatus within a predetermined period of time.

The display apparatus disclosed in the present invention further includes a stop unit stopping a display of acceptance information by the output unit, when the continuous contact input is finished before the change by the change unit.

In the display apparatus disclosed in the present invention, the output unit outputs acceptance information at the final coordinate value for the pointer displayed on the display unit when tap operation through the input apparatus is accepted within a predetermined period of time after the continuous contact input is finished.

In the display apparatus disclosed in the present invention, the output unit includes: a change unit changing the indication of the pointer after continuous contact input is finished; and an acceptance information output unit outputting acceptance information at the final coordinate value for the pointer displayed on the display unit, when tap operation is accepted through the input apparatus within a predetermined period of time after the indication of the pointer is changed by the change unit.

The display apparatus disclosed in the present invention further includes a re-output unit outputting acceptance information again at the final coordinate value, when tap operation is accepted through the input apparatus within a predetermined period of time after the acceptance information is output by the output unit.

The display apparatus disclosed in the present invention includes a stop unit stopping the output of the acceptance information when tap operation is accepted through the input apparatus within a predetermined period of time after the continuous contact input is finished.

The display apparatus disclosed in the present invention includes a stop unit stopping the output of the acceptance information when tap operation through the input apparatus is not accepted within a predetermined period of time after the indication of the pointer is changed by the change unit.

The display apparatus disclosed in the present invention includes a second display processing unit displaying, when the pointer moving in a first display region of the display unit resides in a predetermined region, the second display region superposed on the first display region, based on the coordinate value received by the reception unit.

In the display apparatus disclosed in the present invention, a coordinate on a touch pad or a touch panel of the input apparatus and a coordinate on a display unit of the display apparatus have a relationship of absolute coordinates.

In an information processing system disclosed in the present invention using an input apparatus having a touch pad or a touch panel and a display apparatus displaying information, the input apparatus includes a wireless output unit wirelessly outputting a coordinate value associated with a continuous contact input for a touch pad or a touch panel to the display apparatus, and the display apparatus includes: a reception unit wirelessly receiving the coordinate value associated with the continuous contact input output by the wireless output unit; a display processing unit displaying on a display unit a pointer moving on a basis of the coordinate value received by the reception unit; and an output unit outputting acceptance information indicating that an input for an object displayed on the display unit is accepted at a final coordinate value for the pointer displayed on the display unit, when the continuous contact input is finished.

In the information processing system disclosed in the present invention, the input apparatus includes a finish output unit wirelessly outputting, when the continuous input for the touch pad or touch panel is finished, finish information indicating that the input is finished, and the output unit outputs acceptance information at the final coordinate value for the pointer displayed on the display unit, when finish information is received wirelessly from the finish output unit.

In the information processing system disclosed in the present invention, the output unit outputs acceptance information at the final coordinate value for the pointer displayed on the display unit, when a coordinate value associated with the continuous contact input output from the wireless output unit is no longer received.

The information processing system disclosed in the present invention includes a change unit changing an indication of the pointer displayed on the display unit, when the pointer is present in a predetermined range for a certain period of time.

In the information processing system disclosed in the present invention, the output unit outputs acceptance information at the final coordinate value for the pointer displayed on the display unit, when the indication of the pointer is changed by the change unit and the continuous contact input is finished after the change.

In the information processing system disclosed in the present invention, the output unit outputs acceptance information at the final coordinate value for the pointer displayed on the display unit when tap operation is accepted through the input apparatus within a predetermined period of time after the continuous contact input is finished.

A program disclosed in the present invention making a computer having a control unit and a display unit display information, making the computer execute: an acquiring step of acquiring by the control unit a coordinate value output wirelessly and associated with a continuous contact input in an input apparatus having a touch pad or a touch panel; a display processing step of displaying on the display unit by the control unit a pointer moving on a basis of the coordinate value acquired at the acquiring step; and an outputting step of outputting by the control unit acceptance information indicating that an input for an object displayed on the display unit is accepted at a final coordinate value for a pointer displayed on the display unit, when the continuous contact input is finished.

In the program disclosed in the present invention, the outputting step outputs the acceptance information at the final coordinate value for the pointer displayed on the display unit, when finish information is acquired indicating that the continuous contact input is finished, which is output from the input apparatus.

In the program disclosed in the present invention, the outputting step outputs acceptance information at the final coordinate value for the pointer displayed on the display unit, when a coordinate value associated with the continuous contact input is no longer acquired by the acquiring step.

According to the present invention, a wireless output unit of an input apparatus wirelessly outputs a coordinate value associated with a continuous contact input for a touch pad or a touch panel to a display apparatus. A reception unit of the display apparatus wirelessly receives the coordinate value associated with the continuous contact input output by the wireless output unit. The display processing unit displays a pointer moving on the basis of the coordinate value received by the reception unit on the display unit. The output unit outputs, when the continuous contact input is finished, acceptance information indicating that an input for an object displayed on a display unit is accepted at the final coordinate value displayed by the display processing unit.

A display apparatus disclosed in the present invention includes: a reception unit receiving from an input apparatus having a touch pad or a touch panel a position in a planar direction on the touch pad or the touch panel and a distance from the touch pad or the touch panel to an indicator; a first display processing unit displaying in a first display region of a display unit a pointer moving on a basis of the position received by the reception unit, when the distance received by the reception unit is within a predetermined distance; and a second display processing unit displaying a second display region superposed on the first display region while displaying the pointer on the second display region, when the pointer resides in a predetermined region.

The display apparatus disclosed in the present invention includes an output unit outputting acceptance information indicating that an input for an object displayed on the second display region is accepted at the position of the pointer when the second display region is displayed by the second display processing unit and the distance received by the reception unit becomes zero.

The display apparatus disclosed in the present invention includes a third display processing unit displaying, when the pointer is present in a display region of the object displayed in the second display region, selection information indicating that the object is selected.

The display apparatus disclosed in the present invention includes an erase unit erasing the display of the second display region when the pointer is determined to be moved out of the predetermined region in a state where the second display region is displayed on the first display region by the second display processing unit.

The display apparatus disclosed in the present invention includes a fourth display processing unit displaying, when an object is displayed with a shape of a button in the second display region by the second display processing unit and when the pointer is present in the display region of the object, the object by changing a height of the button in accordance with the distance received by the reception unit.

The display apparatus disclosed in the present invention includes a read-out unit reading out from a storage unit display regions of a plurality of objects displayed in the second display region by the second display processing unit; a determination unit determining whether or not a position of the pointer is present in a display region; a period storage processing unit storing a period during which the pointer is determined by the determination unit to be present in a display region for one object; and an acceptance unit accepting, in a case where the distance received by the reception unit becomes zero, an input for the above-described one object when the period stored by the period storage processing unit is not less than a predetermined period.

A television receiver disclosed in the present invention is characterized by including: the display apparatus described above; and a broadcast reception unit receiving television broadcast. A video image is displayed on the display apparatus on a basis of the television broadcast received by the broadcast reception unit.

A program disclosed in the present invention making a computer execute processing of: receiving from an input apparatus having a touch pad or a touch panel a position in a planar direction on the touch pad or the touch panel and a distance from the touch pad or touch panel to an indicator; displaying a pointer moving on a basis of a received position in a first display region of a display unit when the received distance is within a predetermined distance; and displaying a second display region to be superposed on the first display region while displaying the pointer on the second display region, when the pointer resides in a predetermined region.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 2 is a block diagram illustrating a hardware group of a remote controller, FIG. 4 is an explanatory view illustrating coordinate values to be transmitted, FIG. 8 is a flowchart illustrating a procedure of change processing, FIG. 9A is an explanatory view illustrating a display image, FIG. 9B is an explanatory view illustrating a display image, FIG. 9C is an explanatory view illustrating a display image, FIG. 10 is a flowchart illustrating a procedure of change processing, FIG. 33 is a flowchart illustrating a procedure of moving rate lowering processing according to Embodiment 9, FIG. 35 is a flowchart illustrating a procedure of moving rate lowering processing according to Embodiment 10, FIG. 36 is a flowchart illustrating a procedure of moving rate lowering processing according to Embodiment 10, FIG. 40 is a schematic view illustrating an outline of an information processing system according to Embodiment 12, FIG. 43 is an explanatory view illustrating coordinate values to be transmitted, FIG. 45 is a flowchart illustrating a procedure of display processing for the second display region, FIG. 48 is an explanatory view illustrating a record layout of a region file, FIG. 57 is an explanatory view illustrating a record layout of an image file, FIG. 59 is a flowchart illustrating processing of changing a button shape, FIG. 60 is an explanatory view illustrating an operational image.

DETAILED DESCRIPTION OF NON-LIMITING EXAMPLE EMBODIMENTS

Embodiment 1

Figure 1:
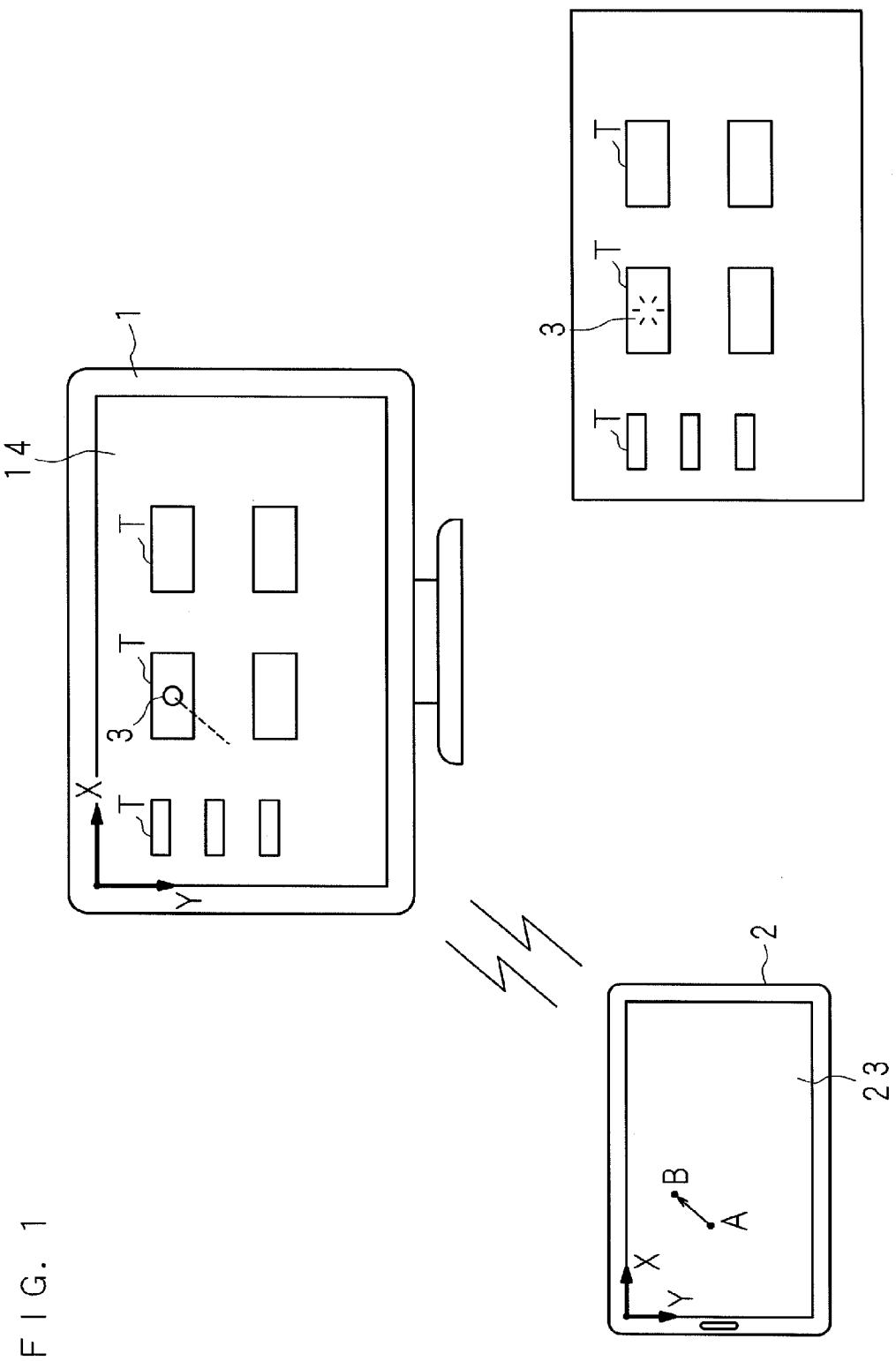
FIG. 1 is a schematic view illustrating an outline of an information processing system.

Embodiments will now be described below with reference to the drawings. FIG. 1 is a schematic view illustrating an outline of an information processing system. The information processing system includes a display apparatus 1, an input apparatus 2 and the like. The display apparatus 1 is, for example, a television, a television with a built-in recording device, a personal computer, or a computer for controlling medical equipment, a semiconductor manufacturing device, a working machine or the like. In the present embodiment, an example is described where a television 1 is used as the display apparatus 1. The input apparatus 2 is an apparatus having a touch pad or a touch panel, and functions as a remotely-operated device (hereinafter referred to as "remote controller") for the television 1. As the input apparatus 2, for example, in addition to a remote controller with touch pad formed on the surface of its housing, a PDA (Personal Digital Assistant) with a touch panel, a portable game machine, a mobile phone, a book reader or the like may be used. In the description below, an example is described where a remote controller 2 having a touch pad is used as the input apparatus 2.

On a display unit 14 of the television 1, several rectangular-shaped objects T are displayed. Each object T corresponds to an icon, an image, a hyperlink, a moving image or the like. A user uses a touch pad 23 of a remote controller 2 to select an object T. In the present embodiment, description will be made assuming that coordinates on the touch pad 23 of the remote controller 2 and coordinates on the display unit 14 of the television 1 have a relationship of absolute coordinates. They may, however, have a relationship of relative coordinates, though an example where the absolute coordinates are used is described in the present embodiment.

In the present embodiment, it is assumed that the origin of the coordinate axis of each of the touch pad 23 and the display unit 14 is the edge on the upper left side in the front view. Moreover, the direction from left to right is set as an X-axis positive direction, while the direction from top to bottom is set as a Y-axis positive direction. It is assumed here that the user performs contact input continuously from a point A to a point B on the touch pad 23. In other words, it is assumed that the user reaches the point B without releasing a finger all the way from the point A. A pointer 3 is displayed on the display unit 14, and the pointer 3 moves to a point on an object T in response to the continuous contact input. If the user desires to select the object T here, the user releases his/her finger from the touch pad 23 at the point B and thereby terminates the continuous contact input.

On the display unit 14, acceptance information is output indicating that the input for the object T is accepted at coordinate values corresponding to the point B. The output of acceptance information may, for example, be displayed by changing the shape, pattern, color of the pointer 3 or the combination of them, or be displayed by animation. Alternatively, the acceptance information may also be output by sound. In the present embodiment, an example is described where the pointer 3 is changed by animation display. Details will be described below.

FIG. 2 is a block diagram illustrating a hardware group of a remote controller 2. The remote controller 2 includes a CPU (Central Processing Unit) 21 as a control unit, a RAM (Random Access Memory) 22, a touch pad 23, a storage unit 25, a clock unit 28, a communication unit 26 and the like. The CPU 21 is connected to each of the hardware units via a bus 27. The CPU 21 controls each of the hardware units in accordance with a control program 25P stored in the storage unit 25. The RAM 22 is, for example, a SRAM (Static RAM), a DRAM (Dynamic RAM) or a flash memory. The RAM 22 also functions as a storage unit, and temporarily stores various data generated when the CPU 21 executes each of different programs.

The touch pad 23 employs an electrostatic capacitance system or a resistive membrane system, and outputs accepted operational information to the CPU 21. It is noted that an operation button (not illustrated) may also be provided in addition to the touch pad 23. The clock unit 28 outputs date and time information to the CPU 21. The communication unit 26 serving as a wireless output unit wirelessly transmits information such as a coordinate value to the television 1. As the communication unit 26, for example, a wireless LAN (Local Area Network) module, an infrared communication module or a Bluetooth (Registered Trademark) module is used. In the present embodiment, an example is described where the wireless LAN module is used to transmit/receive information to/from the television 1 through Wi-Fi (Wireless Fidelity: Registered Trademark). The storage unit 25 is, for example, a large-capacity flash memory or a hard disk, which stores the control program 25P.

Figure 3:
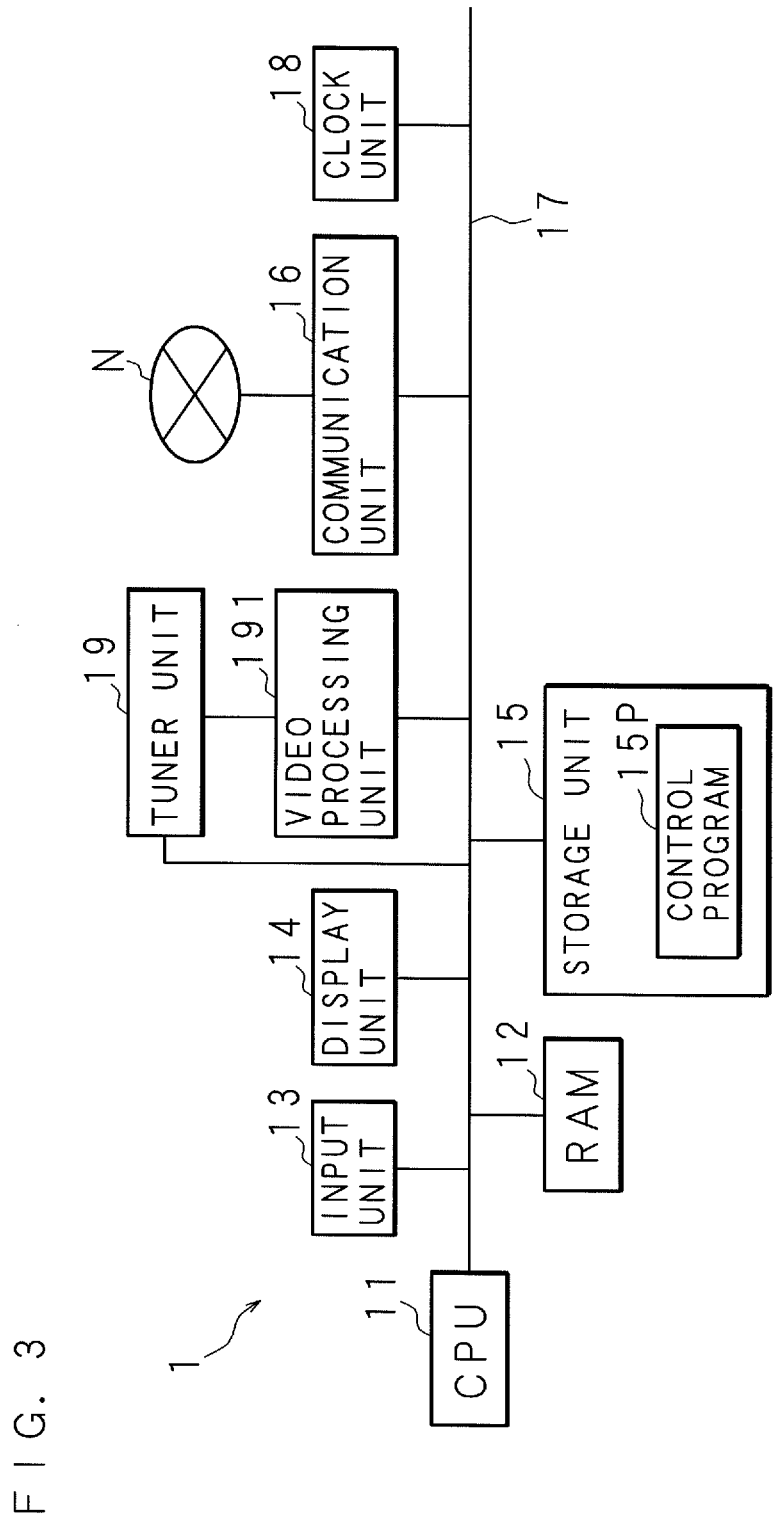
FIG. 3 is a block diagram illustrating a hardware group of a television.

FIG. 3 is a block diagram illustrating a hardware group of a television 1. The television 1 includes a CPU 11, a RAM 12, an input unit 13, a display unit 14, a storage unit 15, a clock unit 18, a tuner unit 19, a video processing unit 191, a communication unit 16 and the like. The CPU 11 is connected to each of the hardware units via a bus 17. The CPU 11 controls each of the hardware units in accordance with the control program 15P stored in the storage unit 15. The RAM 12 is, for example, a SRAM, a DRAM or a flash memory. The RAM 12 also functions as a storage unit, and temporality stores various data generated when the CPU 11 executes each of different programs.

The input unit 13 is an input device such as an operation button, which outputs accepted operational information to the CPU 11. The display unit 14 is a liquid-crystal display, a plasma display, an organic EL (electroluminescence) display or the like, which displays various kinds of information in accordance with an instruction of the CPU 11. The clock unit 18 outputs date and time information to the CPU 11. The communication unit 16 serving as a reception unit is a wireless LAN module, and transmits/receives information to/from the remote controller 2. It is noted that, as in the remote controller 2, an infrared communication module or a Bluetooth (Registered Trademark) module may be used as the communication unit 16. The storage unit 15 is, for example, a hard disk or a large-capacity flash memory, which stores the control program 15P.

The tuner unit 19 outputs a received video image signal concerning broadcast wave such as terrestrial digital wave, BS digital wave or the like to the video processing unit 191. The video processing unit 191 performs video image processing and outputs the processed video image to the display unit 14. Furthermore, the communication unit 16 transmits/receives information by HTTP (HyperText Transfer Protocol) through a communication network N such as the Internet to/from another server computer (not illustrated). The communication unit 16 outputs a Web page and contents such as a moving image file received from the server computer to the CPU 11. The CPU 11 displays a Web page on the display unit 14. In the example of FIG. 1, a Web page for menu is downloaded while the object T in the Web page is displayed.

FIG. 4 is an explanatory view illustrating coordinate values to be transmitted. The CPU 21 in the remote controller 2 transmits coordinate values associated with continuous contact input to the television 1 as a packet. The CPU 21 acquires coordinate values concerning a position of contact through the touch pad 23. The CPU 21 keeps transmitting the coordinate values continuously to the television 1 through the communication unit 26 until the contact is released, i.e., "non-contact" is detected. In the example of FIG. 4, coordinate values (100, 120) are detected as a contact start point. A series of coordinate values are transmitted, and the contact is released at coordinate values of (156, 84). The communication unit 16 of the television 1 receives coordinate values sequentially transmitted from the remote controller 2.

The CPU 11 acquires sequentially-transmitted coordinate values output from the communication unit 16 as coordinate values associated with continuous contact input. The CPU 11 converts the acquired coordinate values into coordinate values in a coordinate system in the display unit 14 based on a conversion equation stored in the storage unit 15. The CPU 11 displays the pointer 3 at a position corresponding to the coordinate values obtained after conversion. The CPU 11 reads out an animated image stored in the storage unit 15 when coordinate values are no longer received. The CPU 11 displays the pointer 3 concerning the animated image on the display unit 14 at a final display position of the pointer 3 in place of the pointer 3 indicated by a white circle.

Moreover, the CPU 21 of the remote controller 2 may, when non-contact is detected on the touch pad 23, transmit information indicating non-contact (hereinafter referred to as non-contact information) and coordinate values detected at the time point when contact is released, to the television 1 through the communication unit 26. In the example of FIG. 4, the final coordinates (156, 84) and the non-contact information are transmitted. An example of transmitting non-contact information will be described below. Software processing in the hardware configuration described above will now be described using flowcharts.

Figure 5:
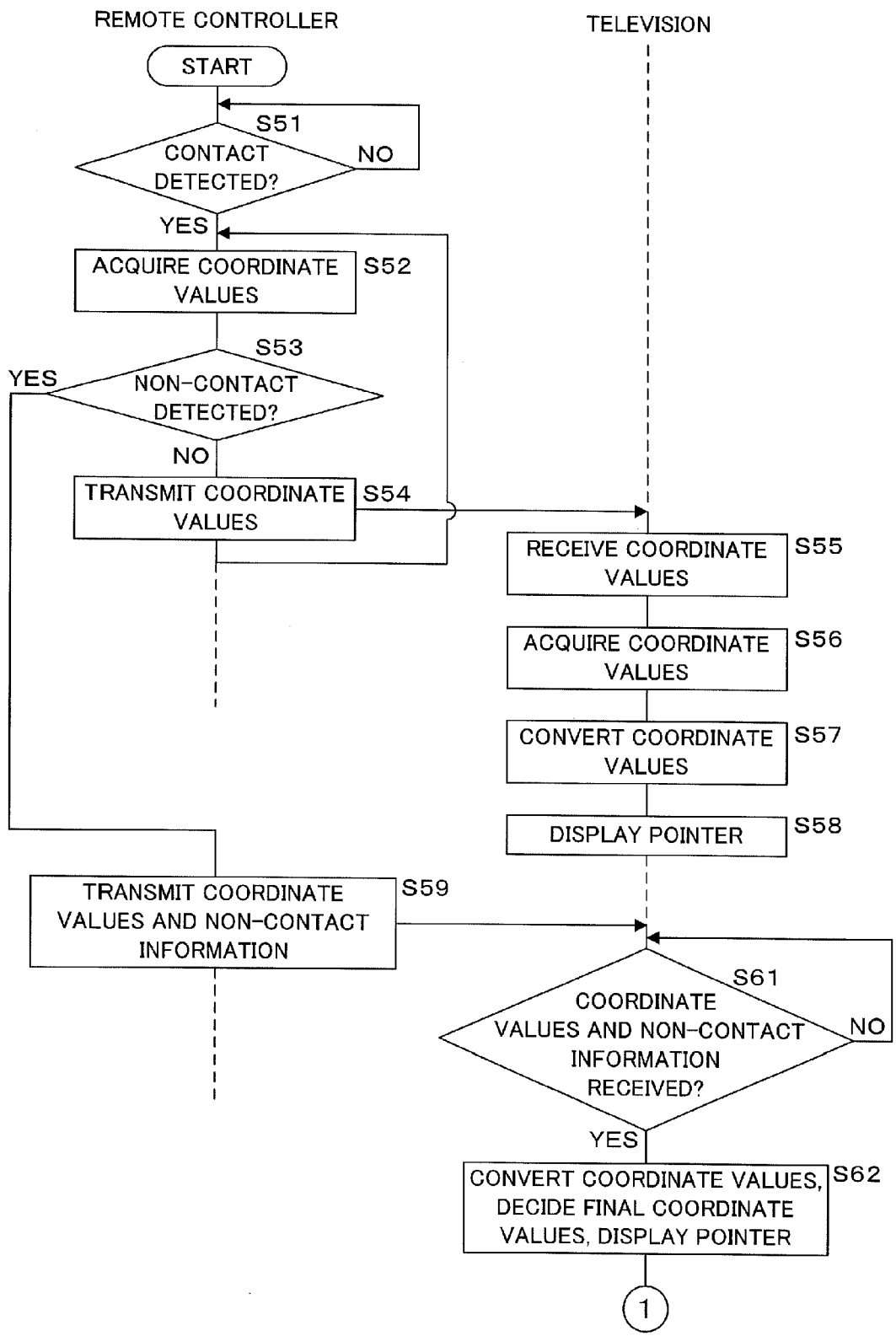
FIG. 5 is a flowchart illustrating a procedure of input processing.
Figure 6:
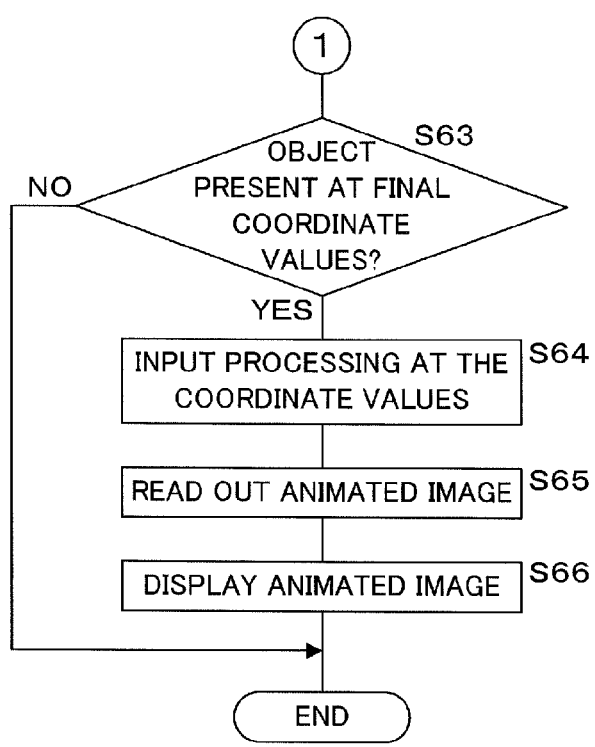
FIG. 6 is a flowchart illustrating a procedure of input processing.

FIGS. 5 and 6 illustrate a flowchart indicating a procedure of input processing. The CPU 21 of the remote controller 2 determines whether or not contact is detected through the touch pad 23 (step S51). If no contact is detected (NO at step S51), the CPU 21 waits until contact is detected. If contact is detected (YES at step S51), the CPU 21 acquires coordinate values at the position of contact (step S52). The CPU 21 determines whether or not non-contact is detected after contact is detected (step S53). More specifically, the CPU 21 detects whether or not a finger is released from the touch pad 23.

If it is determined that non-contact is not detected (NO at step S53), the CPU 21 transmits the acquired coordinate values to the television 1 through the communication unit 26 (step S54). The CPU 21 returns to step S52 and repeats the processing described above. Note that the remote controller 2 and the television 1 perform the processing in parallel. The CPU 11 of the television 1 receives the coordinate values transmitted wirelessly through the communication unit 16 (step S55). The CPU 11 acquires the coordinate values output from the communication unit 16 (step S56). The CPU 11 stores the acquired coordinate values in the storage unit 15, or converts them based on the conversion equation described in the control program 15P (step S57). It is noted that the conversion equation is defined in accordance with the number of pixels for the display unit 14 of the television 1, and is stored in the storage unit 15 at the time of factory shipment. In the case where, for example, the number of pixels for the display unit 14 in the X-axis direction is five times the number of pixels for the touch pad 23 in the X-axis direction, the CPU 11 multiplies the acquired X-coordinate values by five. Likewise, in the case where the number of pixels for the display unit 14 in the Y-axis direction is five times the number of pixels for the touch pad 23 in the Y-axis direction, the CPU 11 multiplies the acquired Y-coordinate values by five. Instead of using a conversion equation, a table stored in the storage unit 15 may also be used for conversion, which includes association between the coordinate values for the touch pad 23 and the coordinate values for the display unit 14. Here, the CPU 11 refers to the table and reads out coordinate values on the display unit 14 that correspond to the acquired coordinate values.

The CPU 11 sequentially stores the coordinate values obtained after conversion in time series. The CPU 11 reads out an image of the pointer 3 from the storage unit 15. The CPU 11 displays the pointer 3 on the display unit 14 at the position of the coordinate values obtained after conversion which is stored in the RAM 12 (step S58). By repeating the processing described above, the pointer 3 moves on the display unit 14 in response to continuous contact input. If it is determined that non-contact is detected (YES at step S53), the CPU 21 proceeds to step S59. The CPU 21 transmits the coordinate values and non-contact information acquired at step S52 to the television 1 through the communication unit 26 (step S59).

The CPU 11 of the television 1 determines whether or not coordinate values and non-contact information are received (step S61). If coordinate values and non-contact information are not received (NO at step S61), the CPU 11 waits until non-contact information is received. If it is determined that coordinate values and non-contact information are received (YES at step S61), the CPU 11 proceeds to step S62. The CPU 11 converts the coordinate values received at step S61, decides the values as the final coordinate values for the pointer 3, and displays the pointer 3 at the decided coordinate values (step S62). It is noted that the CPU 11 may also reads out the coordinate values stored last in time series in the RAM 12 and decides the values as the final coordinate values. In the case where non-contact information is not transmitted, the CPU 11 may determine as non-contact when no coordinate values are received within a predetermined time period (0.1 ms, for example) from the previous reception of coordinate values. In such a case, the last coordinate values in time series stored in the RAM 12 are set as the final coordinate values.

The CPU 11 determines whether or not the object T is present on the last coordinate values (step S63). More specifically, the CPU 11 reads out a coordinate region assigned in advance to the object T from the storage unit 15. The CPU 11 determines that the object T is present when the last coordinate values are within the coordinate region of the object T. If it is determined that the object T is present (YES at step S63), the CPU 11 performs input processing for the object T at the final coordinate values (step S64). The CPU 11 reads out an animated image from the storage unit 15 (step S65). The CPU 11 displays the animated image on the display unit 14 as an image of the pointer 3 (step S66). Accordingly, at the final coordinate values for the pointer 3, the CPU 11 displays on the display unit 14 the animated image in which the pointer 3 changes its form, as acceptance information indicating that the input (selection) for the object T is accepted. Note that the display of acceptance information is a mere example, and is not limited thereto as long as the displayed form of the pointer 3 is different between the time when the pointer 3 moves in response to contact input and the time of input operation for the object T in response to non-contact operation. For example, the pointer may be indicated by a white arrow when moved, and by a black arrow at the time of input operation for the object T associated with non-contact. Alternatively, for example, the pointer 3 may continuously be indicated by a white arrow, while sound may be output as input information from a speaker (not illustrated) at the time of input operation for the object T through non-contact. If it is determined that the object T is not present at the final coordinate values (NO at step S63), the CPU 11 skips the processing from steps S64 through S66. Here, the image of the pointer 3 may be erased or left as it is. This allows the user to intuitively select the object T while watching the television 1 without looking at the touch pad 23 at hand.

Embodiment 2

Figure 7:
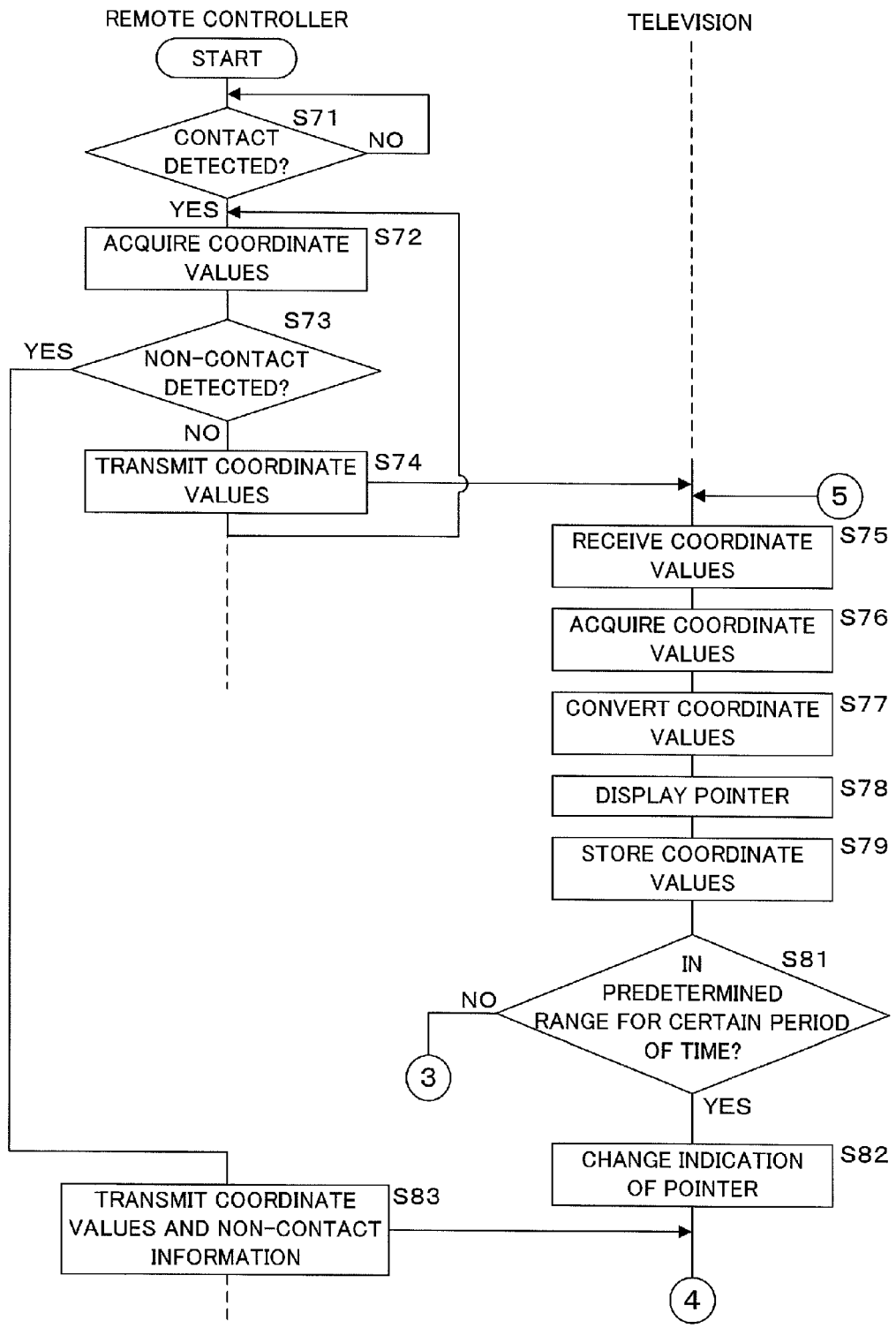
FIG. 7 is a flowchart illustrating a procedure of change processing.

Embodiment 2 relates to an example where the indication of the pointer 3 is changed. FIGS. 7 and 8 illustrate a flowchart indicating a procedure of change processing. The CPU 21 in the remote controller 2 determines whether or not contact is detected through the touch pad 23 (step S71). If contact is not detected (NO at step S71), the CPU 21 waits until contact is detected. If contact is detected (YES at step S71), the CPU 21 acquires coordinate values at the position of contact (step S72). The CPU 21 determines whether or not non-contact is detected after contact is detected (step S73).

If it is determined that non-contact is not detected (NO at step S73), the CPU 21 transmits the acquired coordinate values to the television 1 through the communication unit 26 (step S74). The CPU 21 returns to step S72 and repeats processing described above. The CPU 11 of the television 1 receives coordinate values transmitted wirelessly through the communication unit 16 (step S75). The CPU 11 acquires the coordinate values output from the communication unit 16 (step S76). The CPU 11 converts the acquired coordinate values based on the conversion equation stored in the storage unit 15 or described in the control program 15P (step S77). The CPU 11 reads out an image of the pointer 3 from the storage unit 15. The CPU 11 displays the pointer 3 on the display unit 14 at the position of the coordinate values obtained after conversion (step S78). The pointer 3 may have a shape of, for example, a circle, a triangle, an arrow or a hand. The pointer 3 of a white circle is described in the present embodiment.

FIGS. 9A to 9C are explanatory views illustrating display images. In FIG. 9A, the pointer 3 indicated by a white circle is displayed on an object T. The CPU 11 stores in time series the coordinate values obtained by conversion at step S77 in the RAM 12 (step S79). Note that the coordinate values before conversion may also be stored. The CPU 11 determines whether or not the pointer 3 is present within a predetermined range for a certain period of time (step S81). For example, the CPU 11 reads out a group of coordinate values corresponding to a predetermined number of seconds (one second, for example) stored in the RAM 12. It is noted that the number of coordinate values for one second differs depending on the sampling frequency for the touch pad 23. The CPU 11 obtains the variance of coordinate values for each of the X-axis and Y-axis, and may determine that the pointer 3 is present in a predetermined range for a certain period of time when the obtained variance is not more than threshold for the X-axis and not more than threshold for the Y-axis that are stored in the storage unit 15.

Furthermore, the CPU 11 reads out coordinate values for a predetermined number of seconds in time series and obtains the sum of distances between the read-out coordinate values. In other words, the distance the pointer 3 is moved in a predetermined number of seconds is calculated. The CPU 11 may then determine that the pointer 3 is within the predetermined range if the obtained sum is not more than the threshold stored in the storage unit 15. In addition, the CPU 11 obtains the mean of coordinate values for a predetermined number of seconds. The CPU 11 reads out a threshold radius from the storage unit 15. The CPU 11 determines whether or not each of the coordinate values for a predetermined number of seconds is within the threshold radius with its center being set as the coordinate values concerning the mean. When all the coordinate values are present within the threshold radius, the CPU 11 may determine that the pointer 3 is within a predetermined range for a certain period of time. If it is determined that the pointer 3 is not present within a predetermined range for a certain period of time (NO at step S81), the CPU 11 proceeds to step S8100. If it is determined that the pointer 3 is present within a predetermined range for a certain period of time (YES at step S81), the CPU 11 proceeds to step S82. The CPU 11 changes the indication of the pointer 3 (step S82). In FIG. 9B, it may be understood that the indication of the pointer 3 is changed from a white circle to a black circle. The indication of the pointer 3 is not limited to this form but may be any form for which a difference between before and after a change can be recognized. For example, the color or patter of the pointer may be changed. Alternatively, the CPU 11 may output sound from a speaker (not illustrated).

If it is determined that non-contact is detected (YES at step S73), the CPU 21 of the remote controller 2 proceeds to step S83. The CPU 21 transmits the acquired coordinate values and non-contact information acquired at step S72 to the television 1 through the communication unit 26 (step S83).

The CPU 11 of the television 1 determines whether or not coordinate values and non-contact information are received (step S84). If the non-contact information is not received (NO at step S84), the CPU 11 proceeds to step S85. The CPU 11 converts the coordinate values transmitted from the communication unit 26 of the remote controller 2 and monitors the values, and determines whether or not the coordinate values after conversion have moved from the coordinate values at the position where indication is changed at step S82 to the outside of a predetermined range (step S85). More specifically, the CPU 11 obtains a distance between the coordinate values after conversion and the coordinate values for the pointer 3 after change which is last stored in the RAM 12, and may determine that the pointer 3 has moved out of a predetermined range if the distance exceeds the threshold stored in the storage unit 15. It is noted that the predetermined range at step S85 may be larger than that at step S81.

If it is determined that the pointer 3 has moved out of the predetermined range (YES at step S85), the CPU 11 returns to step S75 so as to return the pointer to the form before change. If it is determined that the pointer 3 has not moved out of the predetermined range (NO at step S85), the CPU 11 returns to step S84. If it is determined that the coordinate values and non-contact information are received (YES at step S84), the CPU 11 proceeds to step S86. It is noted that the CPU 11 may proceed to step S86 when coordinate values are no longer received after receiving coordinate values at step S75. The CPU 11 reads out through the communication unit 16 the last coordinate values in time series stored in the RAM 12 at step S79 as coordinate values for the pointer 3. The CPU 11 decides the read-out coordinate values as the final coordinate values (step S86). It is noted that the CPU 11 may convert the coordinate values received at step S84 and sets the coordinate values after conversion as the final coordinate values.

The CPU 11 determines whether or not the object T is present on the final coordinate values (step S87). If it is determined that the object T is present (YES at step S87), the CPU 11 performs input processing for the object T at the final coordinate values (step S88). The CPU 11 reads out an animated image from the storage unit 15 (step S89). The CPU 11 displays the animated image on the display unit 14 as an image of the pointer 3 (step S810). FIG. 9C illustrates an example where the pointer 3 is displayed by an animated image. FIGS. 9A to C illustrate animated images of the pointer 3 showing the process in which several lines spread toward the outer periphery in a stepwise manner from the pointer 3 of a black circle for which the indication has changed. Note that the illustrated animated image is a mere example and is not limited thereto.

If it is determined that the object T is not present at the final coordinate values (NO at step S87), the CPU 11 erases the pointer 3 from the display unit 14 (step S811). This allows the user to check the position of input by the pointer 3, and to perform non-contact operation after confirming an approximate position. If it is determined at step S81 that the pointer 3 is not in a predetermined range for a certain period of time (NO at step S81), the CPU 11 determines whether or not the coordinate values and non-contact information are received (step S8100). If the coordinate values and non-contact information are not received (NO at step S8100), the CPU 11 returns to step S75. If the coordinate values and non-contact information are received (YES at step S8100), the CPU 11 proceeds to step S811. Accordingly, when contact is released before the indication of the pointer 3 is changed, the animated image of the pointer 3 is not displayed and the display of the acceptance information is stopped.

Figure 11:
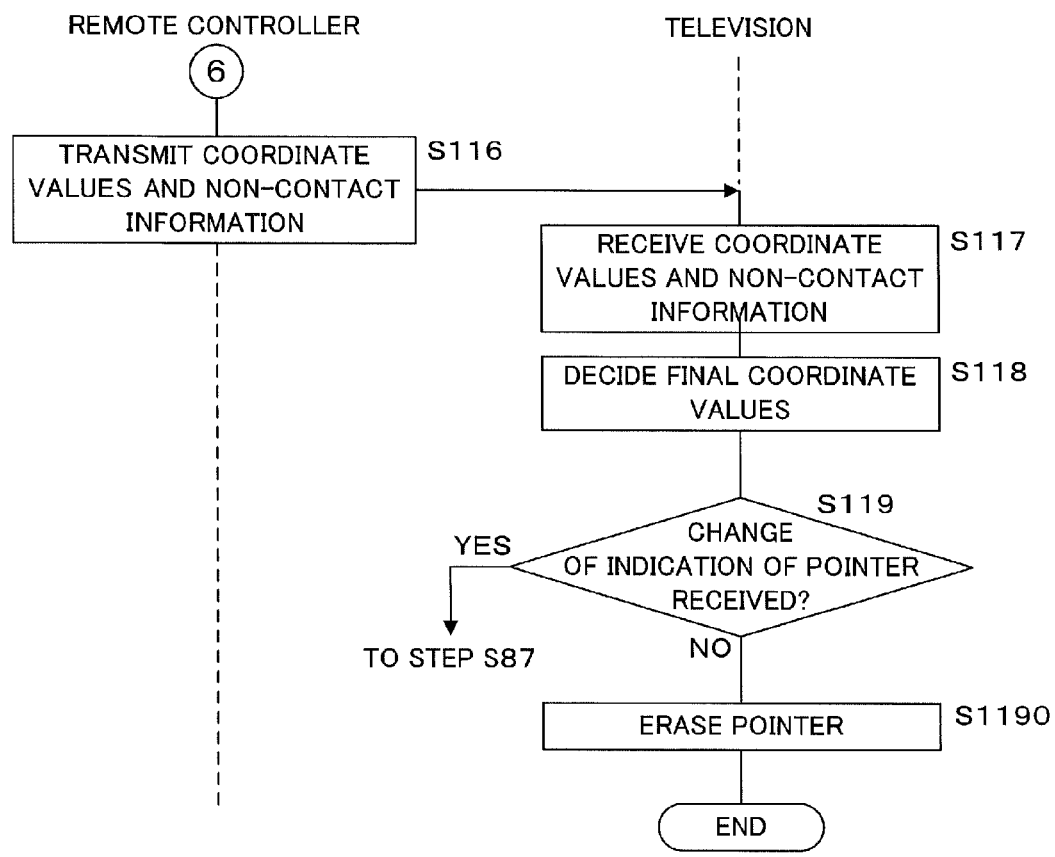
FIG. 11 is a flowchart illustrating a procedure of change processing.

A part of the processing described with reference to FIGS. 7 and 8 may also be executed at the remote controller 2 side. FIGS. 10 and 11 illustrate a flowchart indicating a procedure of change processing. The CPU 21 of the remote controller 2 determines whether or not contact is detected through the touch pad 23 (step S101). If contact is not detected (NO at step S101), the CPU 21 waits until contact is detected. If contact is detected (YES at step S101), the CPU 21 acquires coordinate values at the position of contact (step S102). The CPU 21 determines whether or not non-contact is detected after detection of contact (step S103).

If it is determined that non-contact is detected (NO at step S103), the CPU 21 transmits the acquired coordinate values to the television 1 through the communication unit 26 (step S104). The CPU 11 of the television 1 receives and acquires the coordinate values transmitted wirelessly through the communication unit 16 (step S105). The CPU 11 converts the acquired coordinate values based on a conversion equation (step S106). The CPU 11 reads out an image of the pointer 3 from the storage unit 15. The CPU 11 displays the pointer 3 at the position of the coordinate values after conversion on the display unit 14 (step S107). The CPU 11 stores the coordinate values after conversion in the RAM 12 in time series.

The CPU 21 of the remote controller 2 stores the coordinate values transmitted at step S104 in time series in the RAM 22 (step S108). The CPU 21 determines whether or not the pointer 3 is present in a predetermined range for a certain period of time (step S109). More specifically, the determination may be made based on the variance or the moving distance of the coordinate values stored in the RAM 22, as described above. If it is determined that the pointer 3 is not present in the predetermined range for the certain period of time (NO at step S109), the CPU 21 returns to step S102. If it is determined that the pointer 3 is present in the predetermined range for the certain period of time (YES at step S109), the CPU 21 proceeds to step S111. The CPU 21 transmits an instruction for changing indication of the pointer 3 to the television 1 (step S111). The CPU 11 of the television 1 changes the indication of the pointer 3 when the instruction for changing indication is received (step S112).

The CPU 21 of the remote controller 2 continues to acquire coordinate values (step S113). The CPU 21 determines whether or not the acquired coordinate values are outside the predetermined range (step S114). More specifically, the CPU 21 obtains the distance between the acquired coordinate values and the coordinate values obtained when the instruction for changing the indication of the pointer 3 is given at step S11. The CPU 21 may determine that the pointer 3 is outside the predetermined range when the obtained distance is not less than the threshold stored in the storage unit 25. If it is determined that the pointer 3 is outside the predetermined range (YES at step S114), the CPU 21 returns to step S102. Accordingly, when the pointer 3 moves out of the predetermined range after its color is changed, the pointer 3 returns from the black circle after the change to the white circle before the change. It is noted that the predetermined range at step S114 may be larger than the predetermined range at step S109.

If it is determined that the pointer 3 is not outside the predetermined range (NO at step S114), the CPU 21 proceeds to step S115. The CPU 21 determines whether or not non-contact is detected (step S115). If non-contact is not detected (NO at step S115), the CPU 21 returns to step S113. When non-contact is detected at step S103 (YES at step S103), the CPU 21 proceeds to step S116. Likewise, if non-contact is detected at step S115 (YES at step S115), the CPU 21 proceeds to step S116.

The CPU 21 transmits coordinate values and non-contact information detected at the time of non-contact to the television 1 (step S116). The CPU 11 in the television 1 receives coordinate values and the non-contact information (step S117). The CPU 11 reads out the last coordinate values in time series from the RAM 12 as the coordinate values for the pointer 3, and decides the values as the final coordinate values (step S118). It is noted that the CPU 11 may convert the coordinate values received at step S117 and decide the coordinate values after conversion as the final coordinate values. The CPU 11 determines whether or not the change of indication of the pointer 3 at step 112 is received (step S119). If it is determined that the change of indication is not received (NO at step S119), the display of the pointer 3 is erased from the display unit 14 so as to stop the display of acceptance information (step S1190). If it is determined that the change of indication of the pointer 3 is received (YES at step S119), the CPU 11 proceeds to step S87. The subsequent processing will not be described in detail, since it is similar to step S87.

Embodiment 2 is as described above and the other configuration parts are similar to those in Embodiment 1. Corresponding parts are therefore denoted by the same reference numbers and will not be described in detail.

Embodiment 3

Figure 12:
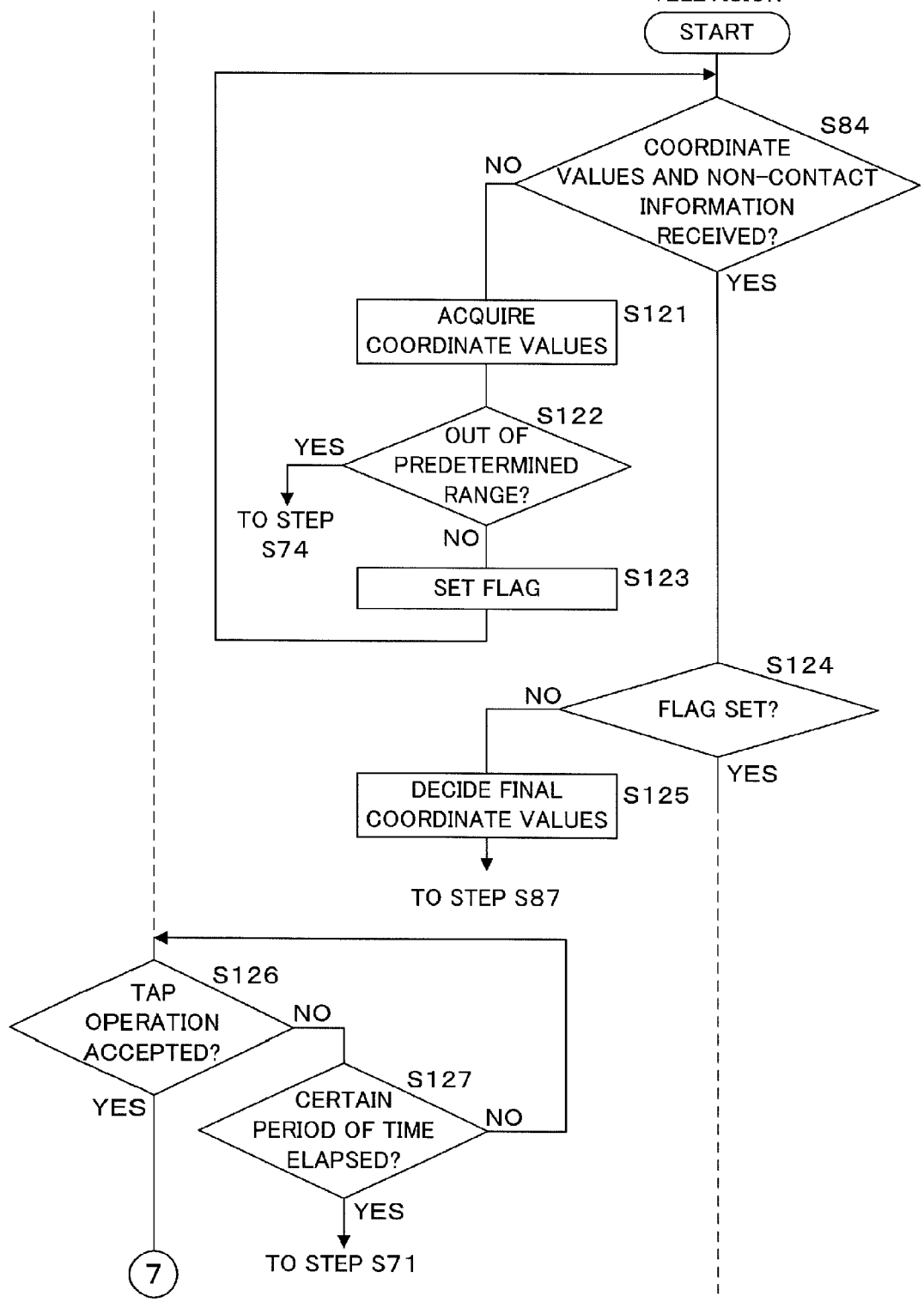
FIG. 12 is a flowchart illustrating a procedure of display processing according to Embodiment 3.
Figure 13:
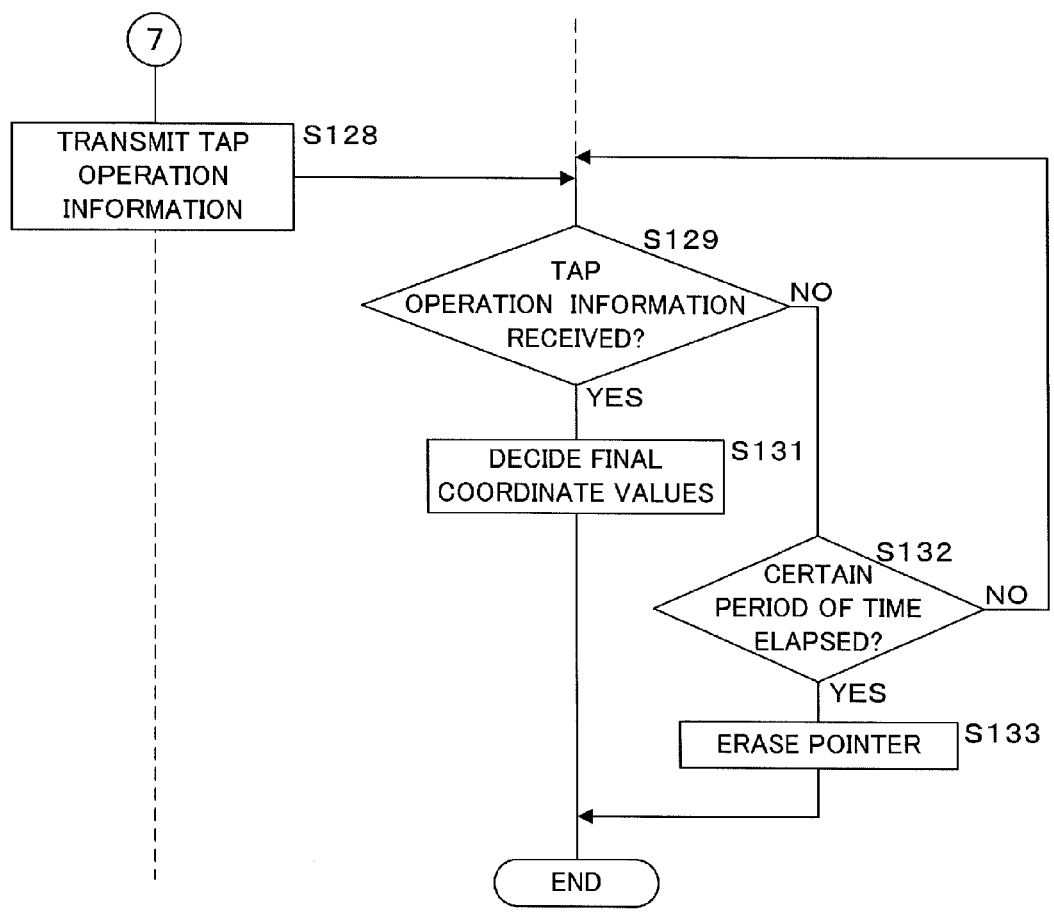
FIG. 13 is a flowchart illustrating a procedure of display processing according to Embodiment 3.

Embodiment 3 relates to an example in which tap input is performed after the processing of changing the pointer 3. After changing the pointer 3, tap operation may be performed for input processing. FIGS. 12 and 13 illustrate a flowchart indicating a procedure of display processing according to Embodiment 3. Since the processing from steps S71 through S84 is similar to that described earlier, details thereof will not be described here. If it is determined that coordinate values and non-contact information are not received (NO at step S84), the CPU 11 proceeds to step S121. The CPU 11 acquires coordinate values transmitted from the remote controller 2 (step S121). The CPU 11 determines whether or not the acquired coordinate values are out of a predetermined range (step S122). More specifically, it is determined whether or not the difference between the coordinate values for the pointer 3 changed at step S82 and the coordinate values acquired at step S121 exceeds the threshold stored in the storage unit 15. It is noted that the predetermined range at step S81 is assumed to be smaller than the predetermined range at step S122.

If it is determined that the coordinate values are out of the predetermined range (YES at step S122), the CPU 11 returns to step S74. This may cancel the processing of changing the pointer 3. If it is determined that the coordinate values are not out of the predetermined range (NO at step S122), the CPU 11 sets a flag (step S123). The CPU 11 subsequently returns to step S84. If it is determined that coordinate values and non-contact information are received (YES at step S84), the CPU 11 proceeds to step S124.

The CPU 11 determines whether or not a flag is set (step S124). If it is determined that a flag is not set (NO at step S124), the CPU 11 proceeds to step S125. The CPU 11 reads out the last coordinate values in time series stored in the RAM 12 at step S79 as the final coordinate values for the pointer 3. The CPU 11 decides the read-out coordinate values as the final coordinate values (step S125). Note that the subsequent processing will not be described in detail, since it is similar to step S87.

The user may perform input processing by conducting tap operation on the touch pad 23 even if a finger is slightly moved at the stage where the pointer 3 is changing its color. If it is determined that a flag is set (YES at step S124), the CPU 11 proceeds to step S129. The CPU 21 of the remote controller 2 determines whether or not tap operation is accepted (step S126). More specifically, the CPU 21 determines that the tap operation is performed when both the contact and non-contact are detected in a predetermined region within a predetermined period of time (within 0.1 seconds, for example).

If the tap operation is not accepted (NO at step S126), the CPU 21 determines whether or not a certain period of time (three seconds, for example) that is stored in the storage unit 15 has elapsed since non-contact information is transmitted at step S83 (step S127). If it is determined that the certain period of time has not elapsed (NO at S127), the CPU 21 returns to step S126. If it is determined that the certain period of time has elapsed (YES at step S127), the CPU 21 returns to step S71.

If it is determined that tap operation is accepted (YES at step S126), the CPU 21 transmits tap operation information, indicating that tap operation is executed, to the television 1 (step S128). The CPU 11 of the television 1 determines whether or not the tap operation information is received (step S129). If tap operation information is not received (NO at step S129), the CPU 11 proceeds to step S132. The CPU 11 refers to an output of the clock unit 18 and determines whether or not a certain period of time has elapsed since non-contact information is received at step S84 (step S132). If it is determined that a certain period of time has not elapsed (NO at step S132), the CPU 11 returns to step S129. If it is determined that a certain period of time has elapsed (YES at step S132), the CPU 11 erases the indication of the pointer 13 from the display unit 14 (step S133). If tap operation information is received (YES at step S129), the CPU 11 proceeds to step S131. The CPU 11 reads out the last coordinate values in time series stored in RAM 12 at step S79 as the final coordinate values for the pointer 3. The CPU 11 decides the read-out coordinate values as the final coordinate values (step S131). The subsequent processing will not be described in detail, since it is similar to step S87.

Figure 14:
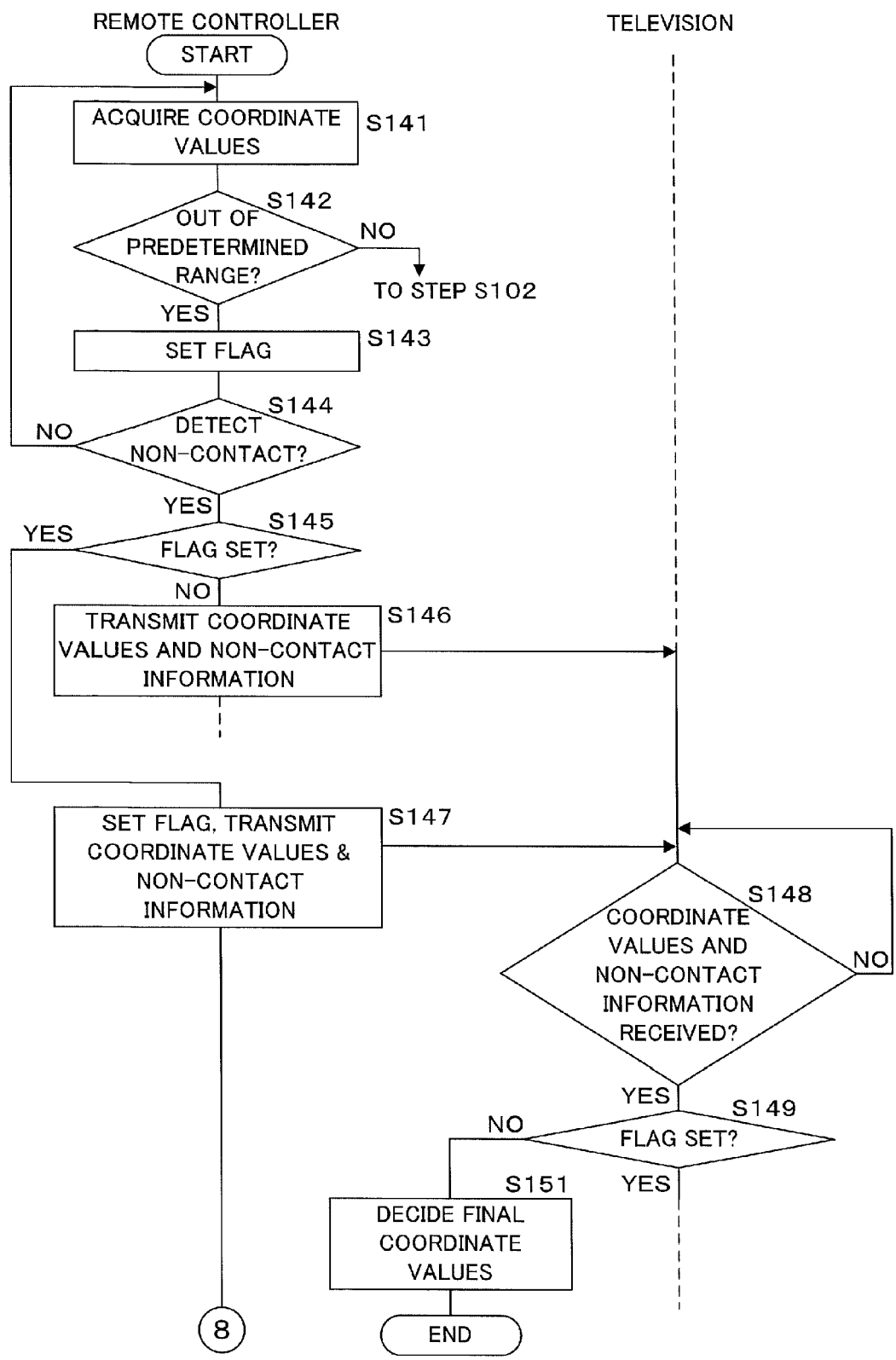
FIG. 14 is a flowchart illustrating a procedure of display processing according to Embodiment 3.
Figure 15:
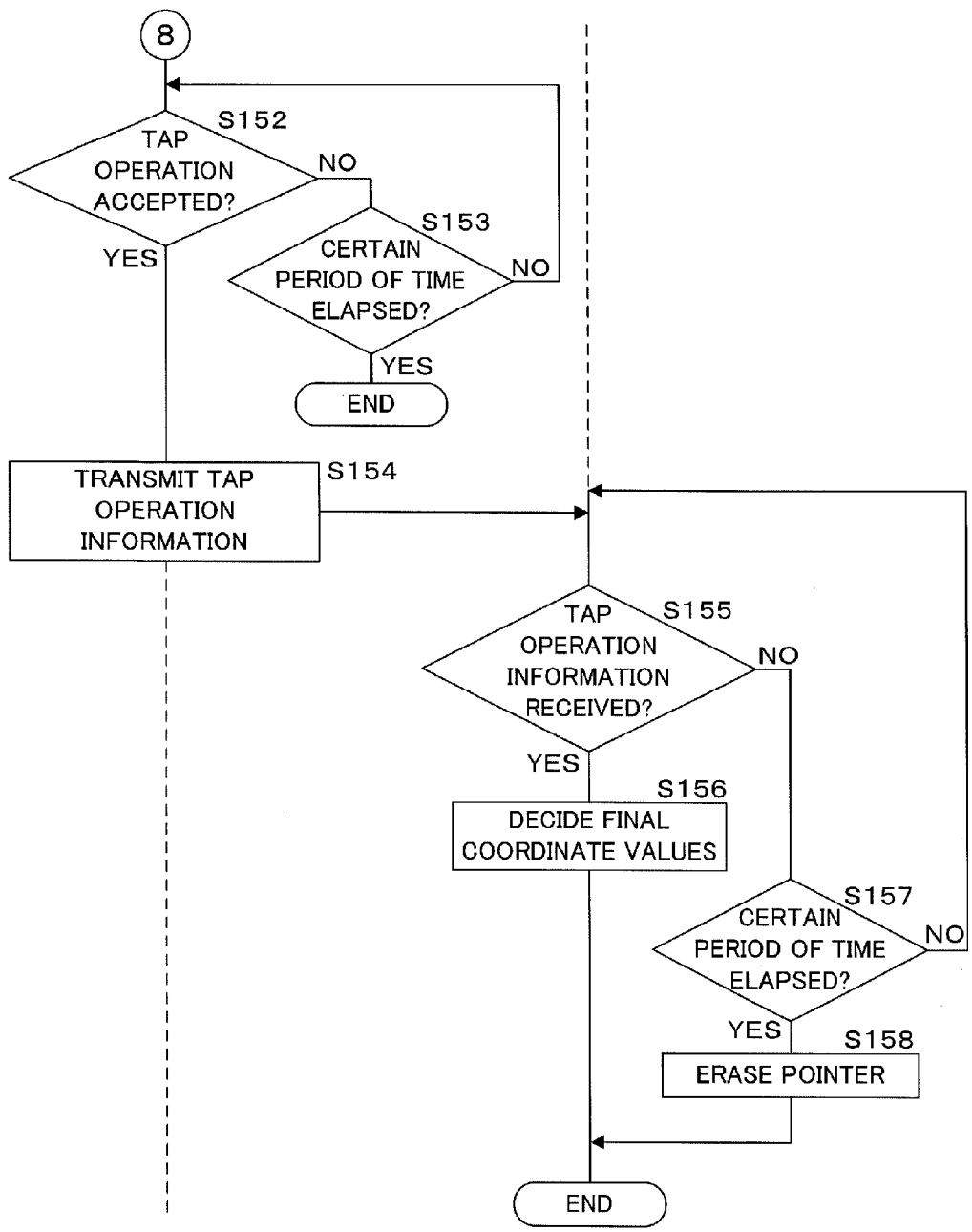
FIG. 15 is a flowchart illustrating a procedure of display processing according to Embodiment 3.

FIGS. 14 and 15 illustrate a flowchart indicating a procedure of display processing according to Embodiment 3. A part of the processing described with reference to FIGS. 12 and 13 may also be executed at the remote controller 2 side as described below. Since the processing from steps S101 through S112 in FIG. 10 is similar to that described earlier, details thereof will not be described here. The CPU 21 acquires coordinate values from the touch pad 23 (step S141). The CPU 21 determines whether or not the acquired coordinate values are out of a predetermined range stored in the storage unit 25 (step S142). More specifically, the CPU 21 calculates a distance between the coordinate values obtained when an instruction for changing the pointer 3 is transmitted at step S111 and the coordinate values acquired at step S141. The CPU 21 determines whether or not the calculated distance exceeds a predetermined distance stored in the storage unit 25. It is noted that the predetermined range at step S142 may be set larger than the predetermined range at step S109.

If it is determined that the coordinate values are not out of the predetermined range (NO at step S142), the CPU 21 returns to step S102. The CPU 21 transmits information indicating that the instruction for changing indication of the pointer 3 transmitted at step S111 is canceled to the television 1. The CPU 11 returns the indication of the pointer 3 to the one before change. If, on the other hand, it is determined that the CPU 21 is out of the predetermined range (YES at step S142), the CPU 21 sets a flag (step S143). The CPU 21 determines whether or not non-contact is detected from the touch pad 23 (step S144). If it is determined that non-contact is not detected (NO at step S144), the CPU 21 returns to step S141.

If non-contact is detected (YES at step S144), the CPU 21 proceeds to step S145. The CPU 21 determines whether or not a flag is set (step S145). If it is determined that a flag is not set (NO at step S145), the CPU 21 transmits the final coordinate values and non-contact information, obtained when the instruction for changing indication of the pointer 3 is transmitted at step S111, to the television 1 (step S146). If it is determined that a flag is set (YES at step S145), the CPU 21 transmits information related to flag setting and the final coordinate values and non-contact information, obtained when the instruction for changing indication of the pointer 3 is transmitted at step S11, to the television 1 (step S147).

The CPU 11 of the television 1 determines whether or not coordinate values and non-contact information are received (step S148). If it is determined that the coordinate values and non-contact information are not received (NO at step S148), the CPU 11 waits until it receives them. If it is determined that the coordinate values and non-contact information are received (YES at step S148), the CPU 11 determines whether or not a flag is set (step S149). More specifically, the CPU 21 makes the determination based on whether or not the information related to flag setting is received from the remote controller 2.

If it is determined that a flag is not set (NO at step S149), the CPU 11 proceeds to step S151. The CPU 11 reads out the last coordinate values in time series stored in the RAM 12 at step S79 as the final coordinate values. The CPU 11 decides the read-out coordinate values as the final coordinate values (step S151). Since the subsequent processing is similar to step S87, detailed description thereof will not be described here.

If it is determined that a flag is set (YES at step S149), the CPU 11 proceeds to step S155. The CPU 21 of the remote controller 2 determines whether or not tap operation is accepted (step S152). If tap operation is not accepted (NO at step S152), the CPU 21 determines whether or not a certain period of time (three seconds, for example) that is stored in the storage unit 15 has elapsed since non-contact information is transmitted at step S147 (step S153). If it is determined that a certain period of time has not elapsed (NO at step S153), the CPU 21 returns to step S152. If it is determined that a certain period of time has elapsed (YES at step S153), the CPU 21 returns to step S101.

If it is determined that tap operation is accepted (YES at step S152), the CPU 21 transmits tap operation information indicating that tap operation is executed to the television 1 (step S154). The CPU 11 of the television 1 determines whether or not tap operation information is received (step S155). If tap operation information is not received (NO at step S155), the CPU 11 proceeds to step S157. The CPU 11 determines whether or not a certain period of time has elapsed since non-contact information is received at step S148 (step S157). If it is determined that a certain period of time has not elapsed (NO at step S157), the CPU 11 returns to step S155. If it is determined that a certain period of time has elapsed (YES at step S157), the CPU 11 erases the pointer 3 from the display unit 14 (step S158). If tap operation information is received (YES at step S155), the CPU 11 proceeds to step S156. The CPU 11 reads out the last coordinate values in time series stored in the RAM 12 at step S79 as the final coordinate values for the pointer 3. The CPU 11 decides the read-out coordinate values as the final coordinate values (step S156). The subsequent processing will not be described in detail, since it is similar to step S87. This allows the user to perform input by tap operation even in the case where the user wishes to input again after moving the already-changed pointer 3 and making it non-contact.

Embodiment 3 is as described above and the other configuration parts thereof are similar to those in Embodiments 1 and 2. Corresponding parts are therefore denoted by the same reference numbers and will not be described in detail.

Embodiment 4

Figure 16:
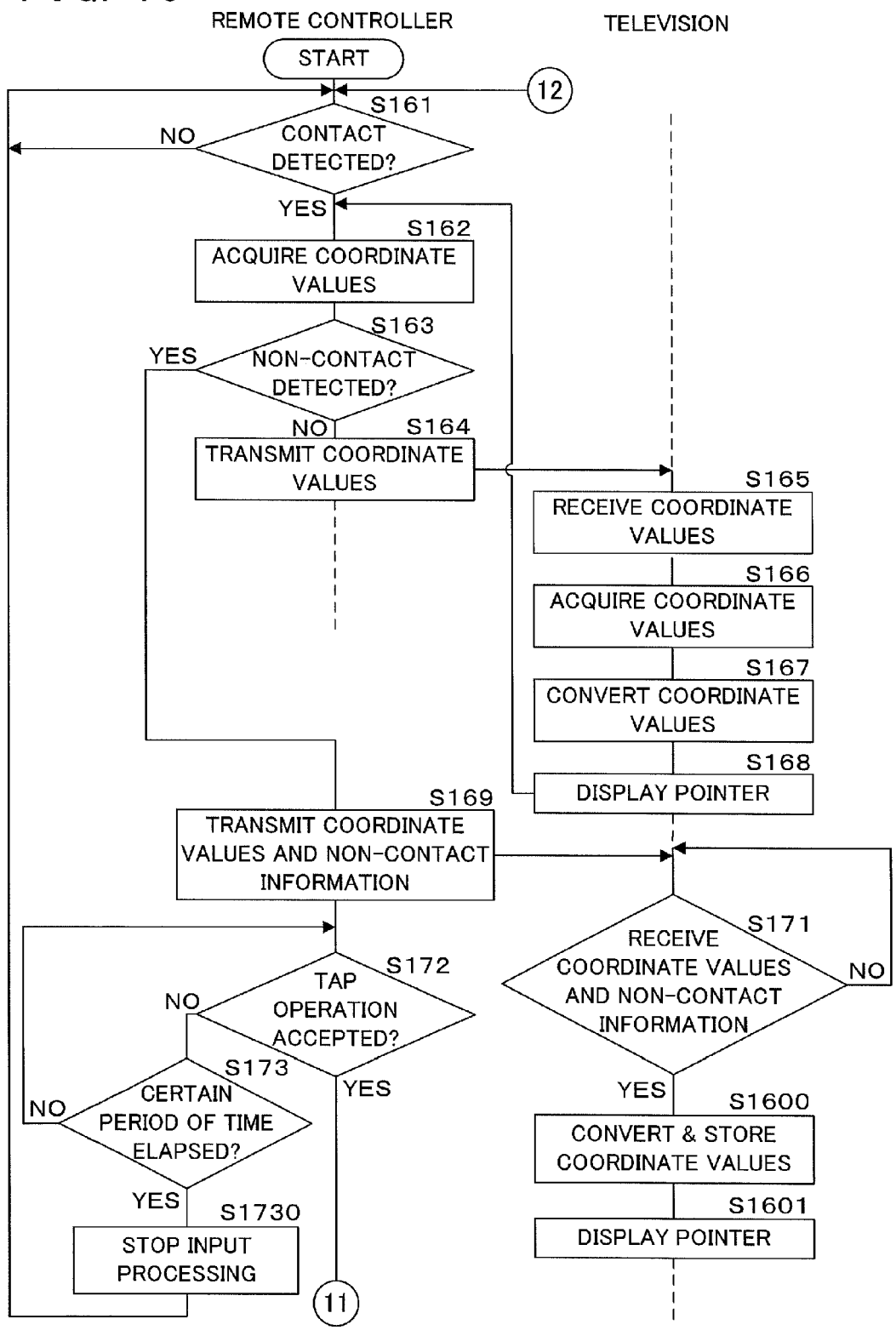
FIG. 16 is a flowchart illustrating a procedure of input processing according to Embodiment 4.
Figure 17:
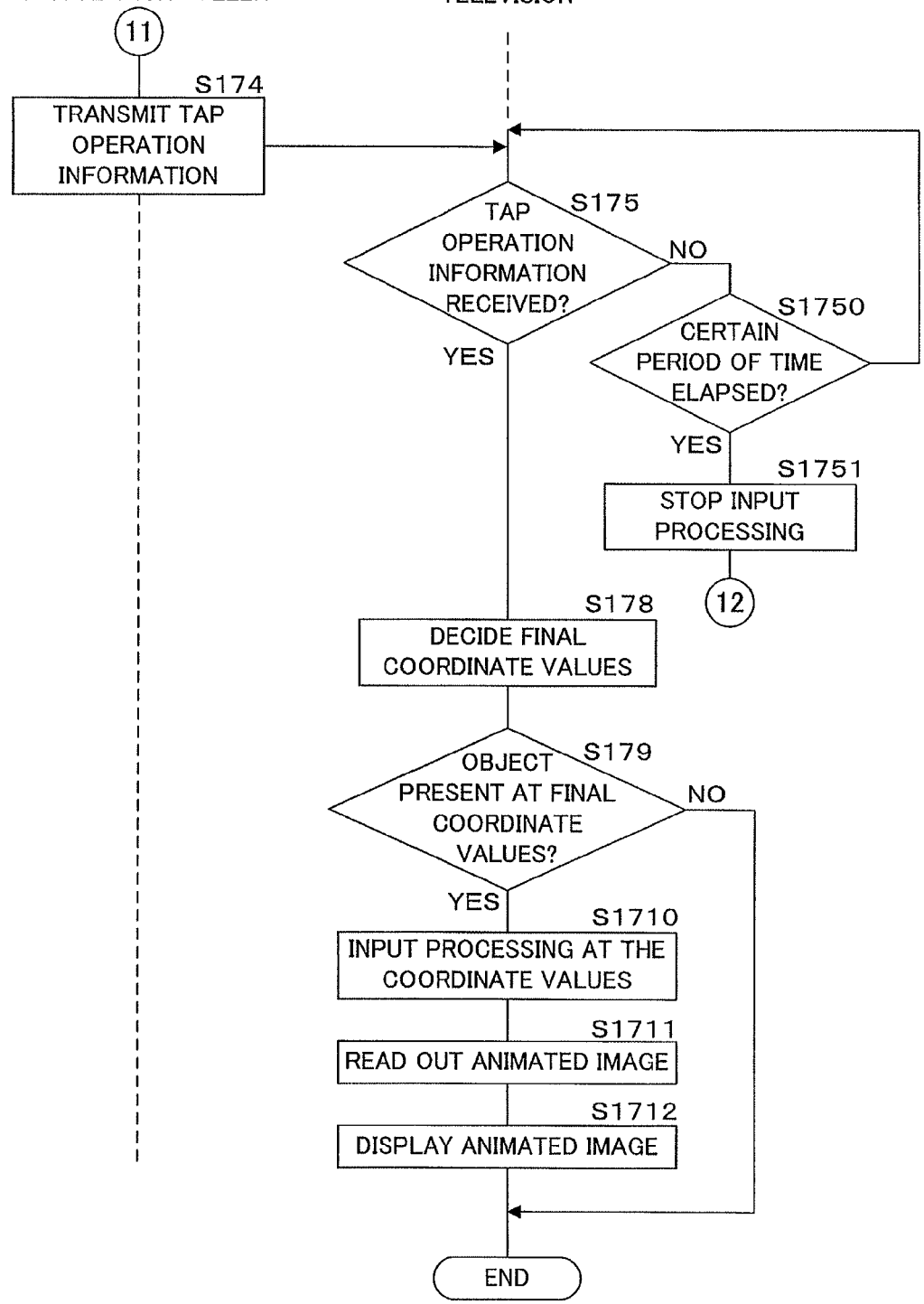
FIG. 17 is a flowchart illustrating a procedure of input processing according to Embodiment 4.

Embodiment 4 relates to an example in which input is performed by tap operation. FIGS. 16 and 17 illustrate a flowchart indicating a procedure of input processing according to Embodiment 4. The CPU 21 of the remote controller 2 determines whether or not contact is detected through the touch pad 23 (step S161). If contact is not detected (NO at step S161), the CPU 21 waits until contact is detected. If contact is detected (YES at step S161), the CPU 21 acquires coordinate values at the position of contact (step S162). The CPU 21 determines whether or not non-contact is detected after contact is detected (step S163). More specifically, the CPU 21 detects whether or not a finger is released from the touch pad 23.

If it is determined that non-contact is not detected (NO at step S163), the CPU 21 transmits the acquired coordinate values to the television 1 through the communication unit 26 (step S164). The CPU 11 of the television 1 receives the coordinate values transmitted wirelessly through the communication unit 16 (step S165). The CPU 11 acquires coordinate values output from the communication unit 16 (step S166). The CPU 11 converts the acquired coordinate values based on a conversion equation described in the control program 15P or stored in the storage unit 15 (step S167).

The image of the pointer 3 is read out from the storage unit 15. The CPU 11 displays the pointer 3 on the display unit 14 at a position of the coordinate values obtained after conversion (step S168). The CPU 11 stores the coordinate values for the pointer 3 in time series in the RAM 12. Subsequently, the CPU 11 returns to step S162. By repeating the processing described above, the pointer 3 moves on the display unit 14 in response to continuous contact input. If it is determined that non-contact is detected (YES at step S163), the CPU 21 proceeds to step S169. The CPU 21 transmits the acquired coordinate values and non-contact information acquired at step S162 to the television 1 through the communication unit 26 (step S169).

The CPU 11 of the television 1 determines whether or not coordinate values and non-contact information are received (step S171). If coordinate values and non-contact information are not received (NO at step S171), the CPU 11 waits until non-contact information is received. If it is determined that the CPU 11 have received coordinate values and non-contact information (YES at step S171), the CPU 11 proceeds to step S1600. The CPU converts the received coordinate values and stores the coordinate values after conversion as the final coordinate values in the RAM 12 (step S1600). The CPU 11 displays the pointer 3 on the display unit 14 at the final coordinate values (step S1601). The CPU 11 subsequently proceeds to step S175.

The CPU 21 of the remote controller 2 determines whether or not tap operation is accepted (step S172). If tap operation is not accepted (NO at step S172), the CPU 21 determines whether or not a certain period of time (three seconds, for example) stored in the storage unit 15 has elapsed since non-contact information is transmitted at step S169. If it is determined that a certain period of time has not elapsed (NO at step S173), the CPU 21 returns to step S172. If it is determined that a certain period of time has elapsed (YES at step S173), the CPU 21 stops input processing (step S1730). The CPU 11 proceeds to step S161.

If it is determined that tap operation is accepted (YES at step S172), tap operation information indicating that tap operation is executed to the television 1 (step S174). The CPU 11 of the television 1 determines whether or not tap operation information is received (step S175). If tap operation information is not received (NO at step S175), the CPU 11 proceeds to step S1750. The CPU 11 refers to the output of the clock unit 18 to determine whether or not a certain period of time (five seconds, for example) has elapsed since non-contact information is received at step S171 (step S1750). If a certain period of time has not elapsed (NO at step S1750), the CPU 11 returns to step S175. If it is determined that a certain period of time has elapsed (YES at step S1750), the CPU 11 stops input processing (step S1751). More specifically, the CPU 11 does not execute input processing for the object T, which will be described at step S1710. The CPU 11 subsequently returns to step S161. If tap operation information is received (YES at step S175), the CPU 11 proceeds to step S178.

The CPU 11 reads out the coordinate values stored in the RAM 12 at step S1600, and decides it as the final coordinate values for the pointer 3 (step S178). The CPU 11 determines whether or not an object T is present on the final coordinate values (step S179). If it is determined that an object T is present (YES at step S179), the CPU 11 performs input processing for the object T at the final coordinate values (step S1710). The CPU 11 reads out an animated image from the storage unit 15 (step S1711). The CPU 11 displays the animated image on the display unit 14 as an image of the pointer 3 (step S1712). If it is determined that the object T is not present at the final coordinate values (NO at step S179), the CPU 11 skips the processing from steps S1710 through S1712 and terminates the processing. This allows the user to perform input by tap operation after moving the pointer 3 to a target position.

Embodiment 5

Figure 18:
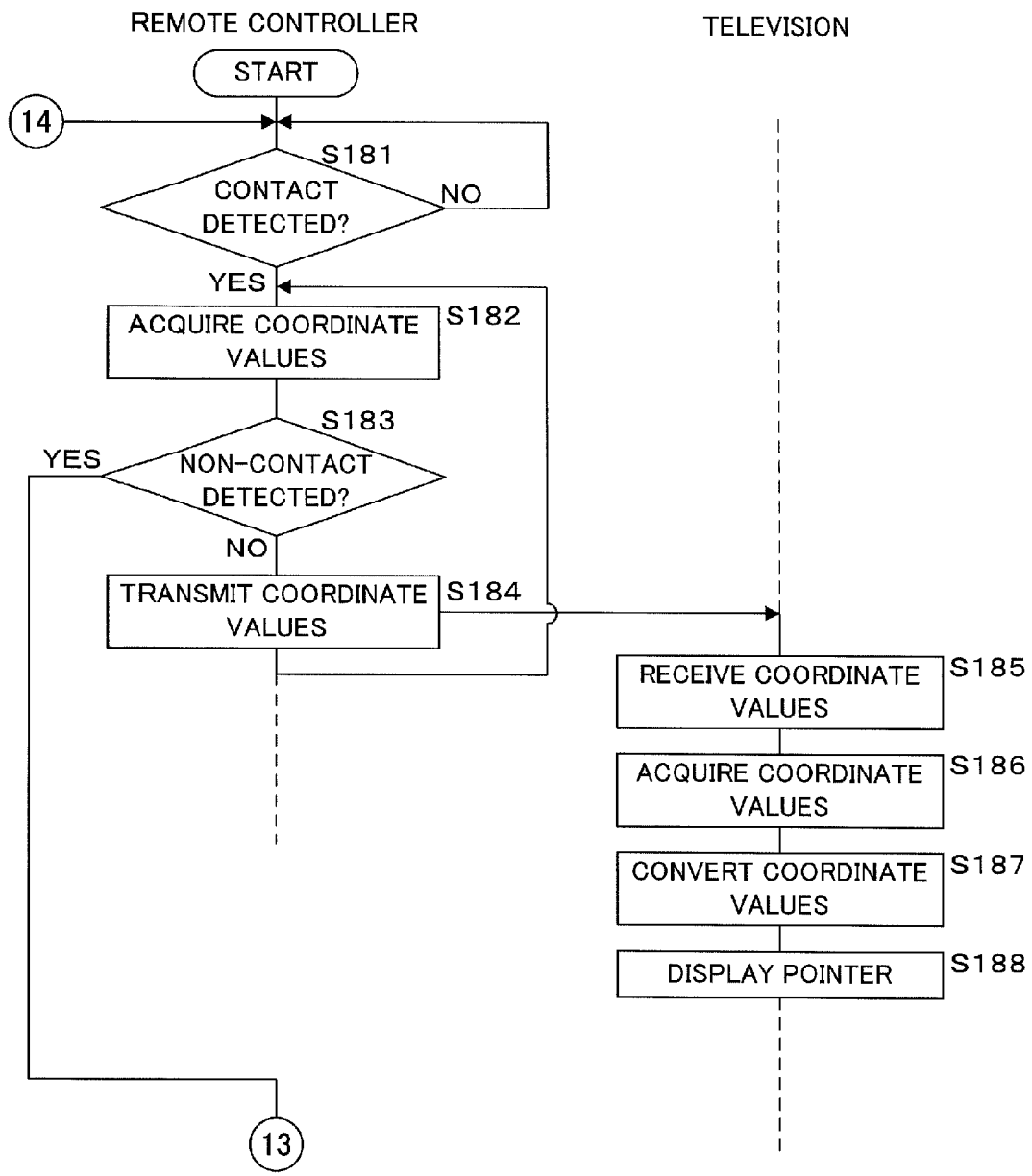
FIG. 18 is a flowchart illustrating a procedure of input processing according to Embodiment 5.
Figure 19:
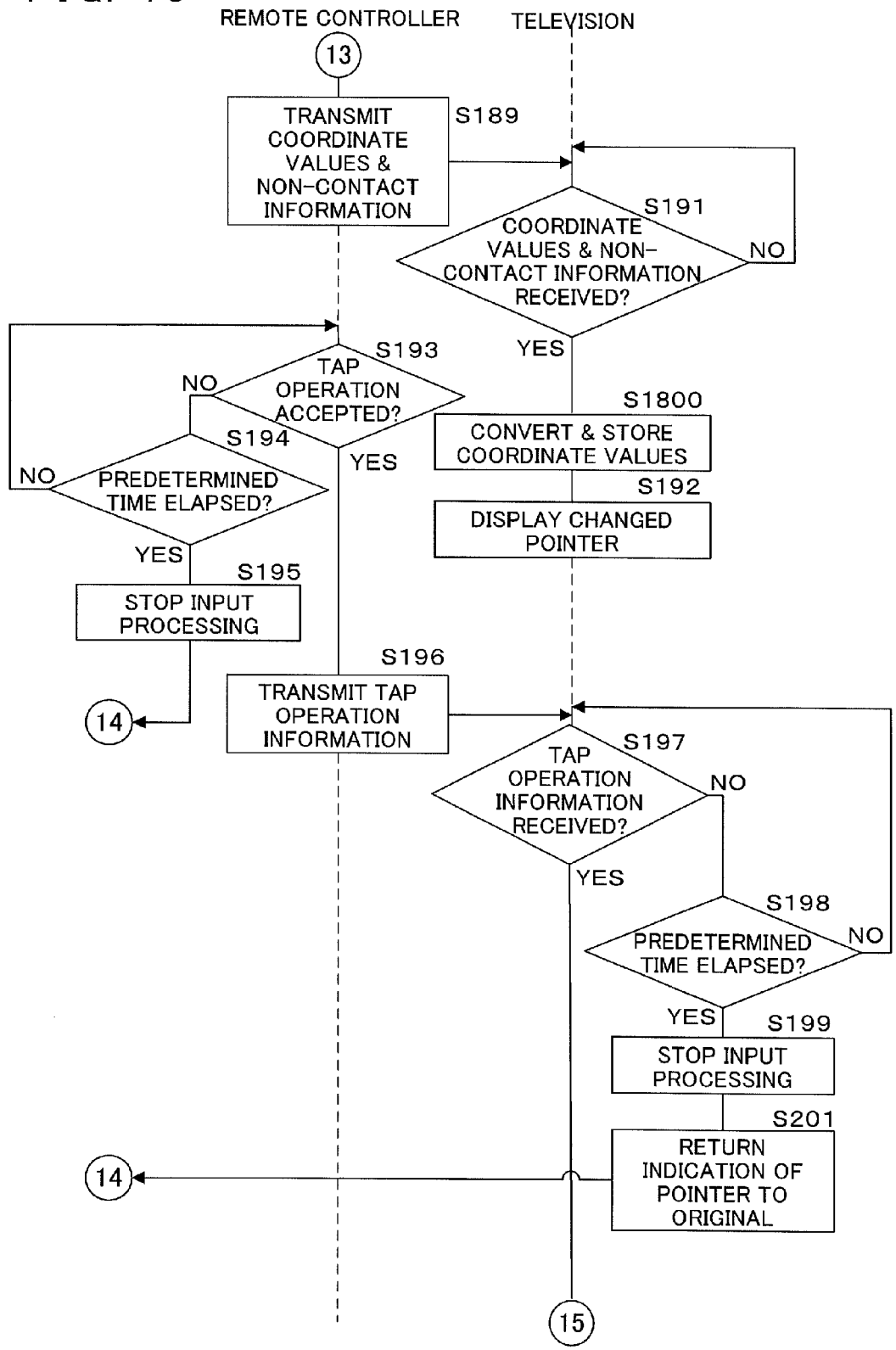
FIG. 19 is a flowchart illustrating a procedure of input processing according to Embodiment 5.
Figure 20:
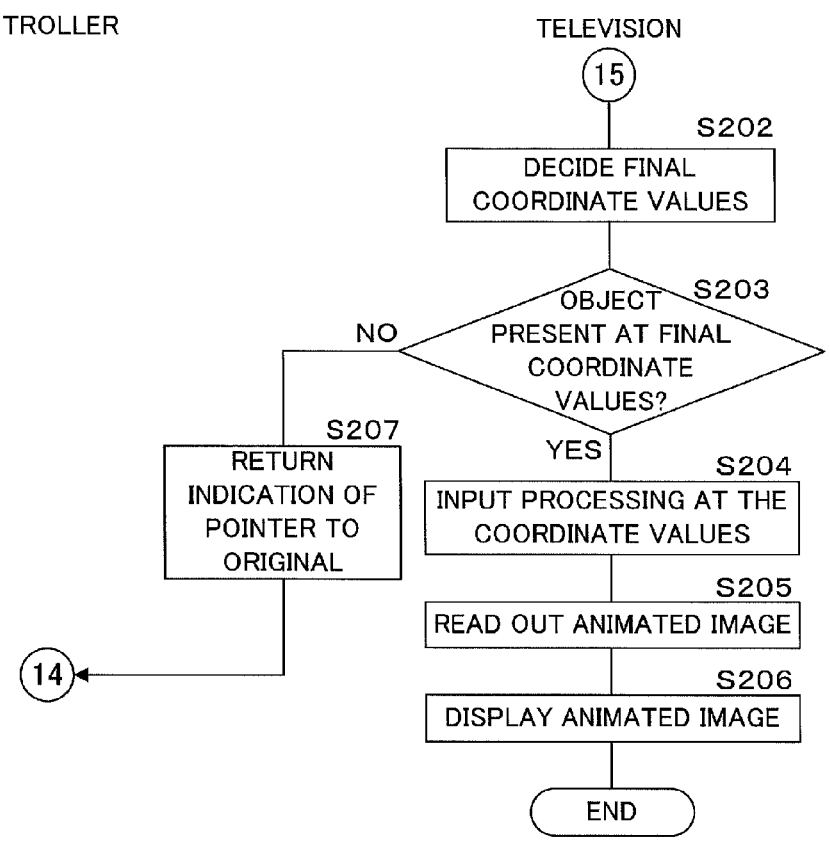
FIG. 20 is a flowchart illustrating a procedure of input processing according to Embodiment 5.

Embodiment 5 relates to an example where the indication of the pointer 3 is changed to urge the user to tap. FIGS. 18 through 20 illustrate a flowchart indicating a procedure of input processing according to Embodiment 5. The CPU 21 of the remote controller 2 determines whether or not contact is detected through the touch pad 23 (step S181). If contact is not detected (NO at step S181), the CPU 21 waits until contact is detected. If contact is detected (YES at step S181), the CPU 21 acquires coordinate values at the position of contact (step S182). The CPU 21 determines whether or not non-contact is detected after contact is detected (step S183).

If it is determined that non-contact is detected (NO at step S183), the CPU 21 transmits the acquired coordinate values to the television 1 through the communication unit 26 (step S184). The CPU 21 returns to step S182 and repeats the processing described above. The CPU 11 of the television 1 receives coordinate values transmitted wirelessly through the communication unit 16 (step S185). The CPU 11 acquires coordinate values output from the communication unit 16 (step S186). The CPU 11 converts the acquired coordinate values based on a conversion equation described in the control program 15P or stored in the storage unit 15 (step S187).

Figure 21A:
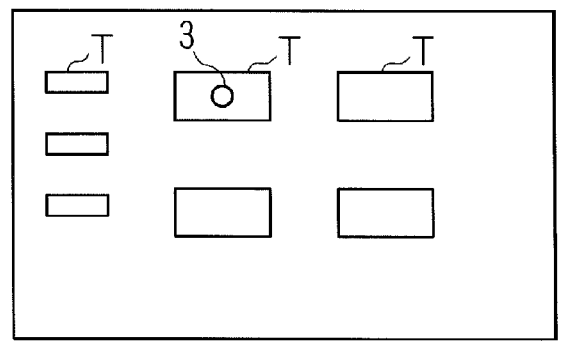
FIG. 21A is an explanatory view illustrating a moving image of a pointer.
Figure 21B:
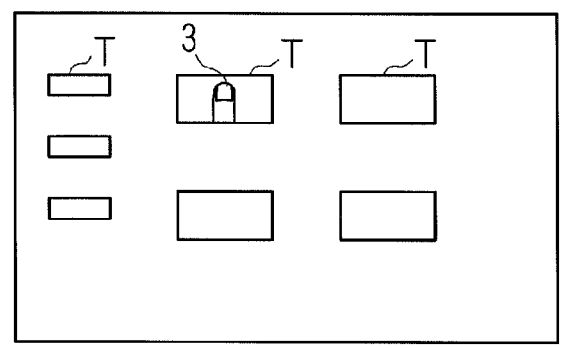
FIG. 21B is an explanatory view illustrating a moving image of a pointer.
Figure 21C:
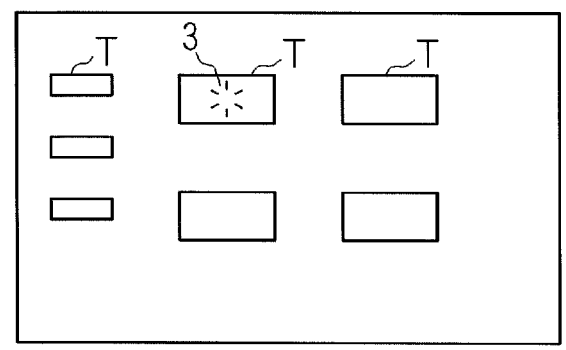
FIG. 21C is an explanatory view illustrating a moving image of a pointer.

An image of the pointer 3 is read out from the storage unit 15. The CPU 11 displays the pointer 3 on the display unit 14 at the position of coordinate values obtained after conversion (step S188). By repeating the processing described above, the pointer 3 moves on the display unit 14 in response to continuous contact input. FIGS. 21A to C illustrate moving images of the pointer 3. FIG. 21A displays that the pointer 3 indicated by a white circle moves and is present on an object T. If it is determined that non-contact is detected (YES at step S183), the CPU 21 proceeds to step S189. The CPU 21 transmits the coordinate values acquired at step S182 and non-contact information to the television 1 through the communication unit 26 (step S189).

The CPU 11 of the television 1 determines whether or not coordinate values and non-contact information are received (step S191). If coordinate values and non-contact information are not received (NO at step S191), the CPU 11 waits until non-contact information is received. If it is determined that coordinate values and non-contact information are received (YES at step S191), the CPU 11 proceeds to step S1800. The CPU 11 converts the coordinate values received at step S191 and stores the coordinate values after conversion in the RAM 12 as coordinate values for the pointer 3 (step S1800). The CPU 11 reads out the pointer 3 to be changed from the storage unit 15. The CPU 11 displays the changed pointer 3 on the coordinates stored at step S1800 (step S192).

The example of FIG. 21B shows the pointer 3 of a finger shape obtained after change. The CPU 21 of the remote controller 2 determines whether or not tap operation is accepted (step S193). If tap operation is not accepted (NO at step S193), the CPU 21 transmits non-contact information at step S189 and then determines whether or not a predetermined time period (two seconds, for example) stored in the storage unit 15 has elapsed (step S194). If non-contact information is transmitted, the CPU 21 may determine whether or not a predetermined time period has elapsed based on the time when the final coordinate values are transmitted after continuously transmitting coordinate values. If it is determined that a predetermined time period has not elapsed (NO at step S194), the CPU 21 returns to step S193. If it is determined that a predetermined time period has elapsed (YES at step S194), the CPU 21 stops input processing (step S195). This allows the processing to be returned to step S181 without input processing performed for the object T which is described at step S204. Note that the CPU 11 of the television 1 displays the pointer 3 before change instead of the pointer 3 after change by performing the processing of S188 again.

If it is determined that tap operation is accepted (YES at step S193), the CPU 21 transmits tap operation information to the television 1 indicating that tap operation is executed (step S196). The CPU 11 of the television 1 determines whether or not tap operation information is received (step S197). If tap operation information is not received (NO at step S197), the CPU 11 proceeds to step S198. The CPU 11 refers to the output of the clock unit 18 and determines whether or not a predetermined time period (two seconds, for example) has elapsed since non-contact information is received at step S191 (step S198). If non-contact information is not transmitted, the CPU 11 may determine whether or not a predetermined time period has elapsed based on the time when the last coordinate values are received after coordinate values are continuously received. If a predetermined time period has not elapsed (NO at step S198), the CPU 11 returns to step S197.

If it is determined that a predetermined time period has elapsed (YES at step S198), the CPU 11 stops input processing (step S199).

The CPU 11 returns the indication of the pointer 3 obtained after change to that of the pointer 3 of a white circle before change (step S201). The CPU 11 subsequently returns to step S181. If tap operation information is received (YES at step S197), the CPU 11 proceeds to step S202.

The CPU 11 reads out the coordinate values stored at step S1800 and decides them as the final coordinate values for the pointer 3 (step S202). The CPU 11 determines whether or not the object T is present on the final coordinate values (step S203). If it is determined that the object T is present (YES at step S203), the CPU 11 performs input processing for the object T at the final coordinate values (step S204). The CPU 11 reads out an animated image from the storage unit 15 (step S205).

The CPU 11 displays the pointer 3 which is an animated image on the display unit 14 in place of the static image of the pointer 3 (step S206). In the example of FIG. 21C, the shape of the pointer 3 is changed by animation. If it is determined that the object T is not present at the final coordinate values (NO at step S203), the CPU 11 returns the pointer 3 after change to the white circle before change (step S207). Subsequently, the CPU 11 returns to step S181. This can urge the user to perform tap operation.

Embodiment 5 is as described above and the other configuration parts are similar to those in Embodiments 1 to 4. Corresponding parts are therefore denoted by the same reference numbers and will not be described in detail.

Embodiment 6

Figure 22:
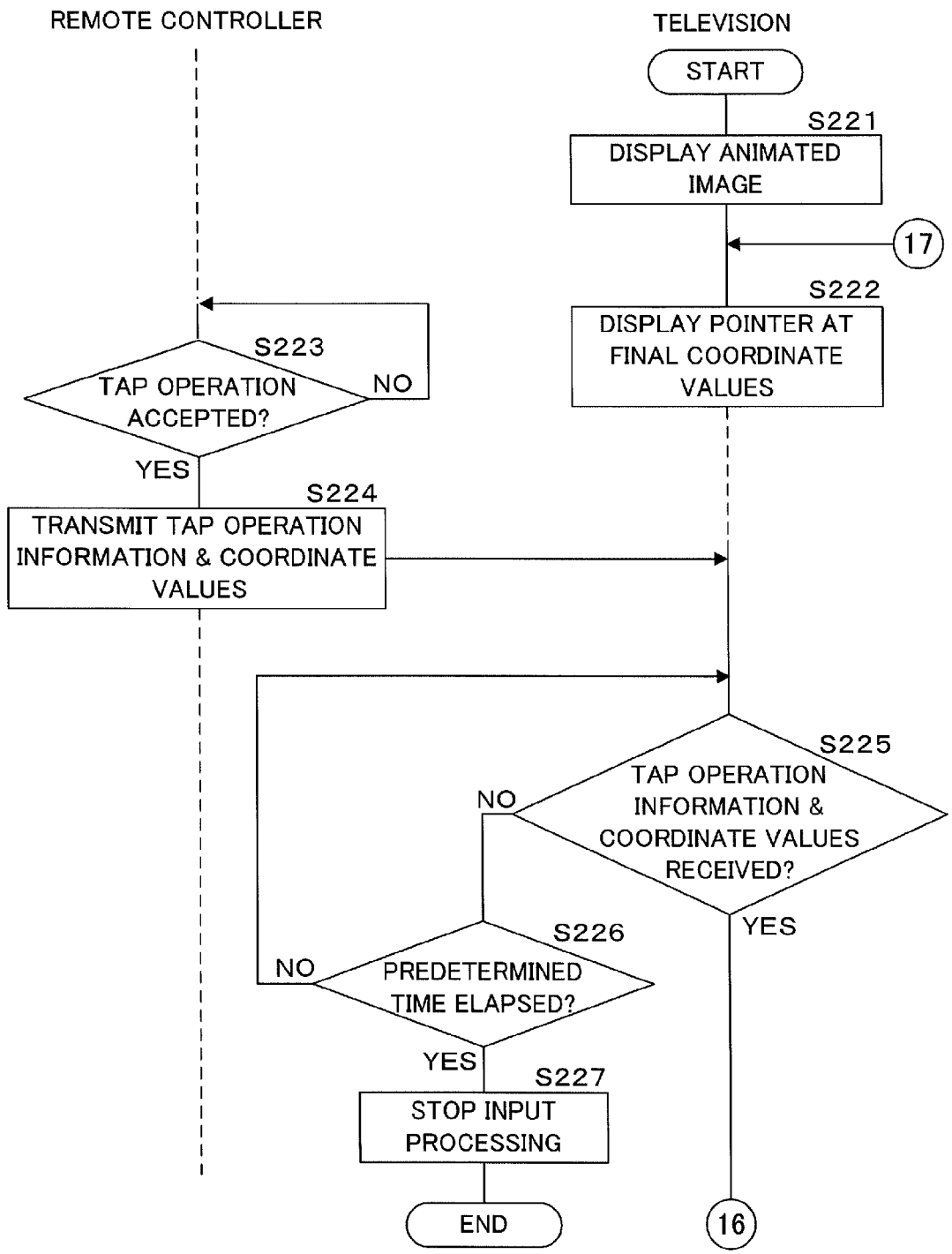
FIG. 22 is a flowchart illustrating a procedure of continuous input processing.
Figure 23:
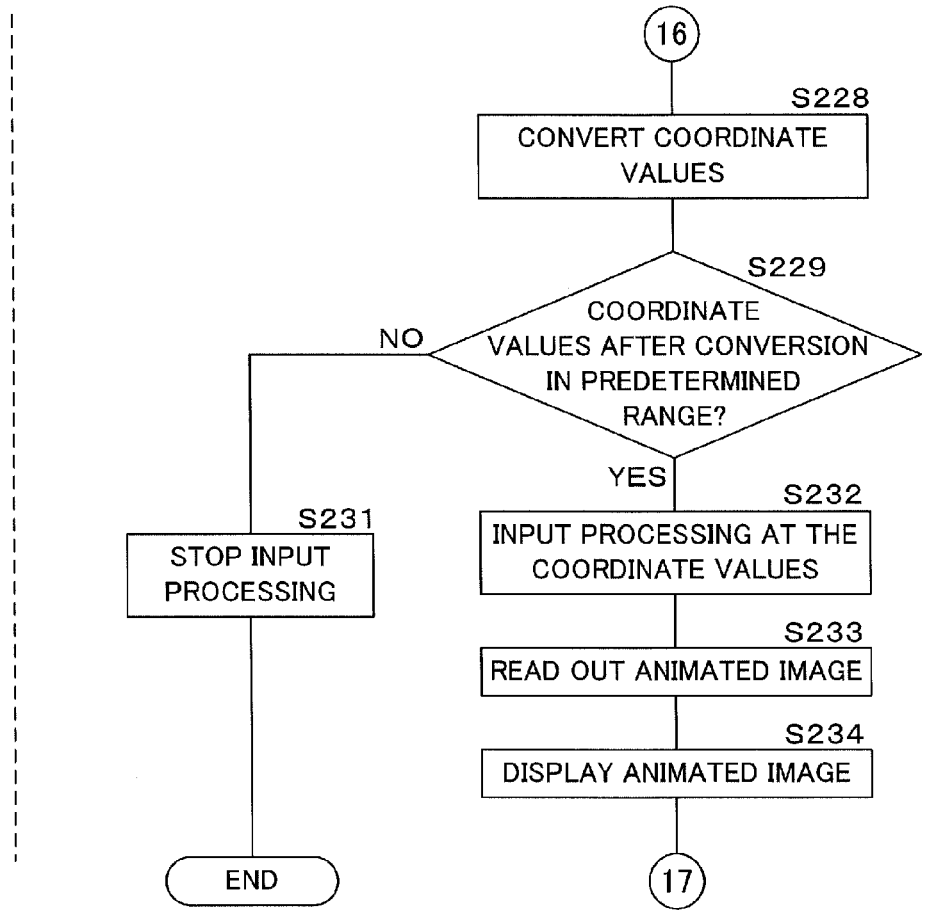
FIG. 23 is a flowchart illustrating a procedure of continuous input processing.
Figure 24A:
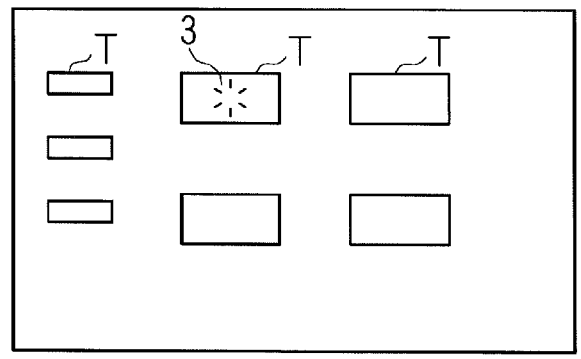
FIG. 24A is an explanatory view illustrating a change of a pointer.
Figure 24B:
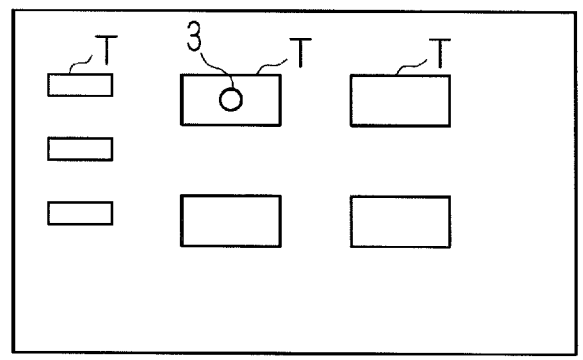
FIG. 24B is an explanatory view illustrating a change of a pointer.
Figure 24C:
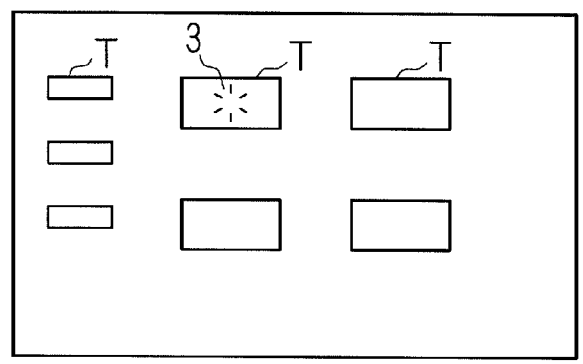
FIG. 24C is an explanatory view illustrating a change of a pointer.

Embodiment 6 relates to an example where input is continuously performed. When tap operation is accepted again after the animation display by steps S66, S810, S1712 or S206, acceptance information indicating that input is accepted again at the final coordinate values is output. FIGS. 22 and 23 illustrate a flowchart indicating a procedure of continuous input processing. The CPU 11 displays an animated image of the pointer 3 by steps S66, S810, S1712 or S206 (step S221). FIGS. 24A to C are explanatory views illustrating the change of the pointer 3. FIG. 24A illustrates an image shown when the pointer 3 is displayed by animation at step S221.

The CPU 11 displays the initial pointer 3 of a white circle before animation display on the display unit 14 at the final coordinate values (step S222). It is noted that the final coordinate values described in the present embodiment are assumed as the final coordinate values decided when the pointer 3 is displayed by animation for the output of acceptance information at step S66, S810, S1712 or S206. The CPU 21 of the remote controller 2 determines whether or not tap operation is accepted (step S223). If tap operation is not accepted (NO at step S223), the CPU 21 waits until tap operation is accepted. If tap operation is accepted (YES at step S223), the CPU 11 proceeds to step S224.

The CPU 21 of the remote controller 2 transmits tap operation information and the coordinate values obtained when tap operation is accepted to the television 1 (step S224). The CPU 11 of the television 1 determines whether or not the tap operation information and coordinate values are received (step S225). If the tap operation information is not received (NO at step S225), the CPU 11 proceeds to step S226. The CPU 11 refers to the output of the clock unit 18 and determines whether or not a predetermined time period (two seconds, for example) has elapsed after the processing of step S221 or S222 (step S226). If a predetermined time period has not elapsed (NO at step S226), the CPU 11 returns to step S225. If it is determined that a predetermined time period has elapsed (YES at step S226), the CPU 11 stops input processing (step S227). More specifically, the CPU 11 does not execute input processing for the object T described at step S232. Subsequently, the CPU 11 returns to step S51, S71, S101, S161 or S181 in accordance with each of the embodiments described above.

If it is determined that the tap operation information and coordinate values are received (YES at step S225), the CPU 11 proceeds to step S228. The CPU 11 acquires the coordinate values transmitted in response to the tap operation and converts it (step S228). The CPU 11 determines whether or not the coordinate values after conversion are present within a predetermined range with respect to the final coordinate values (step S229). More specifically, the CPU 11 obtains the distance between the final coordinate values for the pointer 3 displayed at step S222 and the coordinate values after conversion. If the obtained distance is within a threshold stored in the storage unit 15, the CPU 11 determines that it is within a predetermined range. For example, the threshold distance may be set as 300 pixels. If it is determined that the distance is not in a predetermined range (NO at step S229), the CPU 11 stops input processing (step S231). More specifically, the CPU 11 does not execute the input processing for the object T. Subsequently, the CPU 11 returns to step S51, S71, S101, S161 or S181. Accordingly, when the tapped position is too far away from the object T input previously, tap operation may be canceled.

If it is determined that the coordinate values are in a predetermined range (YES at step S229), the CPU 11 performs input processing at the final coordinate values (step S232). The object T input in the embodiments described above is input again. The CPU 11 reads out an animation image from the storage unit 15 (step S233). The CPU 11 displays an animated image on the display unit 14 as the pointer 3 (step S234). As illustrated in FIG. 24C, an animated image is displayed indicating that the object T is input again on the object T. The CPU 11 subsequently returns to step S222. As illustrated in FIG. 24B, the pointer 3 indicated by the original white circle is displayed again. This allows the user to realize continuous input in a short period of time even when the object T is a backspace key, a return key or a key for a game, which is necessary to be hit repeatedly.

Embodiment 6 is as described above and the other configuration parts are similar to those in Embodiments 1 to 5. Corresponding parts are therefore denoted by the same reference number and will not be described in detail.

Embodiment 7

Figure 25A:
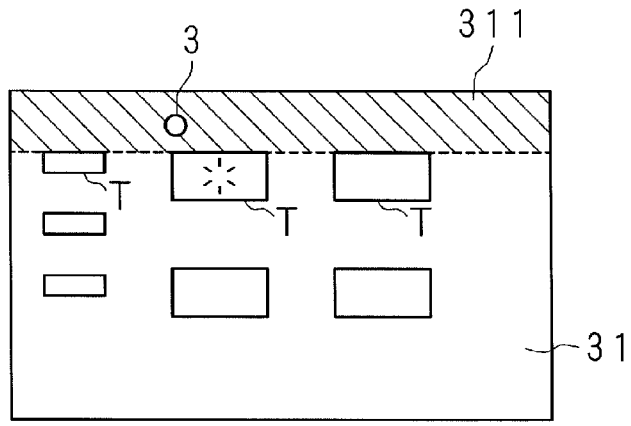
FIG. 25A is an explanatory view illustrating a display image according to Embodiment 7.
Figure 25B:
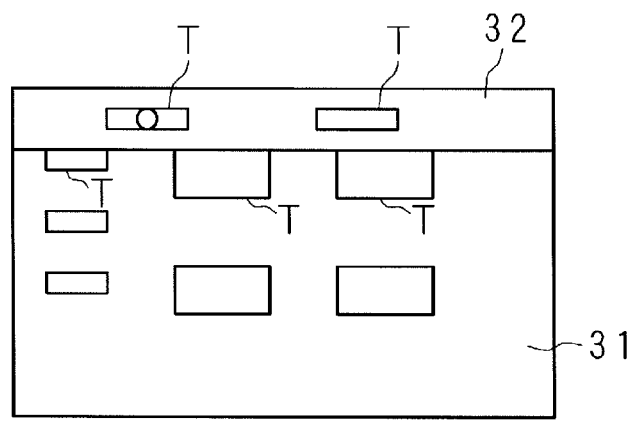
FIG. 25B is an explanatory view illustrating a display image according to Embodiment 7.
Figure 25C:
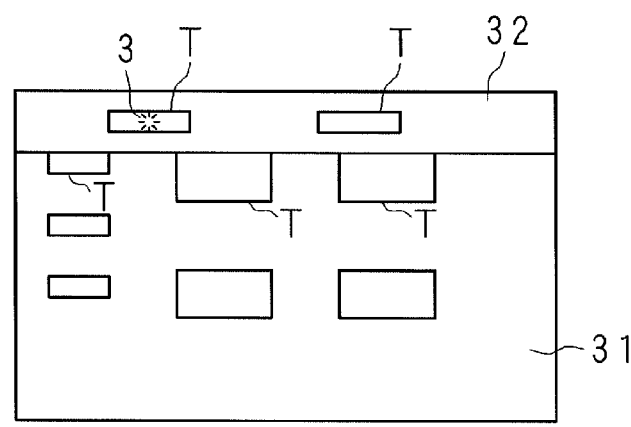
FIG. 25C is an explanatory view illustrating a display image according to Embodiment 7.

Embodiment 7 relates to an example where another display region in a predetermined region is displayed. FIGS. 25A to C are explanatory views illustrating display images according to Embodiment 7. As shown in FIG. 25A, multiple objects T are displayed in the first display region 31 on the display unit 14. When the pointer 3 moves to a predetermined region 311 indicated by hatching, the second display region 32 is displayed to be superposed on the first display region 31 as illustrated in FIG. 25B. The predetermined region 311 is a region stored in the storage unit 15 in advance. In the present embodiment, as an example, the entire region corresponding to one-fifth of the first display region 31 on the upper side, which ranges all the way from 0 to 100 in Y-coordinates, is set as the predetermined region 311.

Objects T are also displayed on the second display region 32. Also for the objects T on the second display region 32, input processing and animation displaying are performed by the processing described in the embodiments above. FIG. 25C shows an example where input is performed on an object T in the second display region 32. When the pointer 3 moves out of the predetermined region 311, the display of the second display region 32 is erased while only the first display region 31 is displayed on the display unit 14. It is noted that the shape of the predetermined region 311 is an example and may alternatively be a circle or polygon. Furthermore, the shape of the second display region 32 may also have a shape of a circle or triangle. Moreover, though the second display region 32 is displayed at the upper side, it may also be displayed at an appropriate position such as a lower side, right side or left side.

Figure 26:
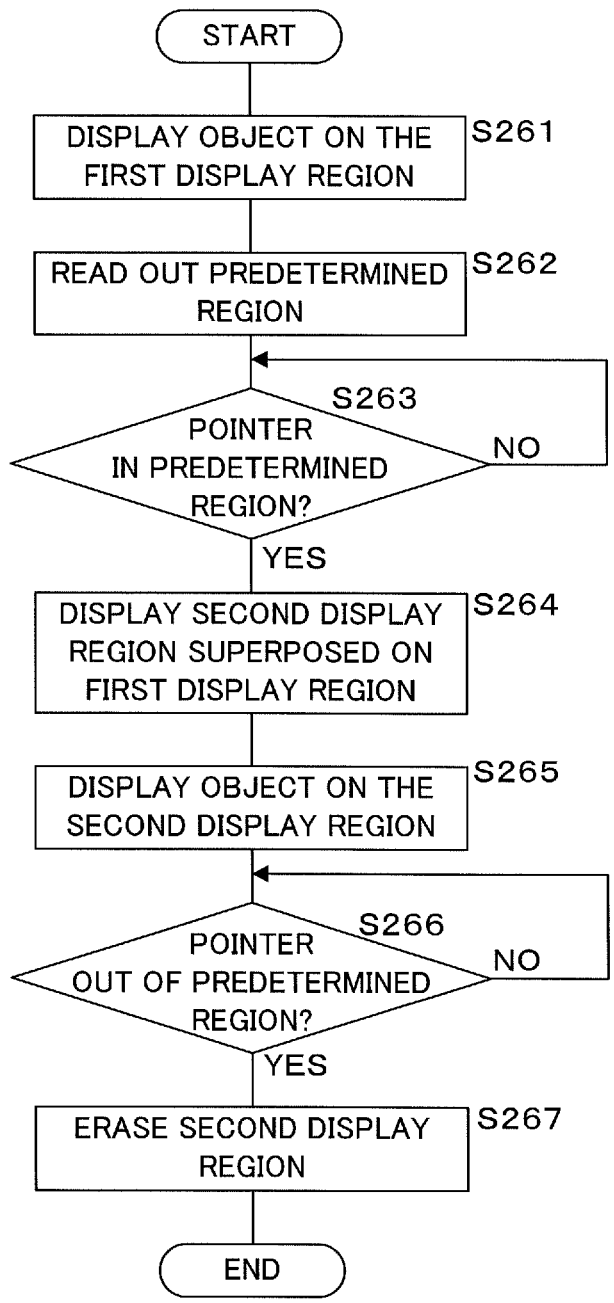
FIG. 26 is a flowchart illustrating a procedure of display processing for the second display region.

FIG. 26 is a flowchart illustrating a procedure of display processing for the second display region 32. The CPU 11 displays the object T on the first display region 31 (step S261). The CPU 11 reads out the predetermined region 311 stored in the storage unit 15 in advance (step S262). The CPU 11 determines whether or not the pointer 3 is in the predetermined region 311 (step S263). If it is determined that the pointer 3 is not in the predetermined region 311 (No at step S263), the CPU 11 waits until it is in the predetermined region 311. If it is determined that the pointer 3 is in the predetermined region 311 (YES at step S263), the CPU 11 proceeds to step S264.

The CPU 11 reads out the image of the second display region 32 and the object T displayed on the second display region 32. The CPU 11 displays the second display region 32 superposed on the first display region 31 (step S264). The CPU 11 displays the object T on the second display region 32 (step S265). The CPU 11 determines whether or not the pointer 3 is out of the predetermined region 311 (step S266). If it is determined that the pointer 3 is out of the predetermined region 311 (NO at step S266), the CPU 11 waits until the pointer 3 is out of the predetermined region 311. If it is determined that the pointer 3 is out of the predetermined region 311 (YES at step S266), the CPU 11 erases the displayed second display region 32 (step S267). This allows the display region on the display unit 14 to have a degree of freedom.

Embodiment 7 is as described above and the other configuration parts thereof are similar to those in Embodiments 1 to 6. Corresponding parts are therefore denoted by the same reference numbers and will not be described in detail.

Embodiment 8

Figure 27:
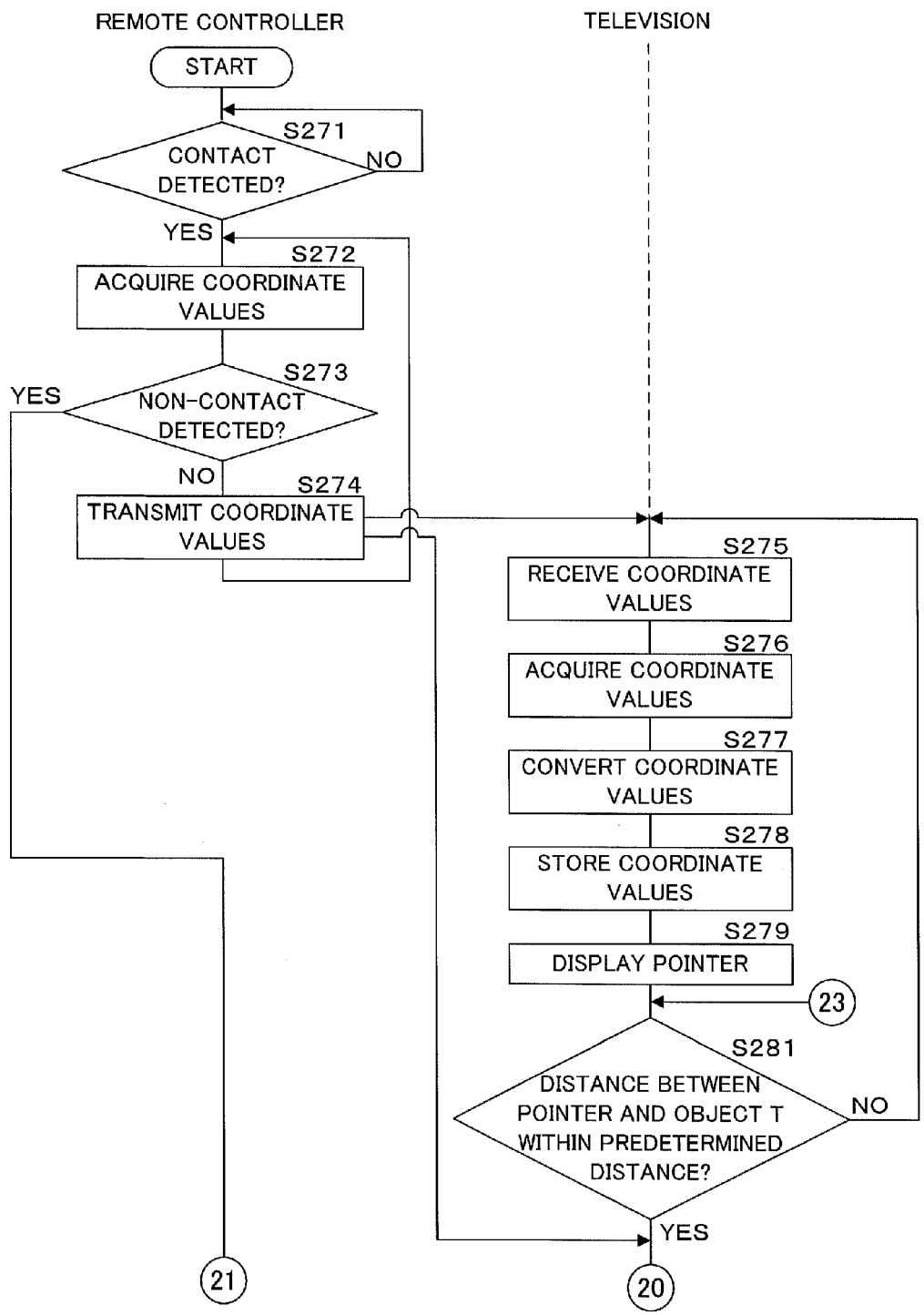
FIG. 27 is a flowchart illustrating a procedure of moving rate lowering processing.
Figure 28:
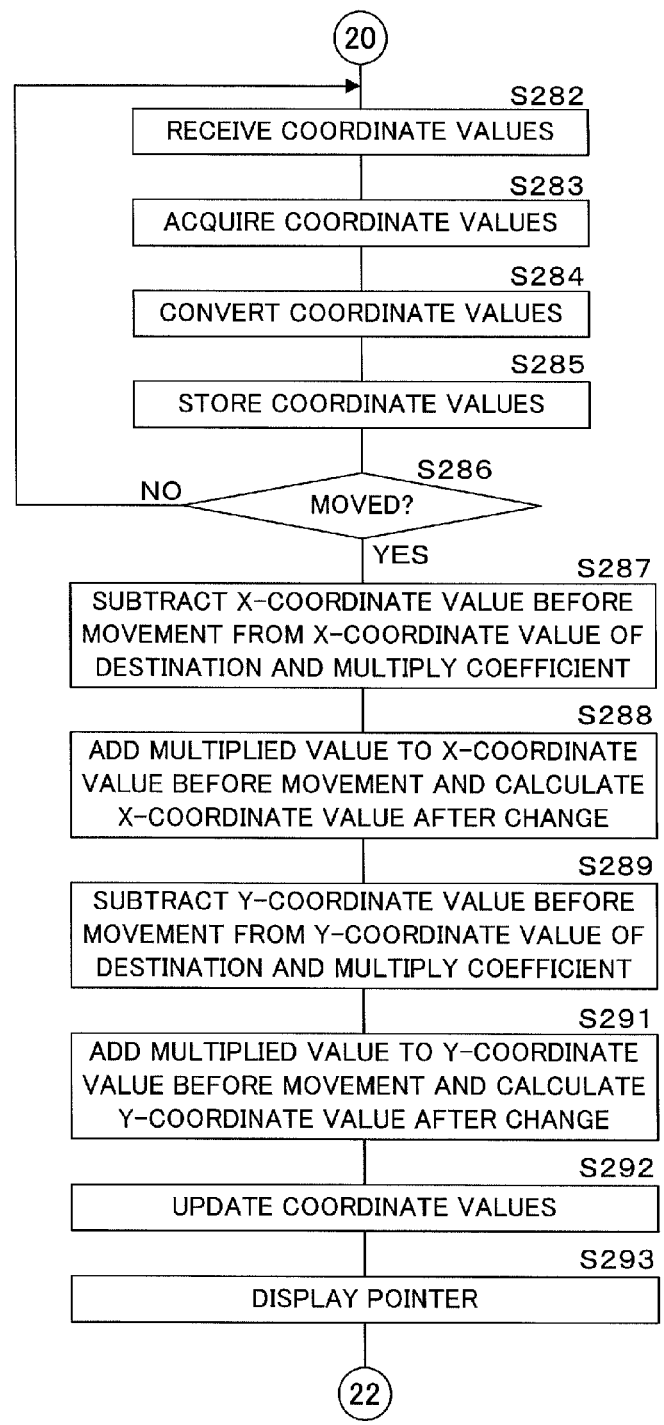
FIG. 28 is a flowchart illustrating a procedure of moving rate lowering processing.
Figure 29:
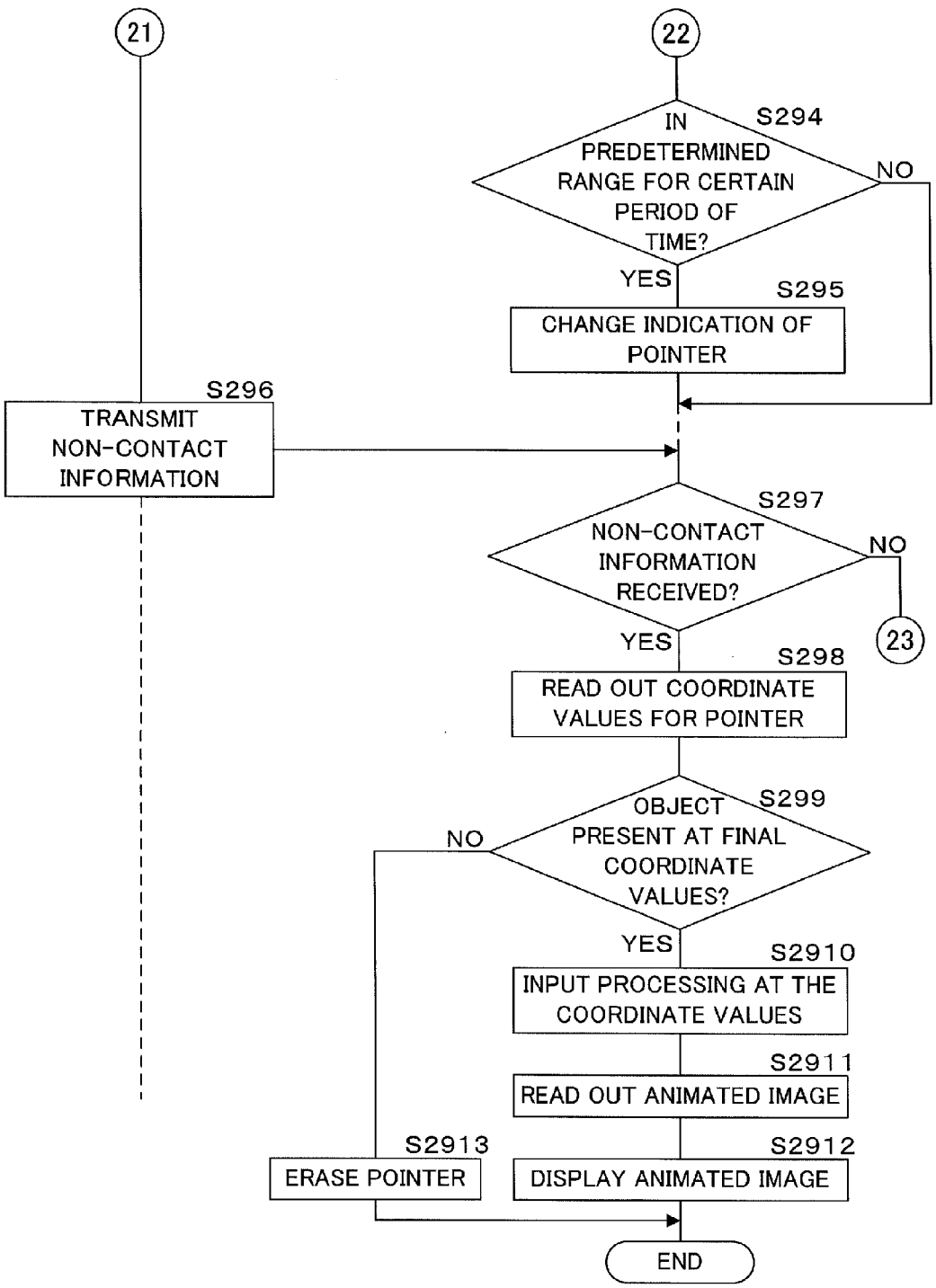
FIG. 29 is a flowchart illustrating a procedure of moving rate lowering processing.

Embodiment 8 relates to an example where the moving rate is reduced when the pointer 3 is present near the object T. FIGS. 27 to 29 illustrate a flowchart indicating a procedure of the processing of reducing the moving rate. The CPU 21 of the remote controller 2 determines whether or not contact is detected through the touch pad 23 (step S271). If contact is not detected (NO at step S271), the CPU 21 waits until contact is detected. If contact is detected (YES at step S271), the CPU 21 acquires coordinate values at the position of contact (step S272). The CPU 21 determines whether or not non-contact is detected after contact is detected (step S273).

If it is determined that non-contact is detected (NO at step S273), the CPU 21 transmits the acquired coordinate values to the television 1 through the communication unit 26 (step S274). The CPU 21 returns to step S272 and repeats the processing described above. The CPU 11 of the television 1 receives the coordinate values transmitted wirelessly through the communication unit 16 (step S275). The CPU 11 acquires coordinate values output from the communication unit 16 (step S276). The CPU 11 converts the acquired coordinate values based on a conversion equation stored in the storage unit 15 or described in the control program 15P (step S277). Note that the processing of converting the coordinate values on the touch pad 23 into the coordinate values on the display unit 14 is as described in Embodiment 1.

The CPU 11 sequentially stores coordinate values in time series in the RAM 12 (step S278). The CPU 11 reads out an image of the pointer 3 from the storage unit 15. The CPU 11 displays the pointer 3 on the display unit 14 at the position of the coordinate values after conversion (step S279). The CPU 11 determines whether or not the distance between the pointer 3 and the object T is within a predetermined distance (step S281). More specifically, the CPU 11 reads out display region coordinates on the display unit 14 set for each object T. The CPU 11 reads out the coordinate values for the pointer 3 last stored in time series from the RAM 12. The CPU 11 calculates the distance based on the coordinate values for the pointer 3 and the coordinate values for the object T in the display region and extracts the shortest distance. If the shortest distance is a threshold distance stored in the storage unit 15 (20 pixels, for example), the CPU 11 determines that it is within a predetermined distance.

If it is determined that the shortest distance is not within the predetermined distance (NO at step S281), the CPU 11 returns to step S275. If it is determined that the shortest distance is within the predetermined distance (YES at step S281), the CPU 11 proceeds to S282 so as to execute the processing of reducing a moving rate. The CPU 11 again receives the coordinate values transmitted wirelessly at step S274 (step S282). The CPU 11 acquires coordinate values output from the communication unit 16 (step S283). The CPU 11 converts the acquired coordinate values based on a conversion equation stored in the storage unit 15 or described in the control program 15P (step S284).

The CPU 11 sequentially stores coordinate values in time series in the RAM 12 (step S285). The CPU 11 refers to the coordinate values stored in time series in the RAM 12 to determine whether or not the pointer 3 has moved (step S286). If the pointer 3 has not moved (NO at step S286), the CPU 11 returns to step S282. If it is determined that the pointer 3 has moved (YES at step S286), the CPU 11 proceeds to step S287. The CPU 11 reads out new coordinate values in time series from the RAM 12 as coordinate values of destination. The CPU 11 reads out from the RAM 12 the next newest coordinate values in time series as the original coordinate values.

The CPU 11 reads out a coefficient from the storage unit 15. The coefficient is, for example, a number larger than 0 and smaller than 1. The user may set an appropriate value through the input unit 13. The CPU 11 stores the input coefficient in the storage unit 15. The input coefficient is described as 0.5 in the present embodiment. The X-coordinate value before movement is subtracted from the X-coordinate value of destination, and the value obtained by the subtraction is multiplied by the coefficient (step S287). This lowers the moving rate in the X-axis direction by half. The CPU 11 adds the value obtained by the multiplication to the X-coordinate value before movement and sets the calculated value as the X-coordinate value after change (step S288). The CPU 11 subtracts the Y-coordinate value before movement from the Y-coordinate value after movement and multiplies the value obtained by the subtraction by the coefficient (step S289). This reduces the moving rate in the Y-axis direction by half. The CPU 11 adds the value obtained by the multiplication to the Y-coordinate value before movement and sets the calculated value as the Y-coordinate value after change (step S291).

Figure 30A:
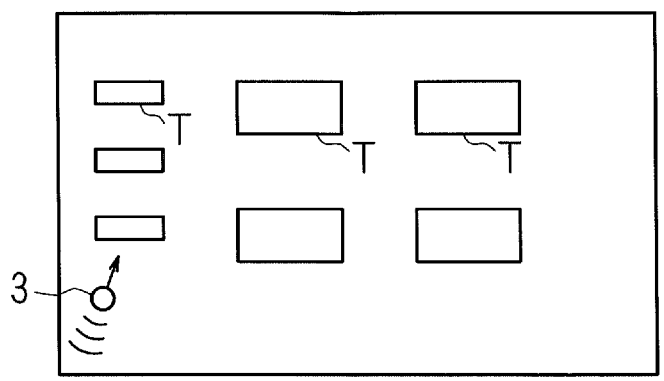
FIG. 30A is an explanatory view illustrating a moving image of a pointer.
Figure 30B:
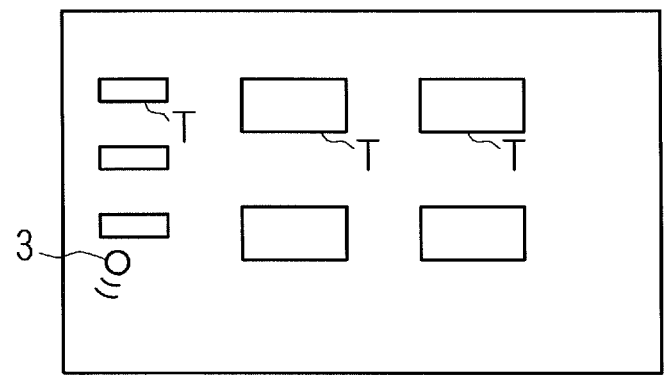
FIG. 30B is an explanatory view illustrating a moving image of a pointer.

The CPU 11 updates new coordinate values in time series in the RAM 12 to the coordinate values after change that are calculated at steps S288 and S291, respectively (step S292). The CPU 11 refers to the coordinate values after change and displays the pointer 3 on the display unit 14 (step S293). This reduces the moving rate of the pointer 3 in the case where the distance between the object T and the pointer 3 is within the predetermined distance compared to the moving rate of the pointer in the case where the distance between the object T and the pointer 3 is out of the predetermined distance. It is noted that, when the pointer 3 is displayed at step S293, the indication of the pointer 3 may be changed from the one shown at step S279. FIGS. 30A and 30B are explanatory views illustrating moving images of the pointer 3. In FIG. 30A, because the pointer 3 is distant from the object T, it moves at high speed. When the pointer approaches near the object T as illustrated in FIG. 30B, the moving rate is reduced.

The CPU 11 determines whether or not the pointer 3 is present in a predetermined range for a certain period of time (step S294). More specifically, the CPU 11 reads out in chronological order the coordinate values stored in the RAM 12 that correspond to a certain period of time. The CPU 11 may obtain the variance of the read-out coordinate values and determine that the pointer 3 is in a predetermined range for a certain period of time if the obtained variance is not more than the threshold stored in the storage unit 15. Moreover, the CPU 11 may obtain the sum of distances of movement among coordinate values in chronological order and determine that the pointer 3 is in a predetermined range for a certain period of time when the sum is not more than the threshold stored in the storage unit 15. Furthermore, the CPU 11 extracts the coordinate values closest to the origin of coordinates and extracts the coordinate values farthest from the origin of coordinates. The CPU 11 may determine that the pointer 3 is in a predetermined range for a certain period of time when the distance between the extracted two sets of coordinate values is not more than the threshold stored in the storage unit 15. Alternatively, the CPU 11 obtains the mean value of the coordinate values corresponding to predetermined seconds. The CPU 11 reads out a threshold radius from the storage unit 15. The CPU 11 determines whether or not each of the coordinate values corresponding to the predetermined seconds resides in the threshold radius with the center thereof being the coordinate values concerning the mean value. The CPU 11 may also determine that the pointer 3 resides in the predetermined range for a certain period of time when all the coordinate values are present within the threshold radius.

If it is determined that the pointer 3 is in the predetermined range for a certain period of time (YES at step S294), the CPU 11 proceeds to step S295. The CPU 11 reads out the image of the pointer 3 after change from the storage unit 15. The CPU 11 changes the indication of the pointer 3 and displays it on the display unit 14 (step S295). If the CPU 11 determines that the pointer 3 is not present in the predetermined range for a certain period of time (NO at step S294), the processing of step S295 is skipped. Subsequently, the CPU 11 proceeds to step S297.

If it is determined that non-contact is detected (YES at step S273), the CPU 21 of the remote controller 2 proceeds to step S296. The CPU 21 transmits non-contact information to the television 1 through the communication unit 26 (step S296). The CPU 11 of the television 1 determines whether or not non-contact information is received (step S297). If non-contact information is not received (NO at step S297), the CPU 11 proceeds to step S281.

If it is determined that non-contact information is received (YES at step S297), the CPU 11 proceeds to step S298. Note that the CPU 11 may proceed to step S298 when transmission of coordinate values from the remote controller 2 that is received wirelessly by the communication unit 16 is stopped. The CPU 11 reads out the coordinate values for the pointer 3 (step S298). More specifically, the CPU 11 reads out the final coordinate values stored in the RAM 12 at step S292.

The CPU 11 determines whether or not the object T is present on the final coordinate values (step S299). If it is determined that the object T is present (YES at step S299), the CPU 11 performs input processing for the object T at the final coordinate values (step S2910). The CPU 11 reads out an animated image from the storage unit 15 (step S2911). The CPU 12 displays an animated image on the display unit 14 as the image of the pointer 3 (step S2912). If it is determined that the object T is not present at the final coordinate values (NO at step S299), the CPU 11 erases the pointer 3 from the display unit 14 and terminates the processing (step S2913). Accordingly, the object T may intuitively be selected with higher accuracy by reducing the moving rate even when the size of the object T is small such as an icon on a keyboard.

Embodiment 8 is as described above and the other configuration parts are similar to those in Embodiments 1 to 7, corresponding parts are denoted by the same reference number and will not be described in detail.

Embodiment 9

Figure 31:
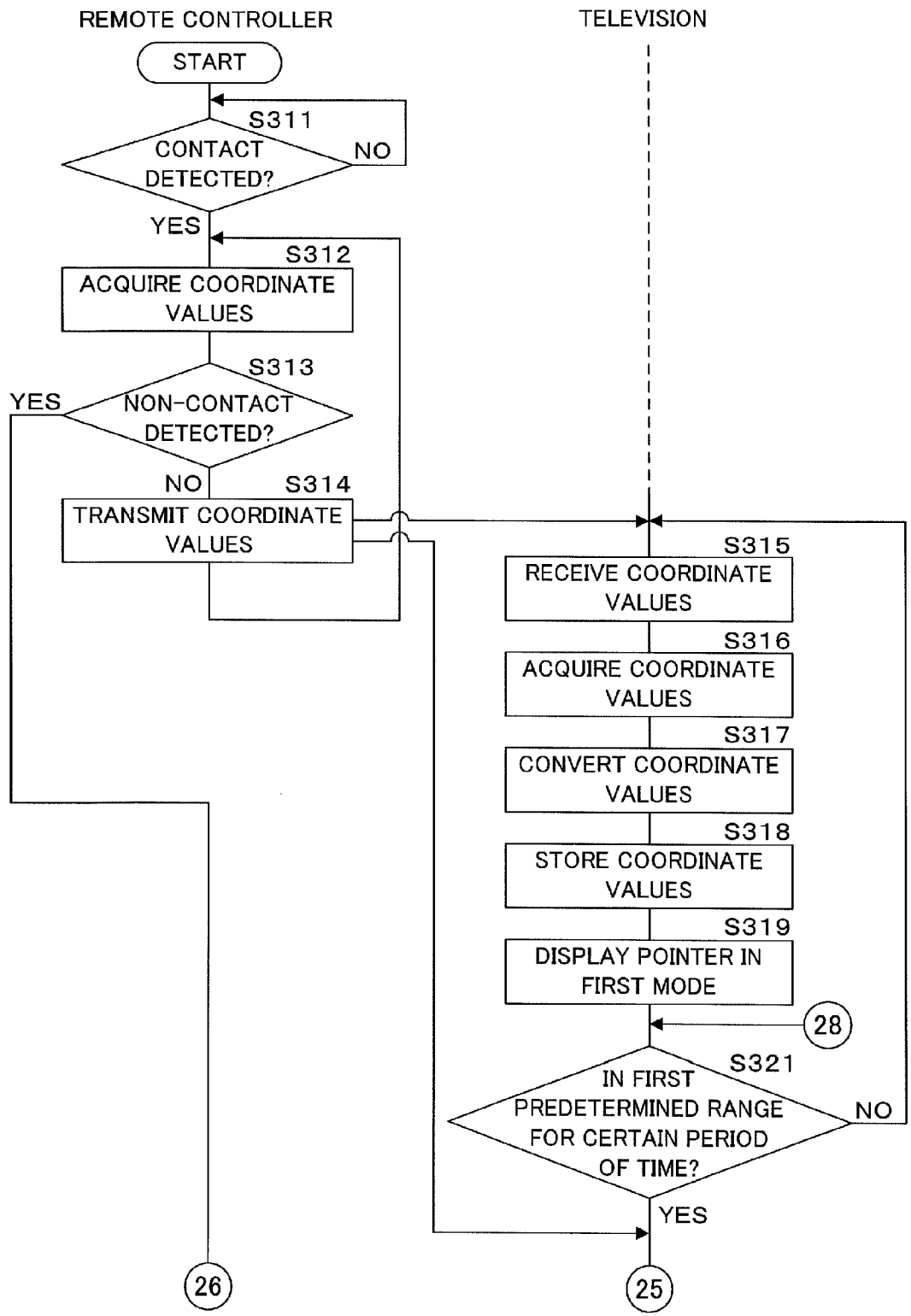
FIG. 31 is a flowchart illustrating a procedure of moving rate lowering processing according to Embodiment 9.
Figure 32:
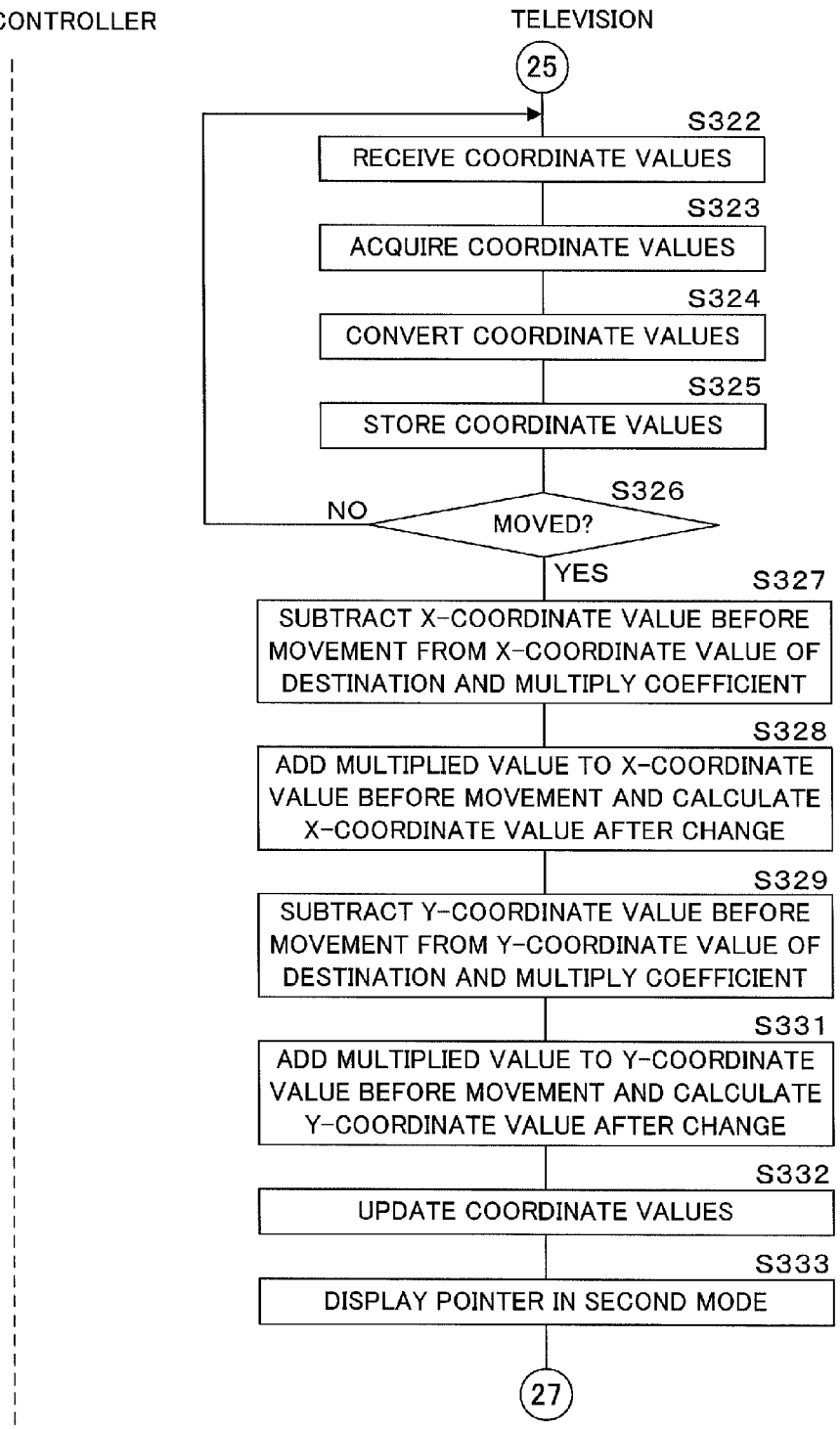
FIG. 32 is a flowchart illustrating a procedure of moving rate lowering processing according to Embodiment 9.

Embodiment 9 relates to an example where the moving rate is reduced if selection is difficult. FIGS. 31 to 33 illustrate a flowchart indicating a procedure of processing for reducing a moving rate according to Embodiment 9. The CPU 21 of the remote controller 2 determines whether or not contact is detected through the touch pad 23 (step S311). If contact is not detected (NO at step S311), the CPU 21 waits until contact is detected. If contact is detected (YES at step S311), the CPU 21 acquires coordinate values at the position of contact (step S312). The CPU 21 determines whether or not non-contact is detected after contact is detected (step S313).

If it is determined that non-contact is detected (NO at step S313), the CPU 21 transmits the acquired coordinate values to the television 1 through the communication unit 26 (step S314). The CPU 21 returns to step S312 and repeats the processing described above. The CPU 11 of the television 1 receives the coordinate values transmitted wirelessly through the communication unit 16 (step S315). The CPU 11 acquires coordinate values output from the communication unit 16 (step S316). The CPU 11 converts the acquired coordinate values based on a conversion equation stored in the storage unit 15 or described in the control program 15P (step S317).

Figure 34A:
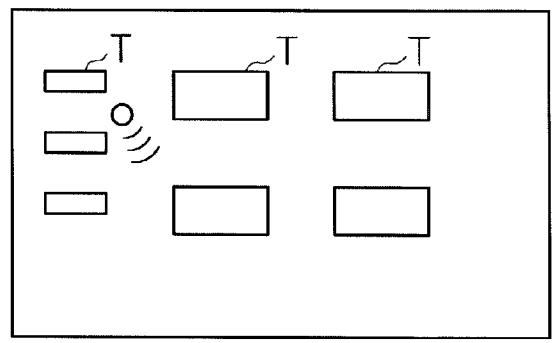
FIG. 34A is an explanatory view illustrating a change of a pointer.
Figure 34B:
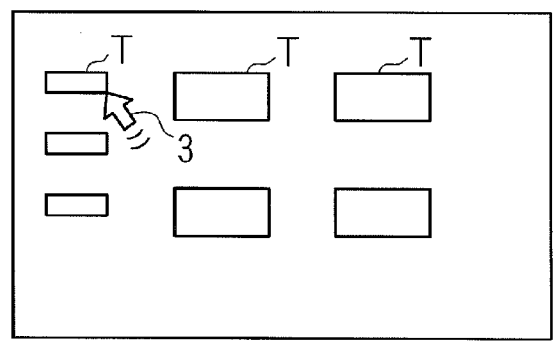
FIG. 34B is an explanatory view illustrating a change of a pointer.
Figure 34C:
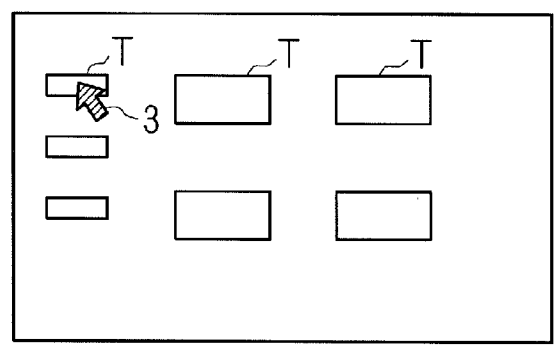
FIG. 34C is an explanatory view illustrating a change of a pointer.

The CPU 11 sequentially stores coordinate values in time series in the RAM 12 (step S318). The CPU 11 reads out an image of the pointer 3 from the storage unit 15. The image of the pointer 3 read out here is assumed to be a white circle which is the first mode. The CPU 11 displays the pointer 3 at the position of the coordinate values after conversion in the first mode on the display unit 14 (step S319). FIGS. 34A to C are explanatory views illustrating the change of the pointer 3. FIG. 3A shows that the pointer 3 of a white circle, which is the first mode, is moving.

The CPU 11 reads out a certain period of time and the first predetermined range that are stored in the storage unit 15 in advance. The CPU 11 determines whether or not the pointer 3 is present in the first predetermined range for the certain period of time (step S321). More specifically, the processing described below is performed so as to detect that the user is performing delicate operation in order to select an object T. The CPU 11 reads out the coordinate values stored in time series in the RAM 12 for the values corresponding to a certain time period (one second, for example). The CPU 11 obtains a variance of the read-out coordinate values and determines that the pointer 3 is present in the predetermined range for a certain period of time when the obtained variance is not more than the threshold which is the first predetermined range stored in the storage unit 15.

Moreover, the CPU 11 may obtain the sum of the moving distances between coordinate values in chronological order, and determine that the pointer is in the predetermined range for a certain period of time when the sum is not more than the threshold which is the first predetermined range stored in the storage unit 15. Furthermore, the CPU 11 extracts the coordinate values closest to the origin of coordinates as well as the coordinate values furthest from the origin of coordinates, from the coordinate values corresponding to the certain period of time. The CPU 11 may determine that the pointer 3 is in the predetermined range for the certain period of time when the distance between the extracted two sets of coordinate values is not more than the threshold stored in the storage unit 15. In addition, the CPU 11 obtains a mean of the coordinate values corresponding to predetermined seconds. The CPU 11 reads out a threshold radius from the storage unit 15. The CPU 11 determines whether or not each of the coordinate values corresponding to the predetermined seconds resides in the threshold radius with its center being the coordinate values concerning the mean. The CPU 11 may determine that the pointer 3 is in the predetermined range for the certain period of time when all the coordinate values are present in the threshold radius.

If it is determined that the pointer 3 is not present within the first predetermined range for the certain period of time (NO at step S321), the CPU 11 returns to step S315. Note that the processing is returned to step S312 also when the data of coordinate values corresponding to the certain period of time is not stored in the RAM 12. If it is determined that the pointer 3 is present in the first predetermined range for the certain period of time (YES at step S321), the CPU 11 proceeds to step S322. At step S314, the CPU 11 again receives the coordinate values transmitted wirelessly (step S322). The CPU 11 acquires coordinate values output from the communication unit 16 (step S323). The CPU 11 converts the acquired coordinate values based on a conversion equation stored in the storage unit 15 or described in the control program 15P (step S324).

The CPU 11 sequentially stores in time series coordinate values in the RAM 12 (step S325). The CPU 11 refers to the coordinate values stored in time series in the RAM 12 and determines whether or not the pointer 3 has moved (step S326). If the pointer 3 has not moved (NO at step S326), the CPU 11 returns to step S322. If it is determined that the pointer 3 has moved (YES at step S326), the CPU 11 proceeds to step S327. The CPU 11 reads out new coordinate values in time series from the RAM 12 as coordinate values of destination. The CPU 11 reads out the next newest coordinate values in time series for the coordinate values of destination from the RAM 12 as the original coordinate values.

The CPU 11 reads out a coefficient from the storage unit 15. The coefficient is, for example, a number larger than 0 and smaller than 1. The user may set an appropriate value through the input unit 13. The CPU 11 stores the input coefficient in the storage unit 15. In the present embodiment, the coefficient is described as 0.5. The X-coordinate value before movement is subtracted from the X-coordinate value of destination, and the value obtained by the subtraction is multiplied by the coefficient (step S327). This lowers the moving rate in the X-axis direction by half. The CPU 11 adds the value obtained by the multiplication to the X-coordinate value before movement and sets the calculated value as the X-coordinate value after change (step S328). The CPU 11 subtracts the Y-coordinate value before movement from the Y-coordinate value after movement and multiplies the value obtained by the subtraction by the coefficient (step S329). This reduces the moving rate in the Y-axis direction by half. The CPU 11 adds the value obtained by the multiplication to the Y-coordinate value before movement and sets the calculated value as the Y-coordinate value after change (step S331).

The CPU 11 updates new coordinate values in time series in the RAM 12 to the coordinate values after change that are calculated at steps S328 and S331, respectively (step S332). The CPU 11 reads out the image of the pointer 3 in the second mode from the storage unit 15. The CPU 11 refers to the coordinate values after change and displays the pointer 3 on the display unit 14 in the second mode (step S333). As shown in FIG. 34B, the pointer 3 is changed to a white arrow which is the second mode and the moving rate is reduced. Note that the second mode may be of another shape, color or pattern, though a white arrow is employed here. Alternatively, sound indicating the change to the second mode may be output from a speaker (not illustrated).

The CPU 11 determines whether or not the pointer 3 is present in the second predetermined range for a certain period of time (step S334). More specifically, the CPU 11 reads out coordinate values that are stored in the RAM 12 and are corresponding to a certain period of time (0.5 seconds for example) in chronological order. This certain period of time may be the same as or different from the time period employed at step S321. The CPU 11 may obtain a variance of the read-out coordinate values and determine that the pointer 3 is in the second predetermined range for the certain period of time when the obtained variance is not more than the threshold stored in the storage unit 15. Note that the size of the second predetermined range may be the same as or different from the first predetermined range. Moreover, the CPU 11 may obtain the sum of moving distances between coordinate values in chronological order and determine that the pointer 3 is in the second predetermined range for the certain period of time when the sum is not more than the threshold stored in the storage unit 15. Furthermore, the CPU 11 extracts the coordinate values closest to the origin of coordinates as well as the coordinate values furthest from the origin of coordinates. The CPU 11 may determine that the pointer 3 is in the second predetermined range for a certain period of time when the distance between the extracted two sets of coordinate values is not more than the threshold stored in the storage unit 15.

If it is determined that the pointer 3 is present in the second predetermined range for the certain period of time (YES at step S334), the CPU 11 proceeds to step S335. The CPU 11 reads out an image of the pointer 3 according to the third mode after change from the storage unit 15. The CPU 11 changes the indication of the pointer 3 to the third mode and displays it on the display unit 14 (step S335). In FIG. 34C, the indication of the pointer 3 according to the second mode is changed to a hatched arrow. If it is determined that the pointer 3 is not present in the second predetermined range for a certain period of time (NO at step S334), the CPU 11 returns to step S321.

If it is determined that non-contact is detected (YES at step S313), the CPU 21 of the remote controller 2 proceeds to step S336. The CPU 21 transmits non-contact information to the television 1 through the communication unit 26 (step S336). The CPU 11 of the television 1 determines whether or not non-contact information is received (step S337). If non-contact information is not received (NO at step S337), the CPU 11 determines whether or not the pointer 3 is changed to the third mode (step S3370). If it is determined that the pointer 3 is not changed to the third mode (NO at step S3370), the CPU 11 proceeds to step S3313. If it is determined that the pointer 3 is changed to the third mode (YES at step S3370), the CPU 11 returns to step S334.

If it is determined that non-contact information is received (YES at step S337), the CPU 11 proceeds to step S338. Note that the CPU 11 may proceed to step S338 when transmission of coordinate values from the remote controller 2 which is received wirelessly by the communication unit 16 is stopped. The CPU 11 reads out the coordinate values for the pointer 3 (step S338). More specifically, the CPU 11 reads out the final coordinate values stored in the RAM 12 at step S332.

The CPU 11 determines whether or not the object T is present on the final coordinate values (step 339). If it is determined that the object T is present (YES at step S339), the CPU 11 performs input processing for the object T at the final coordinate values (step S3310). The CPU 11 reads out an animated image from the storage unit 15 (step S3311). The CPU 11 displays the animated image according to the fourth mode on the display unit 14 as an image of the pointer 3 (step S3312). If it is determined that the object T is not present at the final coordinate values (NO at step S339), the CPU 11 proceeds to step S3313. If NO is chosen at step S339 or S3370, the CPU 11 erases the pointer 3 from the display unit 14 and terminates the processing (step S3313). Accordingly, even when the size of the object T is so small that it is difficult to be selected as in the case of an icon on a keyboard, an object T may intuitively be selected with higher accuracy by reducing the moving rate.

Embodiment 9 is as described above and the other configuration parts thereof are similar to those in Embodiments 1 to 8, corresponding parts are denoted by the same reference numbers and will not be described in detail.

Embodiment 10

Figure 37:
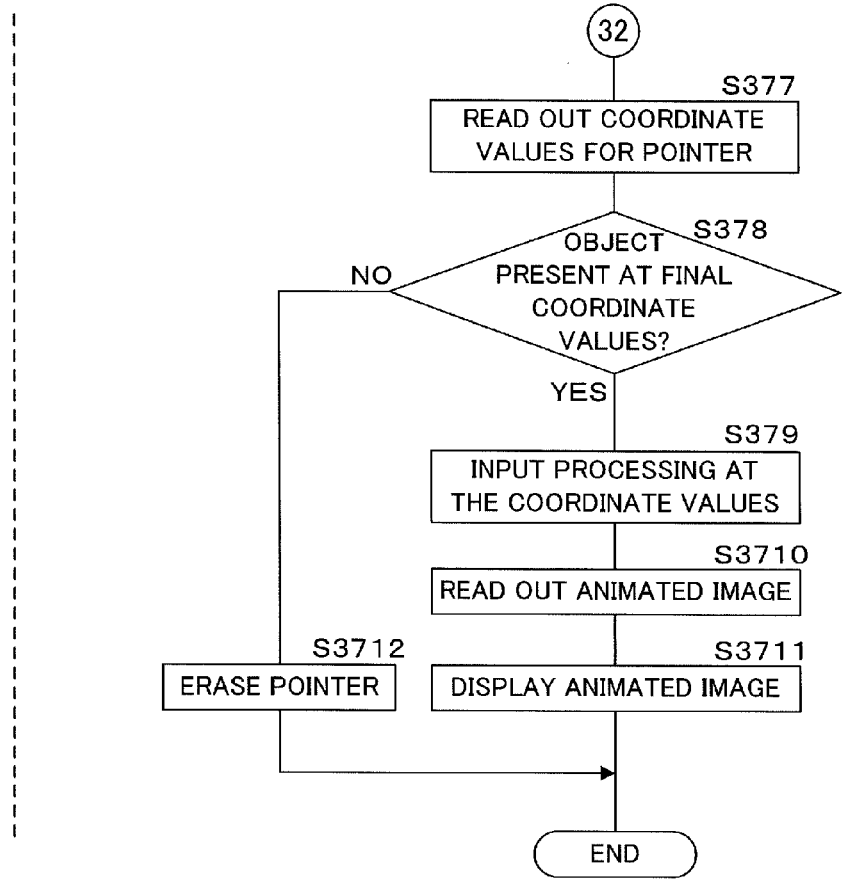
FIG. 37 is a flowchart illustrating a procedure of moving rate lowering processing according to Embodiment 10.

Embodiment 10 relates to an example in which a determination is made on the remote controller 2 side. FIGS. 35 to 37 illustrate a flowchart indicating a procedure of the processing for reducing a moving rate according to Embodiment 10. The CPU 21 of the remote controller 2 determines whether or not contact is detected through the touch pad 23 (step S351). If contact is not detected (NO at step S351), the CPU 21 waits until contact is detected. If contact is detected (YES at step S351), the CPU 21 acquires coordinate values at the position of contact (step S352). The CPU 21 sequentially stores the acquired coordinate values in time series in the RAM 22 (step S353). The CPU 21 determines whether or not the acquired coordinate values are present in the first predetermined range for a certain period of time (step S354).

More specifically, the processing below is performed so as to detect on the remote controller 2 side that the user is performing delicate operation for selecting an object T. The CPU 21 reads out the coordinate values stored in time series in the RAM 22 that correspond to a certain period of time (one second, for example). The CPU 21 obtains a variance of the read-out coordinate values and determines that the pointer 3 is in a predetermined range for the certain period of time when the obtained variance is not more than a threshold which is the first predetermined range stored in the storage unit 25. Moreover, the CPU 21 may obtain the sum of moving distances between coordinate values in chronological order, and determine that the coordinate values are in the first predetermined range for the certain period of time when the sum is not more than the threshold which is the first predetermined range stored in the storage unit 25.

Moreover, the CPU 21 extracts sets of coordinate values closest to and furthest to the origin of coordinates from the coordinate values corresponding to the certain period of time. The CPU 21 may determine that the coordinate values are in the second predetermined range for the certain period of time when the distance between the extracted two sets of coordinate values is not more than the threshold stored in the storage unit 25. Alternatively, the CPU 21 may obtain a mean of coordinate values corresponding to a predetermined number of seconds. The CPU 21 reads out a threshold radius from the storage unit 25. The CPU 21 determines whether or not each of the coordinate values corresponding to the predetermined number of seconds resides in the threshold radius with the coordinate values concerning the mean set as the center. The CPU 21 may determine that the acquired coordinate values are in the predetermined range for the certain period of time when all the coordinate values are present within the threshold radius.

If it is determined that the coordinate values associated with the continuous contact input acquired from the touch pad 23 is not present within the first predetermined range for the certain period of time (NO at step S354), the CPU 21 transmits the final coordinate values to the television 1 through the communication unit 26 (step S355). More specifically, the CPU 21 transmits at step S353 the coordinate values stored last in time series in the RAM 22. If it is determined that the acquired coordinate values are present within the first predetermined range for the certain period of time (YES at step S354), the CPU 21 proceeds to step S356 where the processing of reducing a moving rate is performed.

The CPU 21 reads out new coordinate values in time series from the RAM 22 as the coordinate values of destination. The CPU 21 reads out the next newest coordinate values in time series for the coordinate values of destination as the original coordinate values. The CPU 21 reads out a coefficient from the storage unit 25. The coefficient is, for example, a number larger than 0 and smaller than 1. The user may set an appropriate value through the touch pad 23. The CPU 21 stores the input coefficient in the storage unit 25. The coefficient may alternatively be set through the input unit 13. Here, the CPU 21 of the television 1 transmits the accepted coefficient to the remote controller 2 through the communication unit 26. The CPU 21 of the remote controller 2 stores the coefficient received through the communication unit 26 in the storage unit 25. In the present embodiment, the coefficient is described as 0.5.

The CPU 21 subtracts the X-coordinate value before movement from the X-coordinate value after movement and multiplies the value obtained by the subtraction by the coefficient (step S356). This lowers the moving rate in the X-axis direction by half. The CPU 21 adds the value obtained by the multiplication to the X-coordinate value before movement and sets the calculated value as the X-coordinate value after change (step S357). The CPU 21 subtracts the Y-coordinate value before movement from the Y-coordinate value after movement and multiplies the value obtained by the subtraction by the coefficient (step S358). This reduces the moving rate in the Y-axis direction by half. The CPU 21 adds the value obtained by the multiplication to the Y-coordinate value before movement and sets the calculated value as the Y-coordinate value after change (step S359).

The CPU 21 updates the new coordinate values in time series in the RAM 22 to the coordinate values after change calculated at steps S357 and S359, respectively (step S361).

The CPU 11 transmits the coordinate values after update and the second mode information indicating the reduction in the moving rate (step S362). It is noted that the coordinate values after update are the last coordinate values in time series stored in the RAM 22 at step S361. The CPU 21 determines whether or not non-contact is detected based on the output from the touch pad 23 (step S363).

If it is determined that non-contact is not detected (NO at step S363), the CPU 21 returns to step S352. Meanwhile, the CPU 11 of the television 1 receives the coordinate values transmitted at step S355, or the coordinate values transmitted at step S362 and the second mode information through the communication unit 16 (step S364). The CPU 11 acquires the coordinate values output from the communication unit 16 (step S365). The CPU 11 converts the acquired coordinate values based on a conversion equation stored in the storage unit 15 or described in the control program 15P (step S366).

The CPU 11 sequentially stores coordinate values in time series in the RAM 12 (step S367). The CPU 11 determines whether or not the second mode information is received together with the coordinate values at step S364 (step S368). If it is determined that the second mode information is not received (NO at step S368), the CPU 11 proceeds to step S371. The CPU 11 reads out an image of the pointer 3 concerning the first mode from the storage unit 15. Here, the image of the pointer 3 to be read out is assumed as a white circle which corresponds to the first mode. The CPU 11 displays the pointer 3 on the display unit 14 in the first mode at the position of coordinate values after conversion (step S371). Subsequently, the CPU 11 returns to step S364 and repeats the processing described above.

If it is determined that the second mode information is received (YES at step S368), the CPU 11 proceeds to step S372. The CPU 11 reads out an image of the pointer 3 concerning the second mode from the storage unit 15. Here, the image of the pointer 3 to be read out is assumed as a white arrow which corresponds to the second mode. The CPU 11 displays the pointer 3 on the display unit 14 in the second mode at the position of coordinate values after conversion (step S372). This allows the user to recognize the reduction in the moving rate.

The CPU 11 determines whether or not the pointer 3 is present in the second predetermined range for a certain period of time (step S373). More specifically, the CPU 11 reads out in chronological order the coordinate values stored in the RAM 12 that correspond to a certain period of time (0.5 seconds, for example). The certain period of time may be the same as or different from the time period employed at step S321. The CPU 11 may obtain a variance of the read-out coordinate values and determine that the pointer 3 is within the second predetermined range for the certain period of time when the obtained variance is not more than the threshold stored in the storage unit 15. It is noted that the size of the second predetermined range may be the same as or different from the first predetermined range. Moreover, the CPU 11 may obtain the sum of moving distances between coordinate values in chronological order and determine that the pointer 3 is in the second predetermined range for the certain period of time when the sum is not more than the threshold stored in the storage unit 15. Furthermore, the CPU 11 extracts sets of coordinate values closest to or furthest from the origin of coordinates. The CPU 11 may determine that the pointer 3 is in the second predetermined range for the certain period of time when the distance between the extracted two sets of coordinates is not more than the threshold stored in the storage unit 15.

If it is determined that the pointer 3 is present within the second predetermined range for the certain period of time (YES at step S373), the CPU 11 proceeds to step S374. The CPU 11 reads out from the storage unit 15 an image of the pointer 3 concerning the third mode after change. The CPU 11 changes the indication of the pointer 3 to the third mode and displays it on the display unit 14 (step S374). Subsequently, the CPU 11 proceeds to step S376. If it is determined that the pointer 3 is not present in the second predetermined range for the certain period of time (NO at step S373), the CPU 11 returns to step S364.

If it is determined that non-contact is detected (YES at step S363), the CPU 21 of the remote controller 2 proceeds to step S375. The CPU 21 transmits non-contact information to the television 1 through the communication unit 26 (step S375). The CPU 11 of the television 1 determines whether or not the non-contact information is received (step S376). If the non-contact information is not received (NO at step S376), the CPU 11 proceeds to step S364.

If it is determined that the non-contact information is received (YES at step S376), the CPU 11 proceeds to step S377. It is noted that the CPU 11 may proceed to step S377 when the transmission of coordinate values from the remote controller 2 is stopped, which is received at the communication unit 16 wirelessly through non-contact. The CPU 11 reads out coordinate values for the pointer 3 (step S377). More specifically, the CPU 11 reads out the final coordinate values stored in the RAM 12 at step S367.

The CPU 11 determines whether or not the object T is present on the final coordinate values (step S378). If it is determined that the object T is present (YES at step S378), the CPU 11 performs input processing for the object T at the final coordinate values (step S379). The CPU 11 reads out an animated image from the storage unit 15 (step S3710). The CPU 11 displays an animated image concerning the fourth mode on the display unit 14 as the image of the pointer 3 (step S3711). If it is determined that the object T is not present at the final coordinate values (NO at step S378), the CPU 11 erases the pointer 3 from the display unit 14 and terminates the processing (step S3712). Accordingly, even when the size of the object T is so small that it is difficult to be selected as in the case of an icon on a keyboard, the object T may intuitively be selected with higher accuracy by reducing the moving rate.

Embodiment 10 is as described above and the other configuration parts are similar to those in Embodiments 1 to 9. Corresponding parts are therefore denoted by the same reference numbers and will not be described in detail.

Embodiment 11

Figure 38:
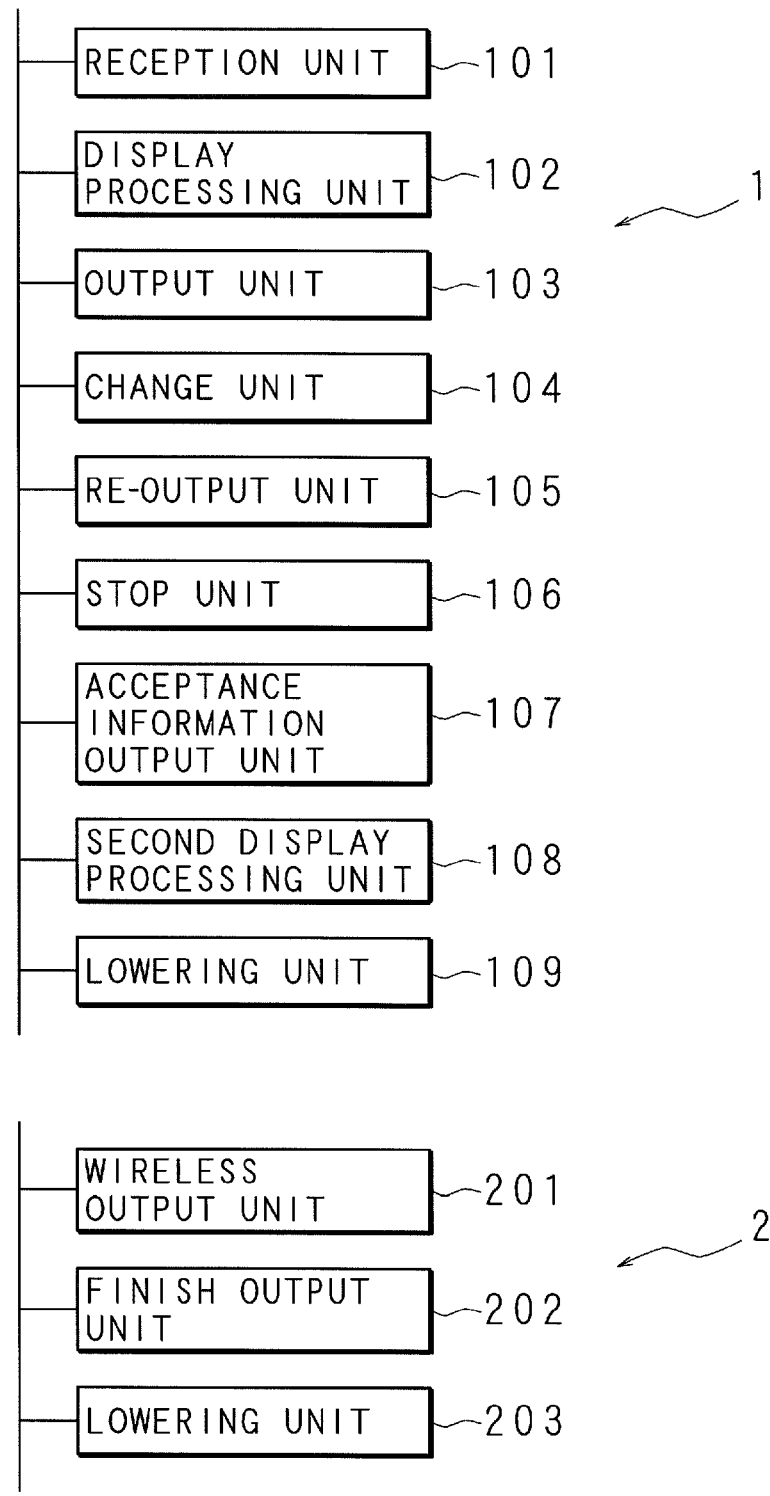
FIG. 38 is a functional block diagram illustrating operation of a television and a remote controller in the form described above.

FIG. 38 is a functional block diagram illustrating operation of the television 1 and remote controller 2 of the above-described embodiments. By the CPU 11 executing the control program 15P or the like, the television 1 operates as follows. The television 1 includes a reception unit 101, a display processing unit 102, an output unit 103, a change unit 104, a re-output unit 105, a stop unit 106, an acceptance information output unit 107, a second display processing unit 108 and a reducing unit 109. The reception unit 101 wirelessly receives coordinate values associated with continuous contact input from the remote controller 2 having the touch pad 23 or a touch panel.

The display processing unit 102 displays on the display unit 14 the pointer 3 moved based on the coordinate values received at the reception unit 101. When the continuous input is finished, the output unit 103 outputs acceptance information indicating that an input is accepted at the final coordinate values displayed by the display processing unit 102. The change unit 104 changes the indication of the pointer 3 when the pointer 3 displayed on the display unit 14 is present within a predetermined range for a certain period of time. The re-output unit 105 outputs the acceptance information again at the final coordinate values when tap operation is accepted through the remote controller 2 within a predetermined period of time after the acceptance information is output from the output unit 103. The stop unit 106 stops display of the acceptance information by the output unit 103 when the continuous contact input is finished before the change made by the change unit 104.

The acceptance information output unit 107 outputs acceptance information at the final coordinate values for the pointer 3 displayed on the display unit 14 when tap operation through the remote controller 2 is accepted within a predetermined period of time after the indication of the pointer 3 is changed by the change unit 104. The second display processing unit 108 displays the second display region 32 superposed on the first display region 31 when the pointer 3 moving in the first display region 31 on the display unit 14 resides in the predetermined region 311, based on the coordinate values received at the reception unit 101. The reducing unit 109 reduces the moving rate of the pointer 3 based on the coordinate values received at the reception unit 101 when the distance between the object T displayed on the display unit 14 and the pointer 3 displayed on the display unit 14 is within a predetermined distance.

The remote controller 2 includes a wireless output unit 201, a finish output unit 202 and a reducing unit 203. The wireless output unit 201 outputs coordinate values associated with continuous contact input for the touch pad 23 or a touch panel wirelessly to the television 1. When the continuous contact input for the touch pad 23 or touch panel is finished, the finish output unit 202 outputs wirelessly to the television 1 finish information indicating that the continuous contact input is finished. The reducing unit 203 reduces the moving rate of the coordinate values when the coordinate values associated with continuous contact input for the touch pad 23 or touch panel are present within the first predetermined range for the certain period of time.

Figure 39:
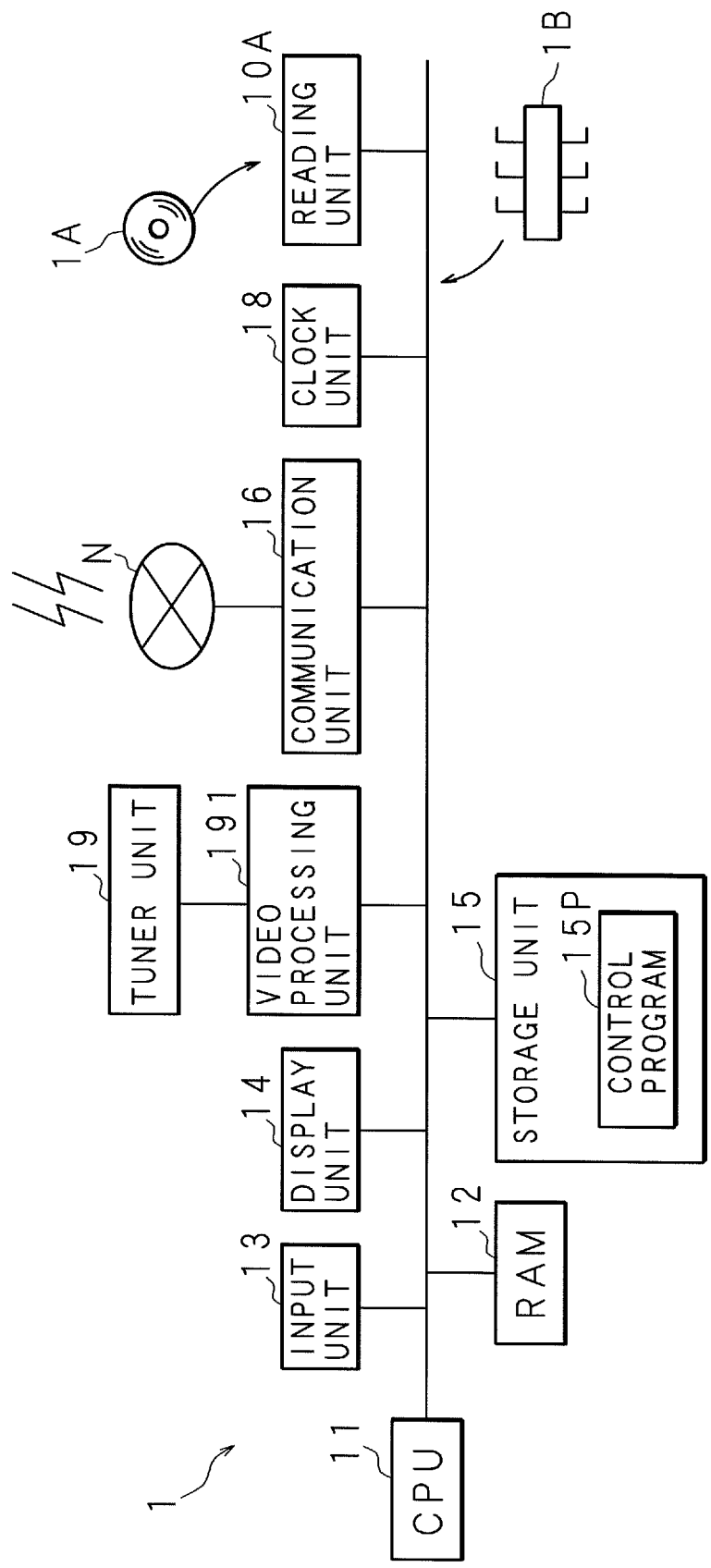
FIG. 39 is a block diagram illustrating a hardware group of a television according to Embodiment 11.

FIG. 39 is a block diagram indicating a hardware group of the television 1 according to Embodiment 11. A program for operating the television 1 may be read by a reading unit 10A such as a disk drive, which reads a portable recording medium 1A such as a CD-ROM, a DVD (Digital Versatile Disc) or a USB memory, and be stored in the storage unit 15. It is also possible to install a semiconductor memory 1B, such as a flash memory in which the program is stored, in the television 1. Furthermore, the program may also be downloaded from another server computer (not illustrated) which is connected via a communication network N such as the Internet. This will be described below in detail.

The television 1 illustrated in FIG. 39 reads from a portable recording medium 1A or a semiconductor memory 1B or downloads from another server computer (not illustrated) via a communication network N a program for executing various kinds of software processing described in the embodiment. The program is installed as the control program 15P and loaded to the RAM 12 to be executed. This allows the television 1 to function as described above.

Embodiment 11 is as described above and the other configuration parts thereof are similar to Embodiments 1 to 10. Corresponding parts are therefore denoted by the same reference numbers and will not be described in detail.

Embodiment 12

Embodiment 12 relates to an example where a three-dimensional input device is used. FIG. 40 is a schematic diagram illustrating an outline of an information processing system according to Embodiment 12. In the embodiment described below, the remote controller 2 capable of detecting the position in the planar direction on the touch pad 23 or touch panel and the distance in the vertical direction from a tip of a user's finger or a stylus serving as a pointer to a plane of the touch pad 23 or touch panel. The pointer may be a finger, a stylus, a writing material or the like. The description below assumes that the pointer is a finger. Plane coordinate values corresponding to the position in the planar direction and a distance coordinate value corresponding to the distance are output from the remote controller 2 to the television 1. In FIG. 40, the plane longitudinal direction of the remote controller 2 is set as the X-axis direction while the transverse direction thereof is set as the Y-axis direction. Moreover, the direction away from the plane of the remote controller 2 is set as the Z-axis positive direction.

The pointer 3 is displayed in the first display region 31 on the display unit 14 of the television 1 in association with the plane coordinate values. The pointer 3 moves in response to a change in the plane coordinate values. For the television 1 also, the longitudinal direction of the display unit 14 is set as the X-axis direction, while the transverse direction is set as the Y-axis direction. In the case where the pointer 3 resides in a predetermined region, the second display region 32 is displayed on the display unit 14 to be superposed on the first display region 31. In the first display region 31 and the second display region 32, the object T is displayed. Moreover, the pointer 3 is displayed also in the second display region 32 in association with the plane coordinate values. The pointer 3 moves in response to a change in the plane coordinate values. Details will be described below.

Figure 41:
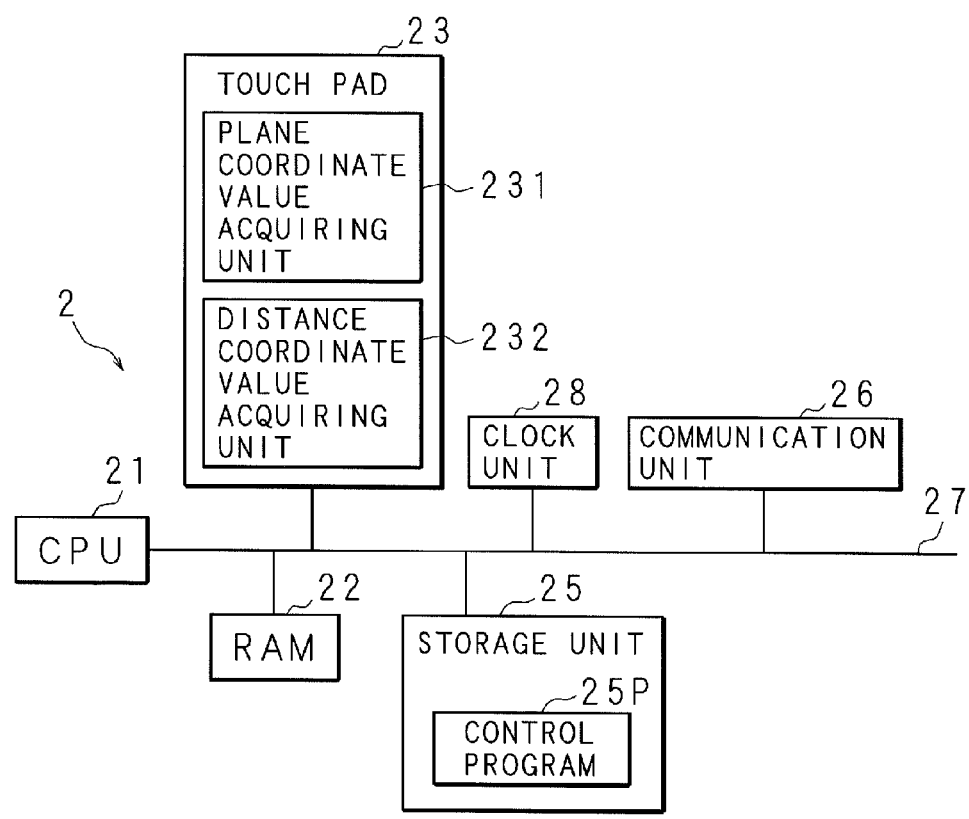
FIG. 41 is a block diagram illustrating a hardware group of a remote controller according to Embodiment 12.

FIG. 41 is a block diagram illustrating a group of hardware units in the remote controller 2 according to Embodiment 12. The remote controller 2 includes a CPU 21 as a control unit, a RAM (Random Access Memory) 22, a touch pad 23, a storage unit 25, a clock unit 28, a communication unit 26 and the like. The CPU 21 is connected to each of the hardware units via a bus 27. The CPU 21 controls each of the hardware units in accordance with the control program 25P stored in the storage unit 25. The RAM 22 is, for example, a SRAM, a DRAM or a flash memory. The RAM 22 also functions as a storage unit, and temporarily stores various kinds of data generated when the CPU 21 executes different programs.

The touch pad 23 includes a plane coordinate value acquiring unit 231 and a distance coordinate value acquiring unit 232. The touch pad 23 detecting the planar direction and the distance to the plane employs, for example, a capacitive type or a type including a combination of an infrared sensor or a magnetic sensor, as described in Publication of United States Patent Application No. 2011/0279397 and Yuichi Okano and two others, "Three-Dimensional Touch Panel Capable of Detection by Proximity/Contact of Finger," Information Processing Society of Japan Technical Report, Jan. 26, 2009, p 9-p 14. The distance coordinate value acquiring unit 232 acquires a vertical distance from the tip of a finger positioned on (on the upper side of) a contact plane of the touch pad 23, and outputs the acquired distance to the CPU 21. In the present embodiment, the distance coordinate value acquiring unit 232 is able to detect the vertical distance to the plane when it is not more than 5 cm. It is assumed in the description that the distance coordinate value acquiring unit 232 is able to detect the distance until the distance becomes 0 cm, i.e., until the finger touches the plane.

The plane coordinate value acquiring unit 231 outputs plane coordinate values for a position where the distance is zero, i.e., when the finger touches the contact plane, to the CPU 21. Furthermore, the plane coordinate value acquiring unit 231 outputs plane coordinate values for a position where a vertical line from the tip of a finger crosses the contact plane to the CPU 21. The clock unit 28 outputs date and time information to the CPU 21. The communication unit 26 as a wireless output unit wirelessly transmits information such as a coordinate value, which employs, for example, a wireless LAN (Local Area Network) module, an RF module, an infrared communication module or a Bluetooth (Registered Trademark) module. The present embodiment describes an example where a wireless LAN module is used to transmit/receive information between the television 1 and Bluetooth (Registered Trademark). The storage unit 25 is, for example, a large-capacity flash memory or a hard disk, which stores the control program 25P.

Figure 42:
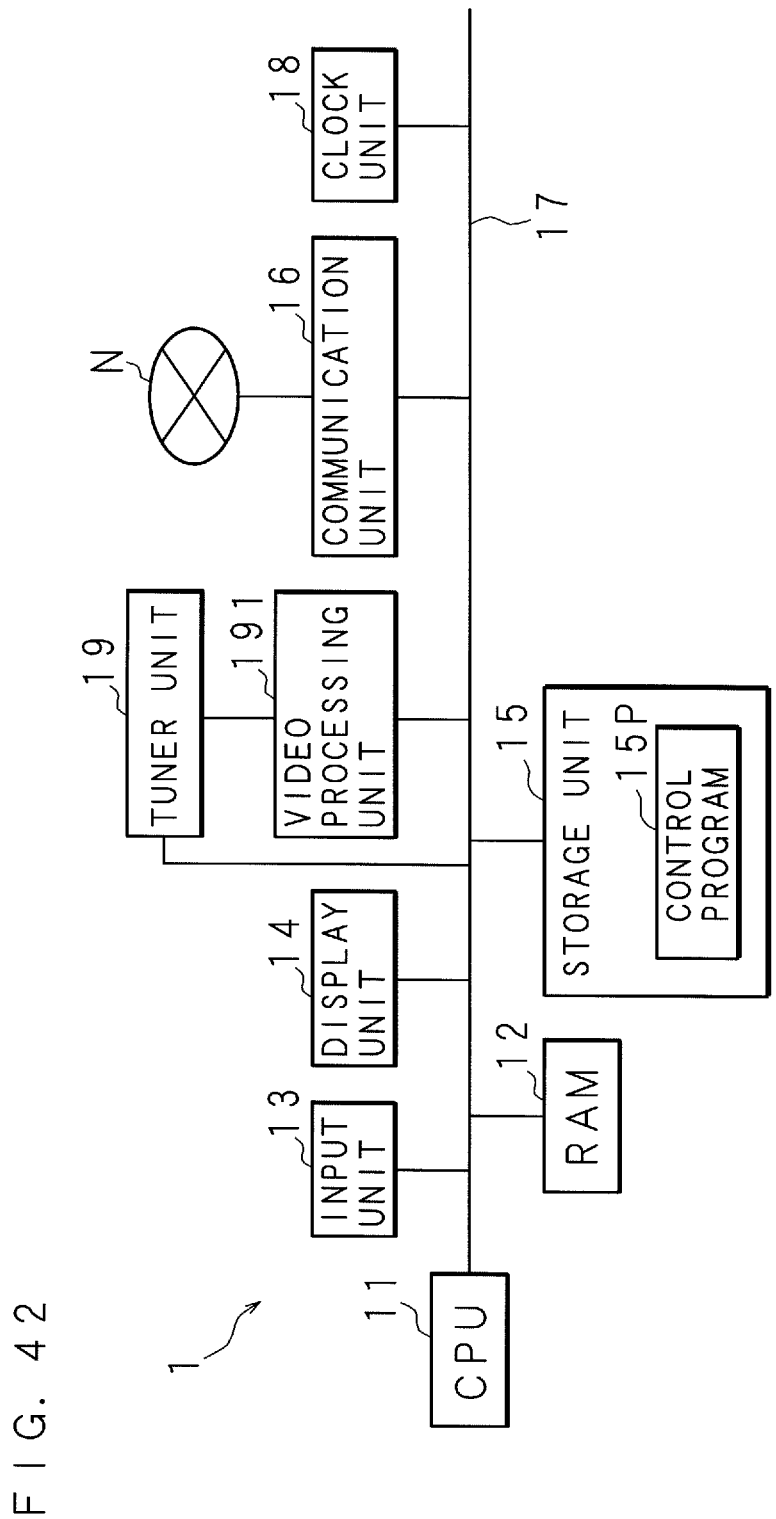
FIG. 42 is a block diagram illustrating a hardware group of a television according to Embodiment 12.

FIG. 42 is a block diagram illustrating a group of hardware units in the television 1 according to Embodiment 12. The television 1 as a television receiver includes a CPU 11, a RAM 12, an input unit 13, a display unit 14, a storage unit 15, a clock unit 18, a tuner unit 19, a video processing unit 191, a communication unit 16 and the like. The CPU 11 is connected to each of the hardware units via a bus 17. The CPU 11 controls each of the hardware units in accordance with the control program 15P stored in the storage unit 15. The RAM 12 is, for example, a SRAM, a DRAM or a flash memory. The RAM 12 also functions as a storage unit, which temporarily stores various kinds of data generated when the CPU 11 executes different programs.

The input unit 13 is an input device such as an operational button, and outputs accepted operational information to the CPU 11. The display unit 14 is, for example, a liquid-crystal display, a plasma display or an organic EL display, which displays various kinds of information in accordance with an instruction of the CPU 11. The clock unit 18 outputs date and time information to the CPU 11. The communication unit 16 serving as a reception unit is a wireless LAN module, which transmits/receives information to/from the remote controller 2. It is noted that an infrared communication module or Bluetooth (Registered Trademark) module may also be used as the communication unit 16, as in the case of the remote controller 2. The storage unit 15 is, for example, a hard disk or a large-capacity flash memory, which stores the control program 15P.

The tuner unit 19 as a broadcasting receiver outputs a received video signal concerning broadcast wave such as terrestrial digital wave or BS digital wave to a video processing unit 191. The video processing unit 191 performs video processing and outputs an image obtained after video processing to the display unit 14. Furthermore, the communication unit 16 transmits and receives information to/from another server computer (not illustrated) through the communication network N such as the Internet by HTTP (HyperText Transfer Protocol). The communication unit 16 outputs a Web page and contents such as a moving image file received from the server computer to the CPU 11. The CPU 11 displays the Web page on the display unit 14. In the example of FIG. 40, a Web page for menu is downloaded and objects T in the Web page are displayed.

FIG. 43 is an explanatory view illustrating coordinate values to be transmitted. The CPU 21 of the remote controller 2 transmits the plane coordinate values and distance coordinate value output from the touch pad 23 to the television 1. In the example of FIG. 43, the coordinate values of (100, 120, 5) are transmitted first. It is noted that the values indicated by the coordinate values X, Y are plane coordinate values, whereas the value indicated by the coordinate value Z is the distance coordinate value. Here, it may be understood that the length of the line vertical to the plane of the touch pad 23 from the tip of a finger is 5 in distance. It may also be understood that the plane coordinate values at which the vertical line crosses the plane of the touch pad 23 are (100, 120). When the finger is in contact with the touch pad 23, the distance will be 0, and the CPU 21 of the remote controller 2 outputs the coordinate values (156, 84, 0) to the television 1. The communication unit 16 of the television 1 receives coordinate values transmitted from the remote controller 2.

The CPU 11 stores the coordinate values output from the communication unit 16 in the RAM 12. The CPU 11 converts plane coordinate values of the stored coordinate values into plane coordinate values in the coordinate system of the display unit 14 based on a conversion equation stored in the storage unit 15. The CPU 11 displays the object T on the first display region 31. The CPU 11 displays the pointer 3 on the first display region 31 at the position corresponding to the plane coordinate values after conversion. The CPU 11 displays the pointer 3 moving in correspondence to the plane coordinate values after conversion until zero is input as the distance coordinate.

Figure 44A:
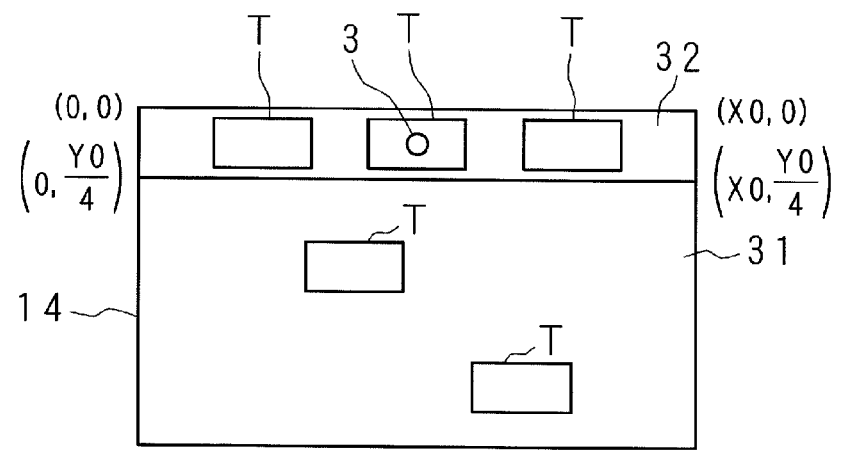
FIG. 44A is an explanatory view illustrating a display image of the second display region.

FIGS. 44A and B illustrate explanatory views showing display images of the second display region 32. The CPU 11 reads out a predetermined region stored in the storage unit 15 in advance. The predetermined region may be, for example, one fourth of the first display region 31 on the upper side. It is assumed that the upper left of the first display region 31 is set as the origin coordinate values (0, 0), the maximum coordinate value of the X-coordinate is set as X0, the maximum coordinate value of the Y-coordinate is set as Y0, and the coordinate value corresponding to one fourth of Y0 from the origin is set as Y0/4. Here, the predetermined region is a region enclosed by (0, 0), (X0, 0), (0, Y014), (X0, Y0/4). Though the predetermined region is set as one fourth on the upper side in the present embodiment, it is not limited thereto. In addition, the predetermined region is not limited to have a rectangular shape but may have another shape such as a circle, an oval or a polygon. The predetermined region may also be a region corresponding to a fraction on the lower side or the right side. The CPU 11 displays the second display region 32 to be superposed on the first display region 31 when the pointer 3 resides in the predetermined region. More specifically, the CPU 11 displays the second display region 32 by scrolling it from top to bottom so as to cover the predetermined region of the first display region 31.

Figure 44B:
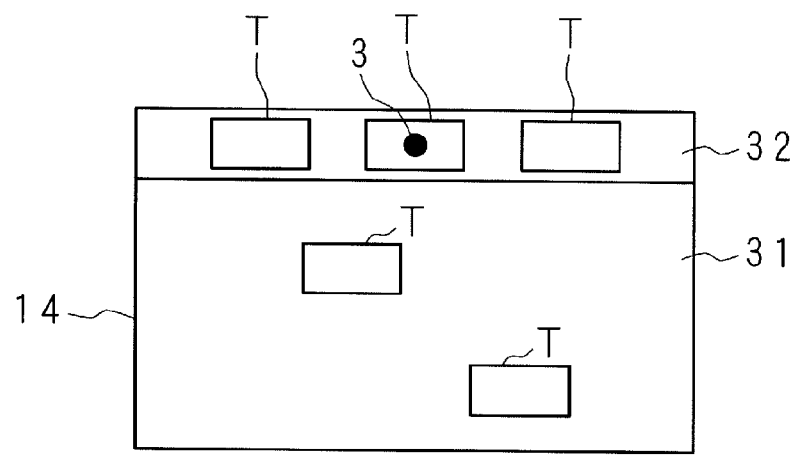
FIG. 44B is an explanatory view illustrating a display image of the second display region.

The CPU 11 displays the pointer 3 on the second display region 32 when the coordinates for the pointer 3 is present in the predetermined region. FIG. 44A shows the pointer 3 moving on the second display region 32. FIG. 44B illustrates a state where an input for an object T is accepted on the second display region 32. If the distance coordinate becomes zero, the CPU 11 outputs acceptance information indicating that the input for the object T corresponding to the plane coordinates of the pointer 3 is accepted.

The output of the acceptance information may be performed by, for example, the processing of changing the color of the pointer 3 from that at the time of movement to that at the time of accepting input. In the example of FIGS. 44A and 44B, animated images are displayed where the pointer 3 is indicated by a white circle when moving and by a black circle at the time of input. Though the animation display is used in the present embodiment, it is not limited thereto. Sound may also be output from a speaker (not illustrated). Software processing in the hardware configuration described above will now be described with reference to a flowchart.

FIG. 45 is a flowchart illustrating a display processing procedure for the second display region 32. In the description below, it is assumed that the distance coordinate value is not zero and the pointer 3 corresponding to the plane coordinate values is displayed in the first display region 31. The CPU 21 of the remote controller 2 determines whether or not the plane coordinate values output from the touch pad 23 are within the predetermined region stored in the storage unit 25 (step S451). If it is determined that the values are not in the predetermined region (NO at step S451), the CPU 21 waits until they are in the predetermined region. If it is determined that the values are in the predetermined region (YES at step S451), the CPU 21 outputs information indicating that the values fall within the predetermined region to the television 1 through the communication unit 26.

The CPU 11 of the television 1 executes the processing of drawing the second display region 32 as described below when the information indicating that the values are within the predetermined region is received (step S453). The CPU 11 displays the second display region 32 superposed to cover the predetermined region on the first display region 31 (step S454). The CPU 11 draws the pointer 3 at the position corresponding to the plane coordinate values output from the remote controller 2 (step S455). Moreover, the CPU 11 moves the pointer 3 every time when the plane coordinate values output from the remote controller 2 changes (step S456).

The CPU 21 of the remote controller 2 determines whether or not the distance coordinate value output from the touch pad 23 is changed from a positive value to zero (step S457). If it is not changed to zero (NO at step S457), the CPU 21 returns to step S451. If it is determined that the distance coordinate value is changed to zero (YES at step S457), the CPU 21 proceeds to step S458. The CPU 21 outputs the input information indicating that an input is performed to the television 1 through the communication unit 26 (step S458).

The CPU 11 of the television 1 starts input processing as described below when the input information is received through the communication unit 16 (step S459). The CPU 11 reads out an animation processing program stored in the storage unit 15 and displays an animated image of the pointer 3 indicating that the input for the object T is accepted (step S4510). It is noted that a part of the processing described with reference to FIG. 45 may also be executed on the television 1 side. Details will be described below.

Figure 46:
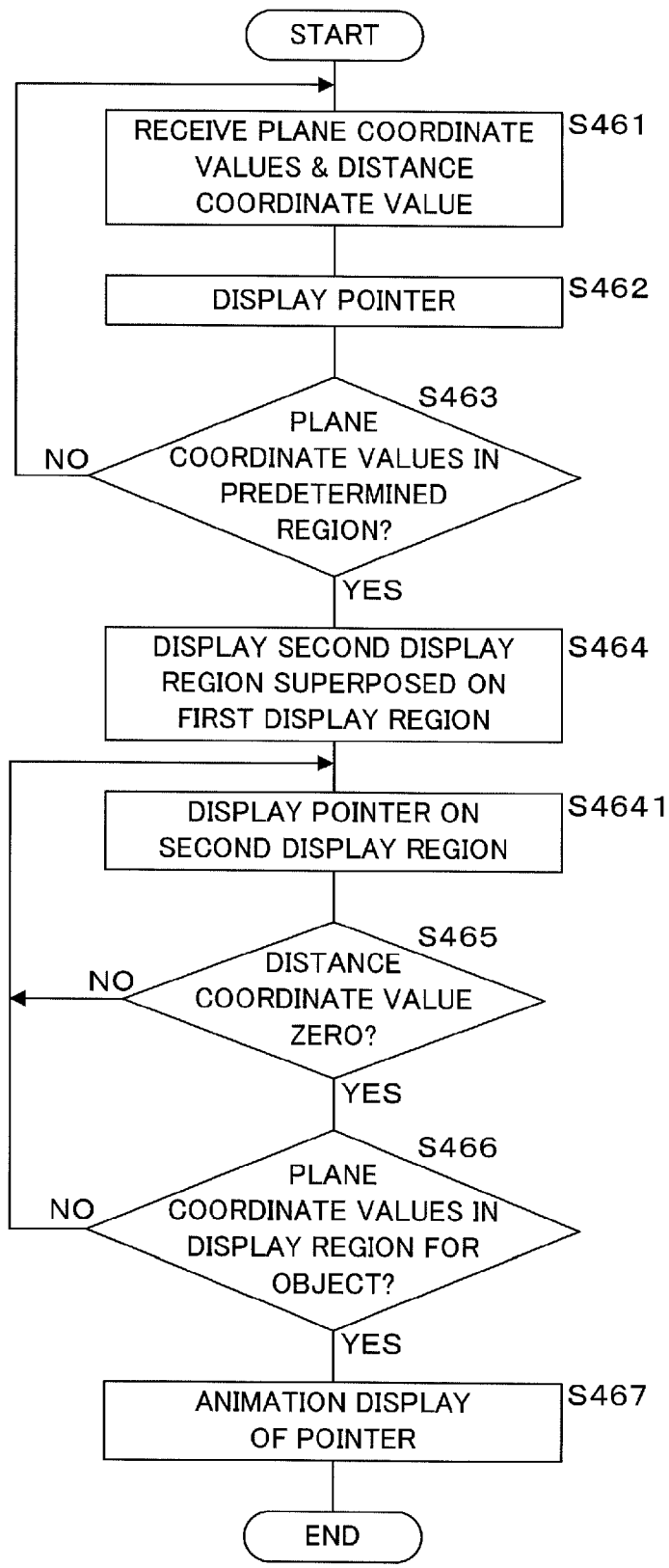
FIG. 46 is a flowchart illustrating a procedure of display processing for the second display region.

FIG. 46 is a flowchart illustrating a procedure of display processing for the second display region 32. The CPU 11 receives plane coordinate values and a distance coordinate value from the remote controller 2 (step S461). The CPU 11 displays the pointer 3 on the first display region 31 based on the plane coordinate values (step S462). The CPU 11 determines whether or not the plane coordinate values are within the predetermined region stored in the storage unit 15 (step S463). If it is determined that the values are not in the predetermined region (NO at step S463), the CPU 11 returns to step S461.

If it is determined that the distance coordinate value is not zero and the plane coordinate values reside in the predetermined region (YES at step S463), the CPU 11 proceeds to step S464. The CPU 11 displays the second display region 32 superposed to cover the predetermined region on the first display region 31 (step S464). The CPU 11 displays the pointer 3 on the second display region 32 based on the plane coordinate values transmitted from the remote controller 2 (step S4641). The CPU 11 determines whether or not the distance coordinate value is changed from a positive value to zero (step S465). If it is determine that the value is not zero (NO at step S465), the CPU 11 returns to step S4641.

If it is determined that the distance coordinate value is changed to zero (YES at step S465), the CPU 11 proceeds to step S466. The CPU 11 reads out a display region for the object T displayed on the second display region 32. The CPU 11 determines whether or not the plane coordinate values transmitted from the remote controller 2 are within the display region for the object T (step S466). If it is determined that the values are not in the display region (NO at step S466), the CPU 11 returns to step S4641. If it is determined that the values are within the display region for the object T (YES at step S466), the CPU 11 proceeds to step S467. The CPU 11 displays the animated image of the pointer 3 at the position of the plane coordinate values as acceptance information indicating that the input for the object T is accepted (step S467). This allows the user to perform appropriate input processing while utilizing a distance to the touch pad 23, without looking at the remote controller.

Embodiment 12 is as described above, and the other configuration parts are similar to those in Embodiments 1 through 11. Corresponding parts are therefore denoted by the same reference numbers and will not be described in detail.

Embodiment 13

Figure 47:
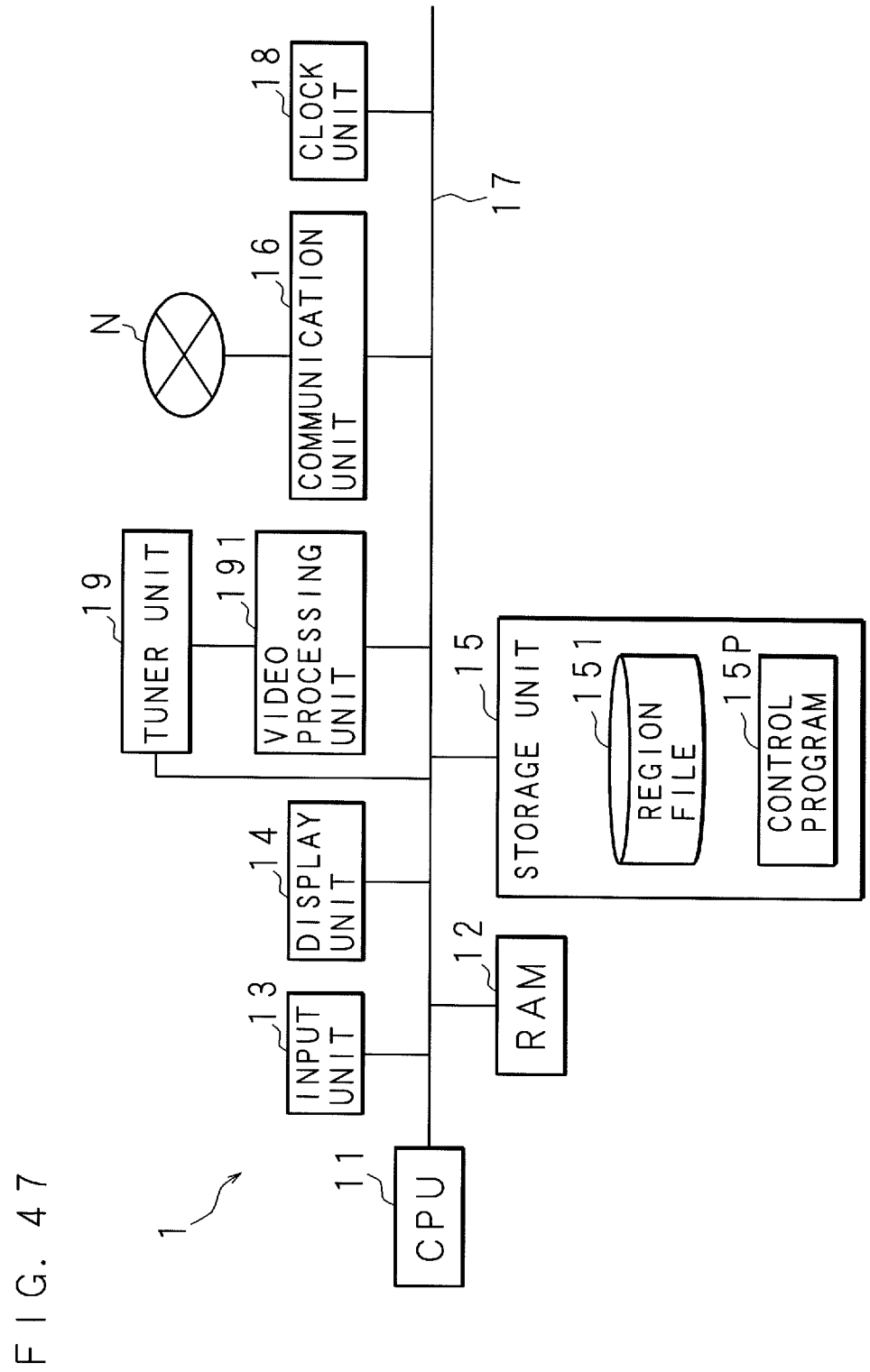
FIG. 47 is a block diagram illustrating a hardware group of a television according to Embodiment 13.

Embodiment 13 relates to an example in which selection information is displayed on the object T. FIG. 47 is a block diagram illustrating a group of hardware units in the television 1 according to Embodiment 13. The storage unit 15 is provided with a region file 151. FIG. 48 is an explanatory view illustrating a record layout of the region file 151. The region file 151 includes an object ID field and a display region field. In the object ID field, identification information (hereinafter referred to as object ID) is stored for identifying the object T displayed in the second display region 32. In the display region field, region coordinate values are stored for displaying an object in the second display region 32 by associating it with an object ID.

The CPU 11 reads out an icon for the object T from the storage unit 15 and reads out region coordinate values corresponding to the object ID of the object T from the region file 151. The CPU 11 displays the object T on the read-out region coordinate values in the second display region 32. The region coordinate values may store, in addition to the coordinate values at four corners, the coordinate values at the center and the radius. Though in the present embodiment an example is described where the region file 151 is placed in the storage unit 15, it is not limited thereto. The region file 151 may also be stored in the RAM 12 or described in the control program 15P, or may be stored in another storage medium (not illustrated).

Figure 49:
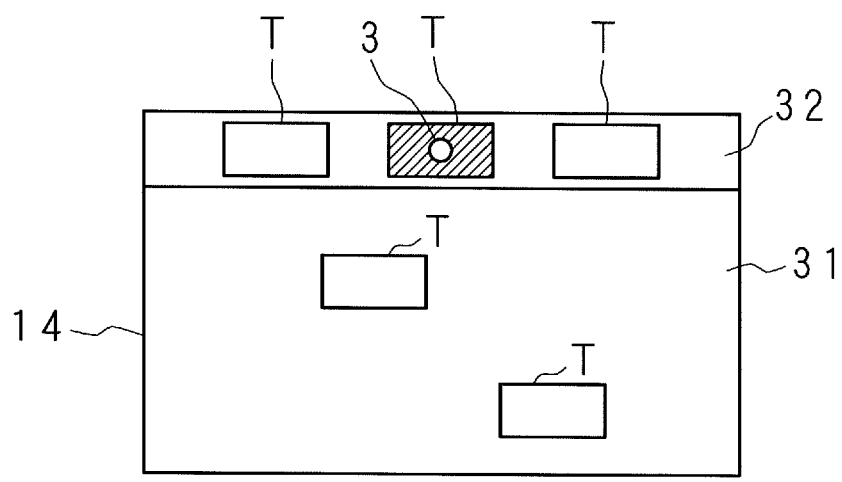
FIG. 49 is an explanatory view illustrating a display image of selection information.

FIG. 49 is an explanatory view illustrating a display image of selection information. If it is determined that the coordinate values for the pointer 3 is present in the display region for the object T, the CPU 11 reads out selection information from the storage unit 15 and displays the selection information indicating that the object T is selected. Note that the coordinate system described in the present embodiment is assumed to be for the display unit 14. In the example of FIG. 49, the pointer 3 is present in the display region for the object T at the center. Here, the CPU 11 performs processing of coloring the outer frame of the object T as the selection information with yellow or the like so as to differentiate it from the original object T.

If the pointer 3 is not present in the display region, selection information is not displayed for the object T. The selection information is not limited to the one above-described and may be shown in any manner by which the user is able to identify the object T for the case where the pointer 3 is not present in the display region from the object T for the case where the pointer 3 is present in the display region. For example, the object T may blink on and off, or the entire color of the object T may be changed.

Figure 50:
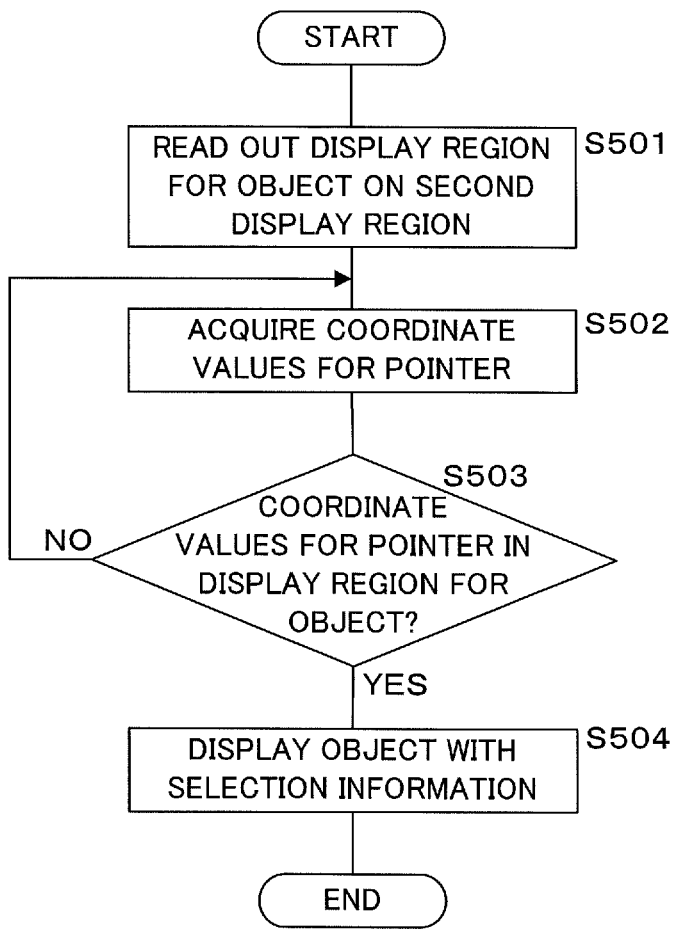
FIG. 50 is a flowchart illustrating a procedure of display processing for selection information.

FIG. 50 is a flowchart illustrating a procedure of display processing of selection information. The CPU 11 reads out from the region file 151 a display region for the object T on the second display region 32 (step S501). The CPU 11 acquires coordinate values for the pointer 3 (step S502). Note that the CPU 11 converts the coordinate values output from the remote controller 2 into coordinate values on the display unit 14. The CPU 11 determines whether or not the coordinate values for the pointer 3 are present in the display region of the object T (step S503).

If it is determined that the coordinate values are not in the display region for the object T (NO at step S503), the CPU 11 returns to step S502. If it is determined that the coordinate values are in the display region (YES at step S503), the CPU 11 proceeds to step S504. The CPU 11 displays the object T together with selection information (step S504). This allows the user to intuitively recognize the selected object T even in a situation where the remote controller 2 is distant from the television 1.

Embodiment 13 is as described above and the other configuration parts are similar to those in Embodiments 1 through 12, corresponding parts are denoted by the same reference number and will not be described in detail.

Embodiment 14

Figure 51:
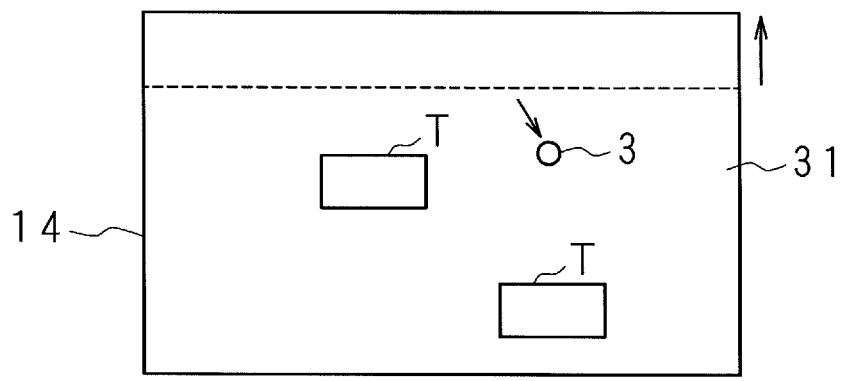
FIG. 51 is an explanatory view illustrating a display image of the first display region.

Embodiment 14 relates to an example where the display of the second display region 32 is erased. FIG. 51 is an explanatory view illustrating a display image of the first display region 31. When the pointer 3 moves out of a predetermined region for displaying the second display region 32, the display of once-shown second display region 32 is erased. Note that the erasing may be performed by scrolling the screen upward or by deleting instantaneously.

Figure 52:
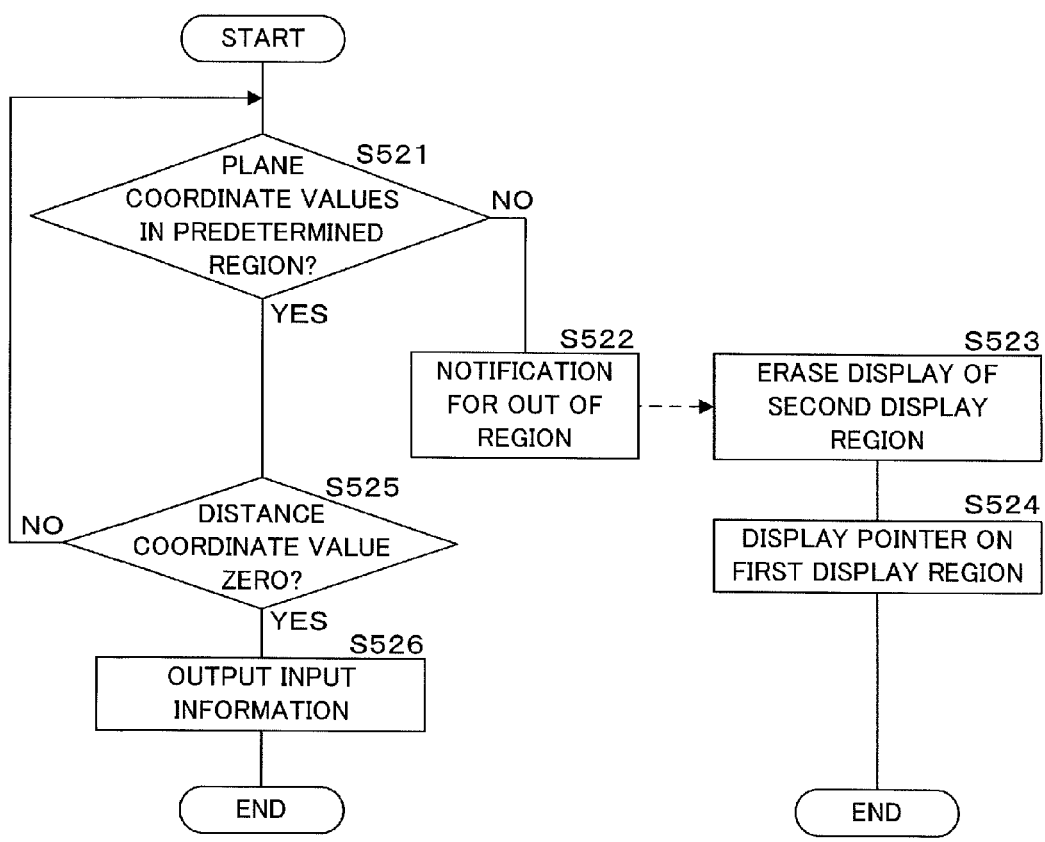
FIG. 52 is a flowchart illustrating a procedure of erase processing for the second display region.

FIG. 52 is a flowchart illustrating a procedure of erasing processing for the second display region 32. After the second display region 32 is displayed by the processing described in Embodiment 12, the following processing is performed. The CPU 21 of the remote controller 2 determines whether or not the plane coordinate values output from the touch pad 23 are in a predetermined region stored in the storage unit 25 (step S521). If it is determined that the coordinate values are not in the predetermined region (NO at step S521), the CPU 21 proceeds to step S522. The CPU 21 outputs a notification indicating that the values are out of the region to the television 1 through the communication unit 26 (step S522).

When receiving the notification indicating that the values are out of the region through the communication unit 16, the CPU 11 of the television 1 erases the display of the second display region 32 (step S523). The CPU 11 continuously displays the pointer 3 on the coordinates on the first display region 31 corresponding to the plane coordinate values output from the remote controller 2 (step S524). If it is determined that the distance coordinate value is distant by a predetermined distance, the CPU 11 erases the display of the pointer 3. If it is determined that the plane coordinate values are within the predetermined region (YES at step S521), the CPU 21 of the remote controller 2 proceeds to step S525.

The CPU 21 of the remote controller 2 determines whether or not the distance coordinate value output from the touch pad 23 is changed from a positive value to zero (step S525). If it is not changed to zero (NO at step S525), the CPU 21 returns to step S521. If it is determined that the distance coordinate value is changed to zero (YES at step S525), the CPU 21 proceeds to step S526. The CPU 21 outputs input information indicating that an input is performed to the television 1 through the communication unit 26 (step S526). Note that the subsequent processing is similar to the processing at and after step S459 in Embodiment 12, and thus the description thereof will not be described in detail.

Figure 53:
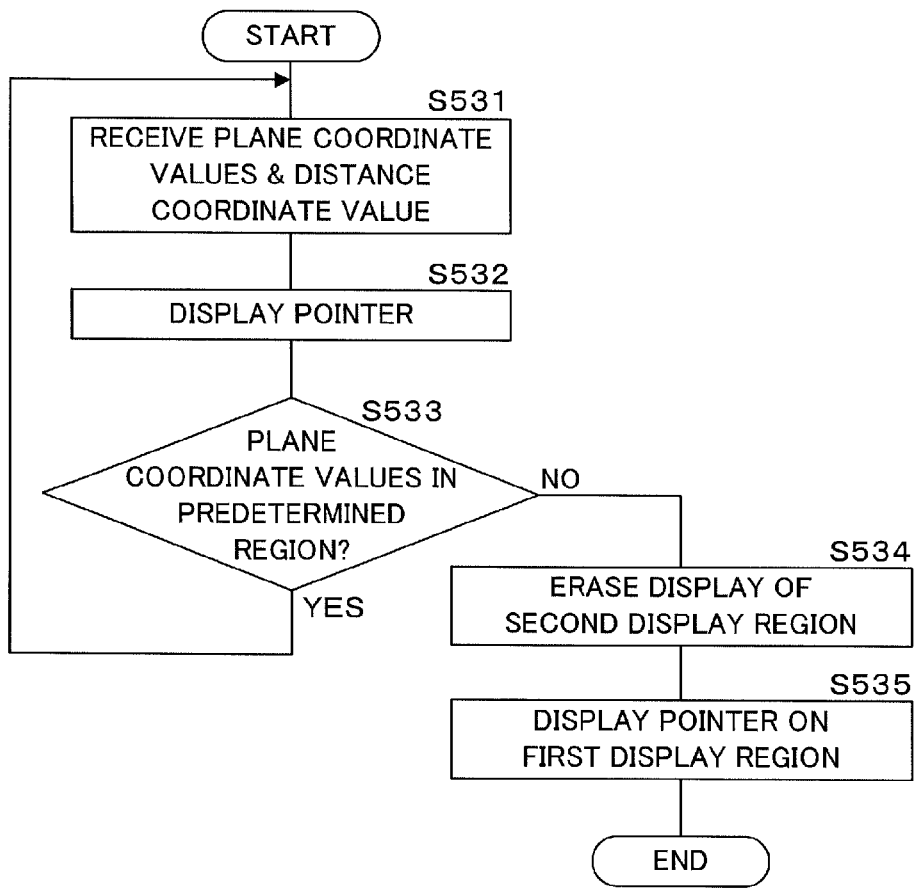
FIG. 53 is a flowchart illustrating a procedure of erase processing for the second display region.

The processing described above may also be executed on the television 1 side. FIG. 53 is a flowchart illustrating a procedure of erasing processing of the second display region 32. The CPU 11 of the television 1 performs the following processing after the second display region 32 is displayed by the processing described in Embodiment 12. The CPU 11 receives plane coordinate values and a distant coordinate value from the remote controller 2 (step S531). The CPU 11 displays the pointer 3 on the second display region 32 based on the plane coordinate values (step S532). The CPU 11 determines whether or not the plane coordinate values are in the predetermined region stored in the storage unit 15 (step S533). The processing of step S533 may be performed by comparing the coordinate values for the pointer 3 in the coordinate system of the display unit 14 and the predetermined region stored in the storage unit 15, or by comparing the received plane coordinate values with the predetermined region stored in the storage unit 15.

If it is determined that the values are in the predetermined region (YES at step S533), the CPU 11 returns to step S531. If it is determined that the values are not in the predetermined region (NO at step S533), the CPU 11 proceeds to step S534. The CPU 11 erases the display of the second display region 32 (step S534). The CPU 11 continuously displays the pointer 3 on the coordinates on the first display region 31 corresponding to the plane coordinate values output from the remote controller 2 (step S535).

Figure 54:
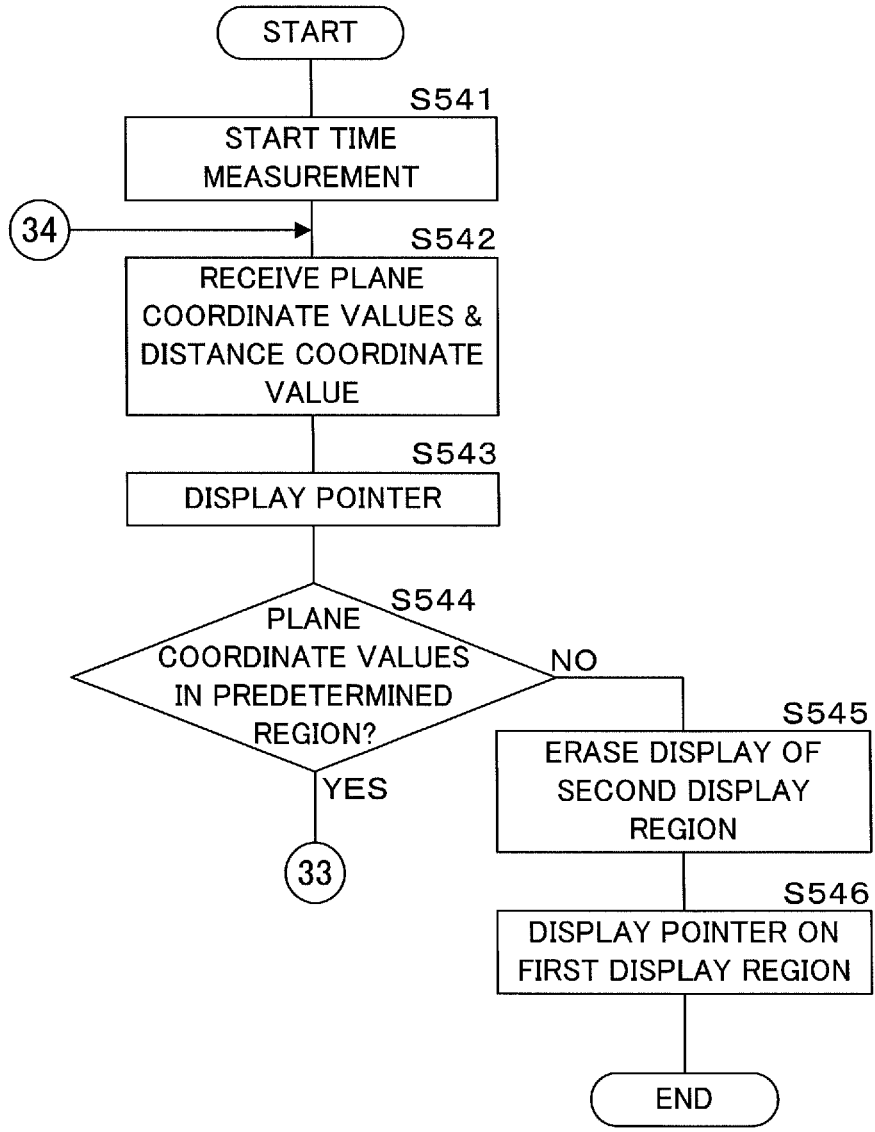
FIG. 54 is a flowchart illustrating a procedure of erase processing for the second display region.
Figure 55:
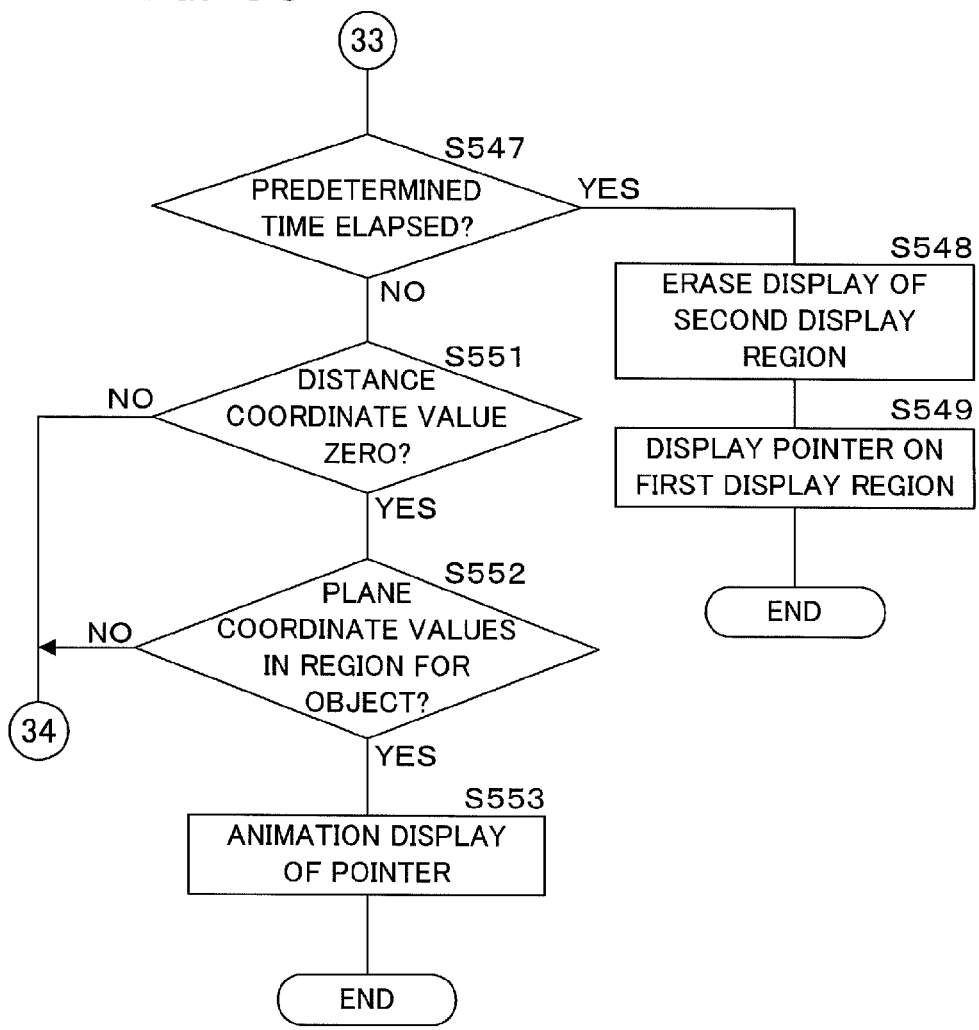
FIG. 55 is a flowchart illustrating a procedure of erase processing for the second display region.

Furthermore, the erasing processing may also be performed when a certain period of time has elapsed. FIGS. 54 and 55 illustrate a flowchart indicating a procedure of erasing processing for the second display region 32. The CPU 11 of the television 1 displays the second display region 32 by the processing described in Embodiment 12, and thereafter the clock unit 18 performs time measurement processing (step S541). The CPU 11 receives the plane coordinate values and a distant coordinate value from the remote controller 2 (step S542). The CPU 11 displays the pointer 3 on the second display region 32 based on the plane coordinate values (step S543). The CPU 11 determines whether or not the plane coordinate values are in the predetermined region stored in the storage unit 15 (step S544).

If it is determined that the values are not in the predetermined region (NO at step S544), the CPU 11 proceeds to step S545. The CPU 11 erases the display of the second display region 32 (step S545). The CPU 11 erases the display of the second display region 32 (step S545). The CPU 11 continuously displays the pointer 3 on the coordinates on the first display region 31 corresponding to the plane coordinate values output from the remote controller 2 (step S546). If it is determined that the values are in the predetermined region (YES at step S544), the CPU 11 proceeds to step S547.

The CPU 11 determines whether or not a predetermined time stored in the storage unit 15 has elapsed for the time measured at step S541 (step S547). If it is determined that the predetermined time has elapsed (YES at step S547), the CPU 11 proceeds to step S548. The CPU 11 erases the display of the second display region 32 (step S548). The CPU 11 continuously displays the pointer 3 on the coordinates on the first display region 31 corresponding to the plane coordinate values output from the remote controller 2 (step S549).

If it is determined that the predetermined time has not elapsed (NO at step S547), the CPU 11 proceeds to step S551. The CPU 11 determines whether or not the distance coordinate value is changed from a positive value to zero (step S551). If it is determined that the value is not changed to zero (NO at step S551), the CPU 11 returns to step S542.

If it is determined that the distant coordinate value is changed to zero (YES at step S551), the CPU 11 proceeds to step S552. The CPU 11 reads out a display region for the object T displayed on the second display region 32. The CPU 11 determines whether or not the plane coordinate values transmitted from the remote controller 2 are in the display region of the object T (step S552). If it is determined that the values are not in the display region (NO at step S552), the CPU 11 returns to step S542. If it is determined that the values are in the display region for the object T (YES at step S552), the CPU 11 proceeds to step S553. The CPU 11 displays an animated image of the pointer 3 at the position of the plane coordinate values as acceptance information indicating that an input for the object T is accepted (step S553). Accordingly, the display of the second display region 32 may appropriately be erased.

Embodiment 14 is as described above, and the other configuration parts are similar to those in Embodiments 1 to 13. Corresponding parts are therefore denoted by the same reference numbers and will not be described in detail.

Embodiment 15

Embodiment 15 relates to an example in which the display of the object T is changed in accordance with a distance coordinate value.

Figure 56:
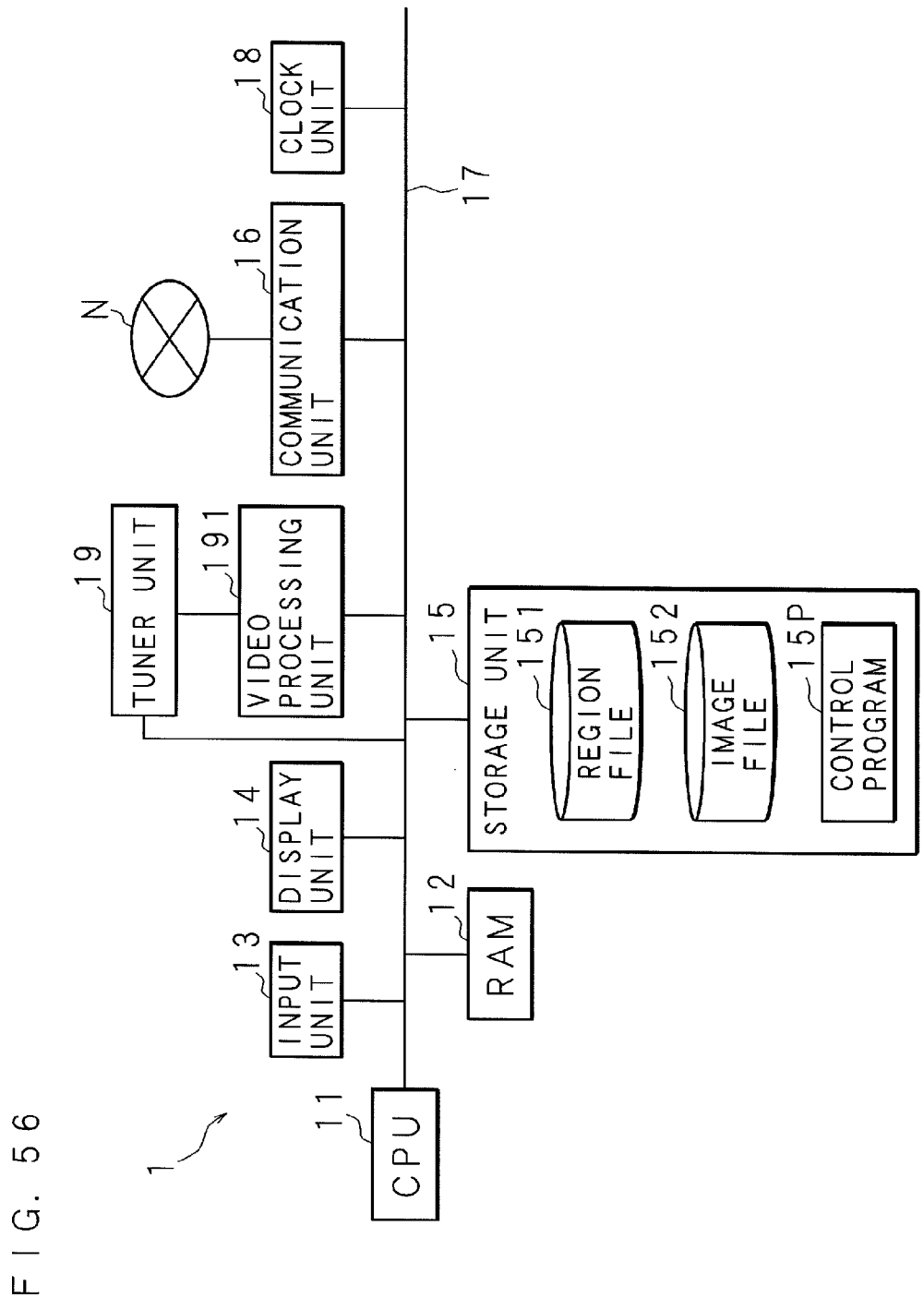
FIG. 56 is a block diagram illustrating a hardware group of a television according to Embodiment 15.

FIG. 56 is a block diagram illustrating a group of hardware units in the television 1 according to Embodiment 15. The storage unit 15 is provided with an image file 152. FIG. 57 is an explanatory view illustrating a record layout of the image file 152. The image file 152 includes a distance coordinate value field and an image field. In the distance coordinate value field, a distance coordinate value transmitted from the remote controller 2 is stored. Moreover, in the image field, image data of, for example, JPEG (Joint Photographic Experts Group) or GIF (Graphics Interchange Format) is stored in association with the distance coordinate value.

Figure 58A:
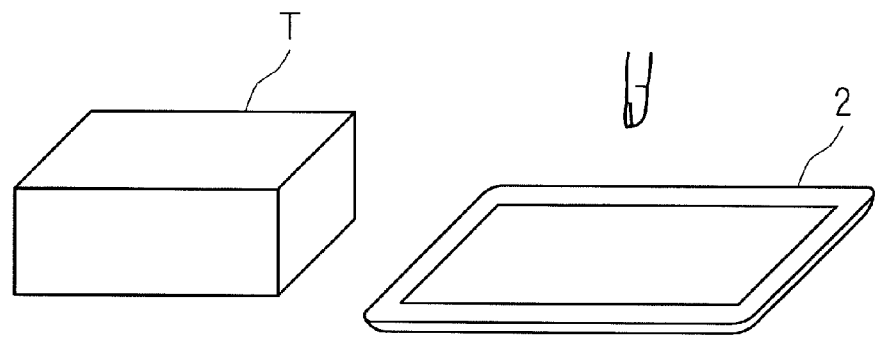
FIG. 58A is an explanatory view illustrating a display image of image data.
Figure 58B:
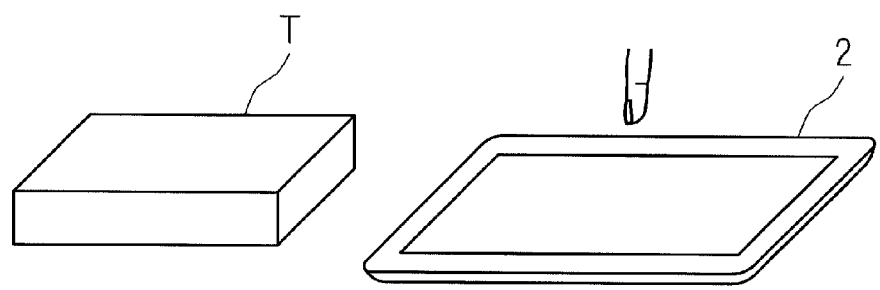
FIG. 58B is an explanatory view illustrating a display image of image data.
Figure 58C:
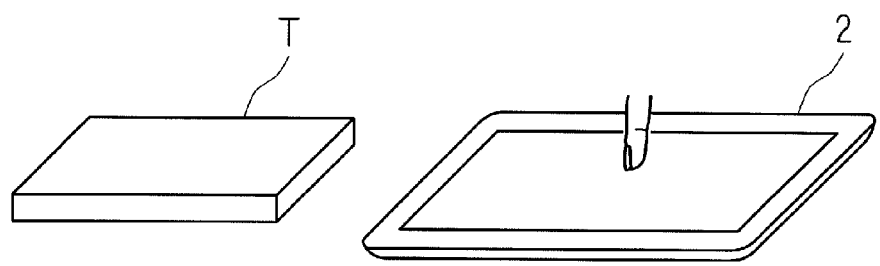
FIG. 58C is an explanatory view illustrating a display image of image data.

When a distance coordinate value is received through the communication unit 16, the CPU 11 reads out image data of the object T corresponding to the distance coordinate value. The CPU 11 displays the read-out image data of the object T on the second display region 32 of the display unit. FIGS. 58A to C are explanatory views illustrating display images of the image data. The image data has, for example, the shape of a quadrangular button, which is displayed lower as the distance coordinate value becomes smaller. FIG. 58A is image data indicating the highest button shape. If it is determined that the distance coordinate value is between two and four inclusive, the CPU 11 reads out the image data of the highest button shape from the image file 152 because of the longest distance, and displays it as the object T.

If it is determined that the distance coordinate value is one or larger but smaller than two, the CPU 11 reads out image data of the next highest button shape, as shown in FIG. 58B, from the image file 152, and displays it as the object T. If it is determined that the distance coordinate value is larger than zero but smaller than 2, the CPU 11 reads out image data of the lowest button shape from the image file 152 as shown in FIG. 58C because of the short distance, and displays it as the object T. Note that the numeric values described in the present embodiment are mere examples, and the values are not limited thereto. Moreover, the button shape is not limited to the quadrangular prism but may also be any shape with a variable height such as a cylinder, a triangular prism or a character image. Furthermore, though the present embodiment described an example where the images with the heights of three stages are used to facilitate explanation, the invention is not limited to the example. Any images of multiple stages with the heights changing in accordance with the distance may be displayed.

FIG. 59 is a flowchart illustrating processing of changing a button shape. The CPU 11 reads out a display region of the object T on the second display region 32 from the region file 151 (step S591). The CPU 11 acquires the coordinate values for the pointer 3 and the distance coordinate value (step S592). The CPU 11 determines whether or not the coordinate values for the pointer 3 are present in the display region for the object T (step S593).

If it is determined that the coordinate values are not in the display region for the object T (NO at step S593), the CPU 11 returns to step S592. If it is determined that the values are in the display region for the object T (YES at step S593), the CPU 11 proceeds to step S594. The CPU 11 reads out image data corresponding to the distance coordinate value from the image file 152 (step S594). The CPU 11 displays the image data on the second display region 32 as the object T (step S595).

The CPU 11 determines whether or not the distance coordinate value is changed from a positive value to zero (step S596). If it is determined that the value is not zero (NO at step S596), the CPU 11 returns to step S592. If it is determined that the distance coordinate value is changed to zero (YES at step S596), the CPU 11 proceeds to step S597. The CPU 11 displays an animated image of the pointer 3 at the position of the plane coordinate values as acceptance information indicating that an input for the object T is accepted (step S597). For example, processing of erasing image data concerning the button shape of the object T, or processing of once displaying a button shape with a height even lower than the one shown in FIG. 58C and thereafter erasing the image data may be performed. Accordingly, even when the remote controller 2 is located away from the television 1, the sense of height may be recognized visually.

Embodiment 15 is as described above, and the other configuration parts are similar to those in Embodiments 1 to 14. Corresponding parts are therefore denoted by the same reference numbers and will not be described in detail.

Embodiment 16

FIG. 60 is an explanatory view illustrating an operational image. It is assumed that, when objects T1 and T2 are displayed on the television 1, the user wishes to operate the object T1 through the remote controller 2. Since a finger may swing around a joint, even if the operation for the object T1 is intended, the object 2 may be operated by mistake at the last minute as shown with a trace indicated by a dotted line. The present embodiment relates to an example where the input for the object T1 is accepted only when the pointer 3 is present in the region of the object T1 for a certain period of time.

Figure 61:
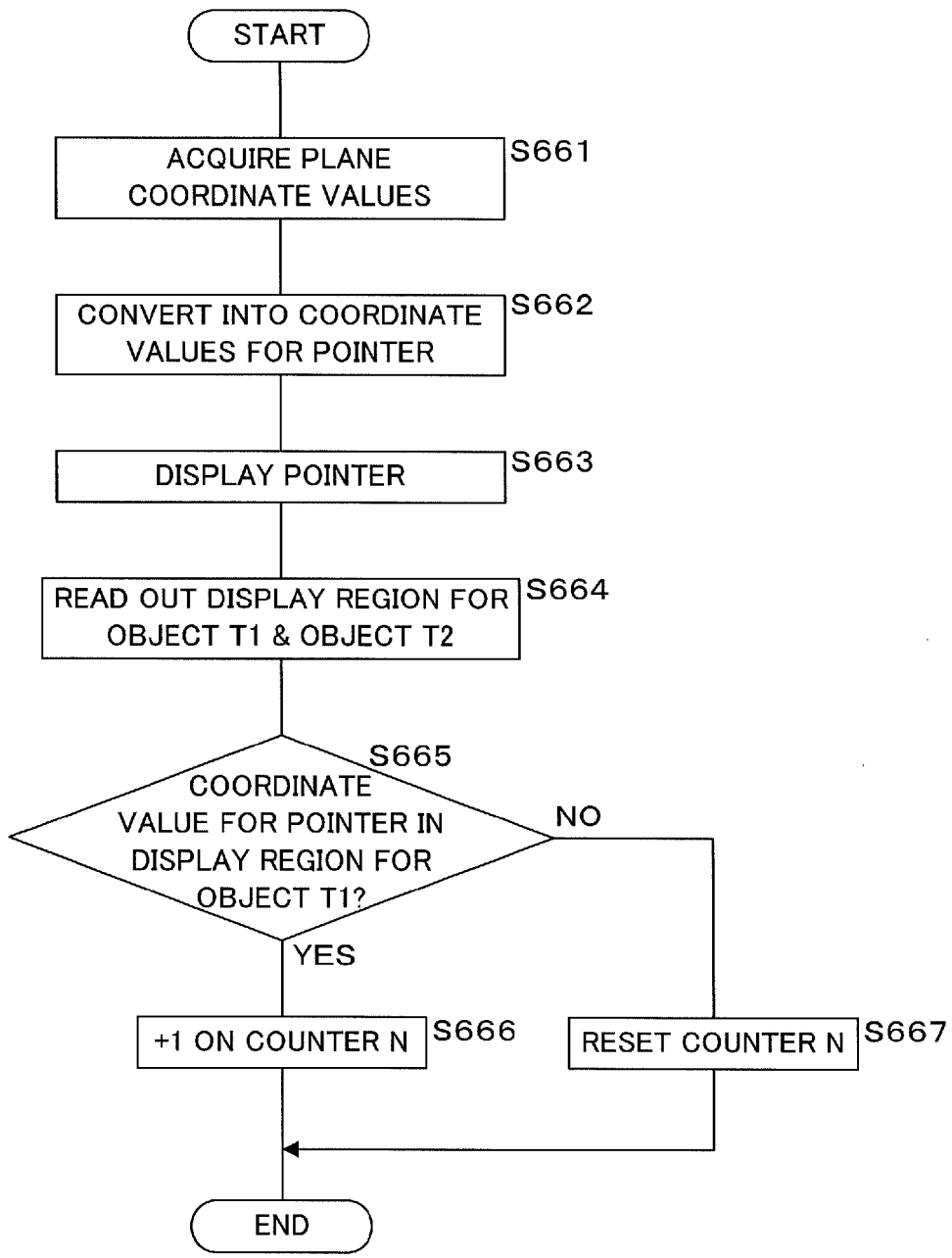
FIG. 61 is a flowchart illustrating a procedure of period storage processing.

FIG. 61 is a flowchart illustrating a procedure of period storage processing. The CPU 11 acquires plane coordinate values transmitted from the remote controller 2 (step S661). The CPU 11 converts the plane coordinate values into coordinate values for the pointer 3 by a conversion equation stored in the storage unit 15 (step S662). The CPU 11 displays pointer 3 in the second display region 32 (step S663). Though the processing performed when the pointer 3 is displayed in the second display region 32 in the present embodiment, similar processing may also be performed when displayed in the first display region 31.

The CPU 11 reads out display regions for the object T1 and object T2 from the region file 151 (step S664). The CPU 11 determines whether or not the coordinate values for the pointer 3 is in the display region for the object T1 (step S665). If it is determined that the values are in the display region (YES at step S665), the CPU 11 increments a counter N (step S666). Note that the value of the counter is stored in the RAM 12. If it is determined that the values are not in the display region (NO at step S665), the CPU 11 resets the counter N (step S667). The CPU 11 repeatedly performs the count processing every 10 ms, for example.

Figure 62:
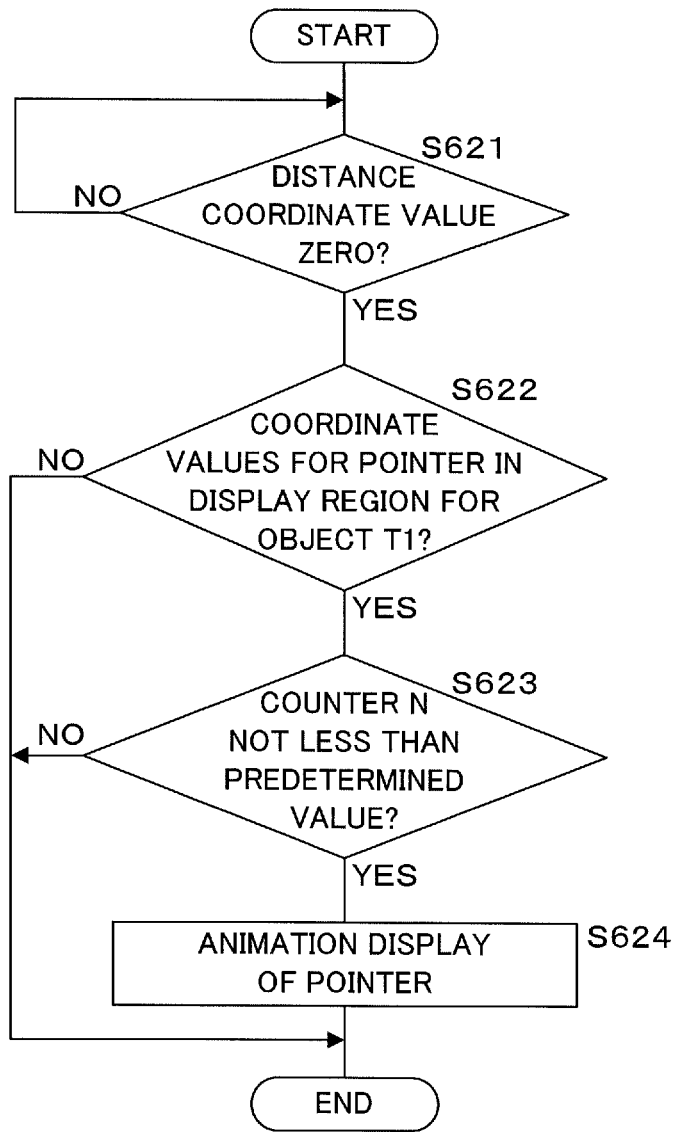
FIG. 62 is a flowchart illustrating processing of accepting input operation.

FIG. 62 is a flowchart illustrating acceptance processing of the input operation. The CPU 11 determines whether or not the distance coordinate value is changed from a positive value to zero (step S621). If it is determined that the value is not zero (NO at step S621), the CPU 11 returns to step S621.

If it is determined that the distance coordinate value is changed to zero (YES at step S621), the CPU 11 proceeds to step S622. The CPU 11 determines whether or not the coordinate values for the pointer 3 is in the display region for the object T1 (step S622). If it is determined that the coordinate values are in the display region (YES at step S622), the CPU 11 determines whether or not the counter N stored in the RAM 12 is not less than the predetermined value stored in the storage unit 15 (step S623). For example, the predetermined value may be set as 10. If not less than 100 ms, it is assumed that there is no change for the object T immediately before touching (YES at step S623), and the CPU 11 proceeds to step S624. The CPU 11 displays an animated image of the pointer 3 at the position of the plane coordinate values as the acceptance information indicating that an input for the object T1 is accepted (step S624).

Though the counter N is used in the present embodiment, it is also possible to use a time measurement function by the clock unit 18 and to thereby determine whether or not a predetermined time stored in the storage unit 15 is exceeded. If, on the other hand, the coordinate values for the pointer 3 is not in the display region for the object T1 (NO at step S622), the CPU 11 terminates the processing without performing the processing at step S624. Likewise, if the value on the counter N is less than the predetermined value (NO at step S623), the CPU 11 terminates the processing without performing the processing at step S624. Here, the operation of the object T2 is canceled. While the operation of the object T2 is canceled, the CPU 11 may assume that an input for the object T1 is performed and proceed to step S624 to display an animated image of the pointer 3 for the object T1. This allows reduction in operational error that may be caused by operation of a different object T at the last minute.

Embodiment 16 is as described above, and the other configuration parts are similar to those in Embodiments 1 to 15. Corresponding parts are therefore denoted by the same reference numbers and will not be described in detail.

What is claimed is:

1. A display apparatus having a storage unit storing a control program, and a processor configured to execute the control program, and displaying information, comprising:
   a reception unit wirelessly receiving a coordinate value associated with continuous contact input in an input apparatus having a touch pad or a touch panel;
   a display processing unit, performed by the processor, displaying on a display unit a pointer moving on a basis of the coordinate value received by the reception unit;
   an output unit, performed by the processor, unit outputting, when the continuous contact input is finished, acceptance information indicating that an input for an object displayed on the display unit is accepted at a final coordinate value for the pointer displayed on the display unit; and
   a re-output unit, performed by the processor, outputting said acceptance information again at the final coordinate value, when tap operation is accepted through the input apparatus within a predetermined period of time after the output unit outputs the acceptance information.

2. The display apparatus according to claim 1, wherein the output unit outputs said acceptance information at the final coordinate value for the pointer displayed on the display unit, when finish information indicating that the continuous contact input is finished is received from the input apparatus.

3. The display apparatus according to claim 1, wherein the output unit outputs said acceptance information at the final coordinate value for the pointer displayed on the display unit, when a coordinate value associated with the continuous contact input is no longer received by the reception unit.

4. The display apparatus according to claim 1, further comprising:
   a change unit, performed by the processor, changing an indication of the pointer displayed on the display unit when the pointer is present in a predetermined range for a certain period of time.

5. The display apparatus according to claim 4, wherein the output unit outputs said acceptance information at the final coordinate value for the pointer displayed on the display unit, when the indication of the pointer is changed by the change unit and the continuous contact input is finished after the change.

6. A display apparatus having a storage unit storing a control program, and a processor configured to execute the control program, and displaying information, comprising:
   a reception unit wirelessly receiving a coordinate value associated with continuous contact input in an input apparatus having a touch pad or a touch panel;
   a display processing unit, performed by the processor, displaying on a display unit a pointer moving on a basis of the coordinate value received by the reception unit;
   an output unit, performed by the processor, outputting, when the continuous contact input is finished, acceptance information indicating that an input for an object displayed on the display unit is accepted at a final coordinate value for the pointer displayed on the display unit; and
   a change unit, performed by the processor, changing an indication of the pointer displayed on the display unit when the pointer is present in a predetermined range for a certain period of time,
   wherein the output unit outputs said acceptance information at the final coordinate value when the continuous contact input is finished after the indication of the pointer is changed by the change unit and tap operation is accepted through the input apparatus within a predetermined period of time.

7. The display apparatus according to claim 6, further comprising:
   a stop unit, performed by the processor, stopping a display of said acceptance information by the output unit, when the continuous contact input is finished before the change by the change unit.

8. A display apparatus having a storage unit storing a control program, and a processor configured to execute the control program, and displaying information, comprising:
- a reception unit wirelessly receiving a coordinate value associated with continuous contact input in an input apparatus having a touch pad or a touch panel;
- a display processing unit, performed by the processor, displaying on a display unit a pointer moving on a basis of the coordinate value received by the reception unit; and
- an output unit, performed by the processor, outputting, when the continuous contact input is finished, acceptance information indicating that an input for an object displayed on the display unit is accepted at a final coordinate value for the pointer displayed on the display unit;
- wherein the output unit outputs said acceptance information at the final coordinate value for the pointer displayed on the display unit when tap operation through the input apparatus is accepted within a predetermined period of time after the continuous contact input is finished.

9. The display apparatus according to claim 8, wherein the output unit includes:
- a change unit, performed by the processor, changing the indication of the pointer after the continuous contact input is finished; and
- an acceptance information output unit, performed by the processor, unit outputting said acceptance information at the final coordinate value for the pointer displayed on the display unit, when tap operation is accepted through the input apparatus within a predetermined period of time after the indication of the pointer is changed by the change unit.

10. The display apparatus according to claim 8, further comprising:
- a re-output unit, performed by the processor, outputting said acceptance information again at the final coordinate value, when tap operation is accepted through the input apparatus within a predetermined period of time after said acceptance information is output by the output unit.

11. The display apparatus according to claim 8, further comprising:
- a stop unit, performed by the processor, stopping said output of the acceptance information when tap operation through the input apparatus is not accepted within a predetermined period of time after the continuous contact input is finished.

12. The display apparatus according to claim 8, further comprising:
- a stop unit stopping the output of said acceptance information when tap operation through the input apparatus is not accepted within a predetermined period of time after the indication of the pointer is changed by the change unit.

13. The display apparatus according to claim 1, further comprising:
- a second display processing unit displaying, when the pointer moving in a first display region of the display unit resides in a predetermined region, the second display region superposed on the first display region, based on the coordinate value received by the reception unit.

14. The display apparatus according to claim 1, wherein a coordinate on a touch pad or a touch panel of the input apparatus and a coordinate on a display unit of the display apparatus have a relationship of absolute coordinates.

15. An information processing system using an input apparatus having a touch pad or a touch panel, the input apparatus having a first storage unit storing a first control program, and a first processor configured to execute the first control program, and a display apparatus displaying information, the display apparatus having a second storage unit storing a second control program, and a second processor configured to execute the second control program, wherein
the input apparatus includes a wireless output unit wirelessly outputting a coordinate value associated with a continuous contact input for a touch pad or a touch panel to the display apparatus, and
the display apparatus includes:
- a reception unit wirelessly receiving the coordinate value associated with the continuous contact input output by the wireless output unit;
- a display processing unit, performed by the second processor, displaying on a display unit a pointer moving on a basis of the coordinate value received by the reception unit; and
- an output unit, performed by the second processor, outputting acceptance information indicating that an input for an object displayed on the display unit is accepted at a final coordinate value for the pointer displayed on the display unit, when the continuous contact input is finished,
wherein the output unit outputs said acceptance information at the final coordinate value for the pointer displayed on the display unit when tap operation is accepted through the input apparatus within a predetermined period of time after the continuous contact input is finished.

16. The information processing system according to claim 15, wherein
the input apparatus includes a finish output unit, performed by the first processor, wirelessly outputting, when the continuous input for the touch pad or touch panel is finished, finish information indicating that the input is finished, and
the output unit outputs said acceptance information at the final coordinate value for the pointer displayed on the display unit, when finish information is received wirelessly from the finish output unit.

17. The information processing system according to claim 15, wherein the output unit outputs said acceptance information at the final coordinate value for the pointer displayed on the display unit, when a coordinate value associated with the continuous contact input output from the wireless output unit is no longer received.

18. The information processing system according to claim 15, further comprising:
- a change unit, performed by the second processor, changing an indication of the pointer displayed on the display unit, when the pointer is present in a predetermined range for a certain period of time.

19. The information processing system according to claim 18, wherein
the output unit outputs said acceptance information at the final coordinate value for the pointer displayed on the display unit, when the indication of the pointer is changed by the change unit and the continuous contact input is finished after the change.

20. A non-transitory recording medium recording a program making a computer having a control unit and a display unit display information, making the computer execute:
- an acquiring step of acquiring by the control unit a coordinate value output wirelessly and associated with a continuous contact input in an input apparatus having a touch pad or a touch panel;

a display processing step of displaying on the display unit by the control unit a pointer moving on a basis of the coordinate value acquired at the acquiring step;

performing, by the computer, an outputting step of outputting by the control unit acceptance information indicating that an input for an object displayed on the display unit is accepted at a final coordinate value for a pointer displayed on the display unit, when said continuous contact input is finished; and performing, by the computer, a re-outputting step of outputting said acceptance information again at the final coordinate value, when tap operation is accepted through the input apparatus within a predetermined period of time after said acceptance information is output by the outputting step.

21. The non-transitory recording medium according to claim 20, wherein the outputting step outputs said acceptance information at the final coordinate value for the pointer displayed on the display unit, when finish information is acquired indicating that the continuous contact input is finished, which is output from the input apparatus.

22. The non-transitory recording medium according to claim 20, wherein the outputting step outputs said acceptance information at the final coordinate value for the pointer displayed on the display unit, when a coordinate value associated with the continuous contact input is no longer acquired by the acquiring step.

* * * * *